United States Patent
Belden, Jr. et al.

(10) Patent No.: US 6,966,438 B2
(45) Date of Patent: *Nov. 22, 2005

(54) LOCKABLE MEDIA STORAGE BOX WITH LOCK AND KEY

(75) Inventors: Dennis D. Belden, Jr., Canton, OH (US); Ronald K. Burdett, Strasburg, OH (US); Michael S. Jaeb, Millersburg, OH (US); Ronald M. Marsilio, Mogadore, OH (US); Nicholas M. Sedon, Massillon, OH (US); James M. Byrne, Massillon, OH (US)

(73) Assignee: Nexpak Corporation, Uniontown, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/629,478

(22) Filed: Jul. 29, 2003

(65) Prior Publication Data

US 2004/0020812 A1 Feb. 5, 2004

Related U.S. Application Data

(63) Continuation of application No. 09/711,807, filed on Nov. 13, 2000, now Pat. No. 6,598,742, which is a continuation-in-part of application No. 09/618,652, filed on Jul. 18, 2000, now Pat. No. 6,601,701, which is a continuation-in-part of application No. 09/317,554, filed on May 24, 1999, now Pat. No. 6,135,280, which is a continuation of application No. 09/015,085, filed on Jan. 29, 1998, now Pat. No. 5,944,185.

(51) Int. Cl.$^7$ ..................... B65D 85/57; B65D 85/575
(52) U.S. Cl. .................. 206/308.1; 70/57.1; 70/63; 206/1.5; 206/387.11
(58) Field of Search .................... 70/57.1, 63; 206/1.5, 206/308.2, 387.11, 807; 220/315, 324

(56) References Cited

U.S. PATENT DOCUMENTS

| | | | | |
|---|---|---|---|---|
| 806,768 | A | * 12/1905 | Bauer | 70/168 |
| 1,510,632 | A | * 10/1924 | Nutry | 70/63 |
| 2,729,088 | A | * 1/1956 | Huot et al. | 70/63 |
| 2,730,392 | A | * 1/1956 | Thiebaud | 292/201 |
| 4,966,020 | A | * 10/1990 | Fotheringham et al. | 70/276 |
| 6,561,347 | B1 | 5/2003 | Lax | |
| 6,637,589 | B2 | 10/2003 | Broadhead | |
| 6,672,455 | B2 | * 1/2004 | Belden et al. | 206/308.2 |
| 2003/0196917 | A1 | 10/2003 | Broadhead | |

* cited by examiner

Primary Examiner—Jim Foster
(74) Attorney, Agent, or Firm—Zollinger & Burleson Ltd

(57) ABSTRACT

A lockable media storage box and lock and key combination includes a box having a base and a lid hingedly connected to the base and movable between opened and closed positions. A locking mechanism is movable between locked and unlocked positions to lock and unlock the container. The lock includes lock pins that slide through aligned lock holes in the base and the lid.

35 Claims, 53 Drawing Sheets

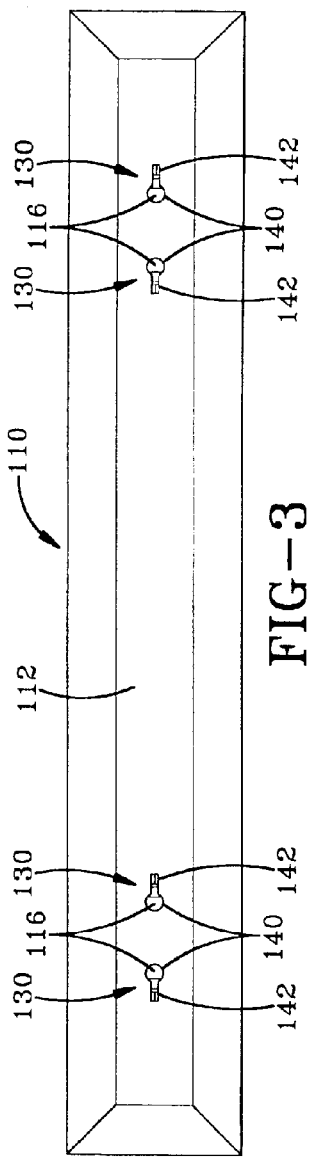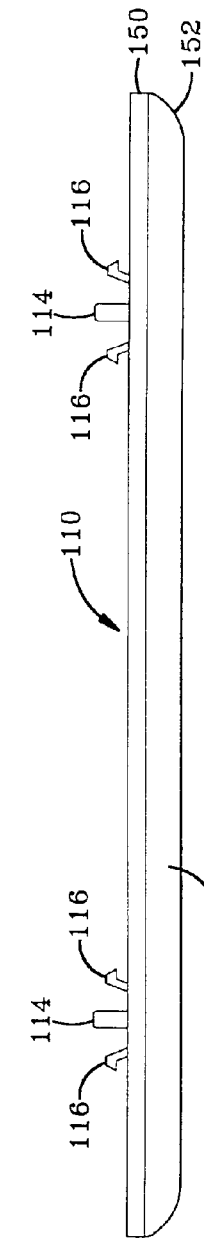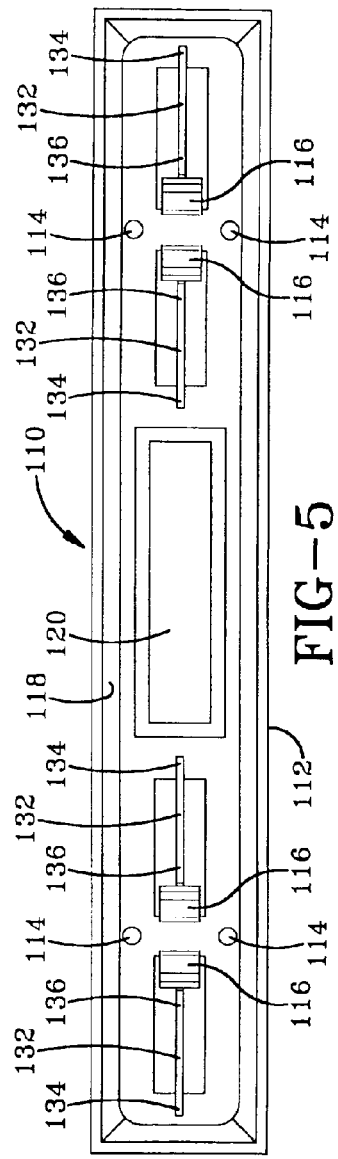

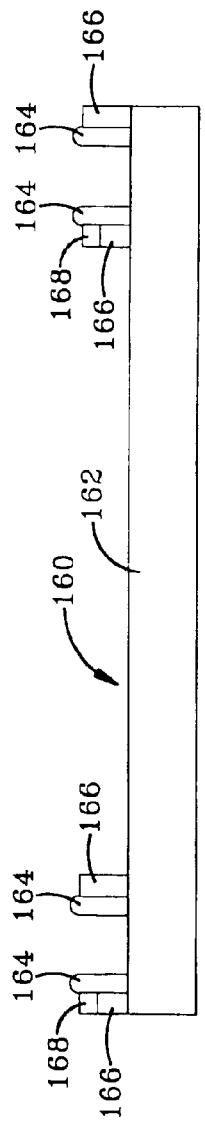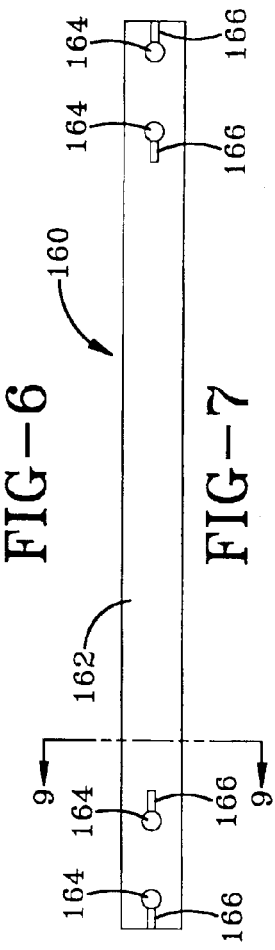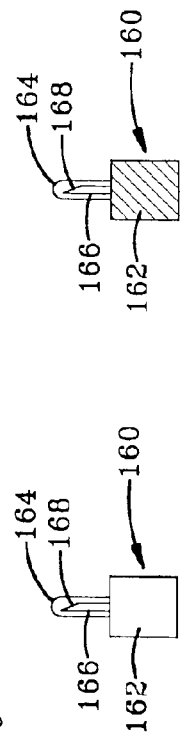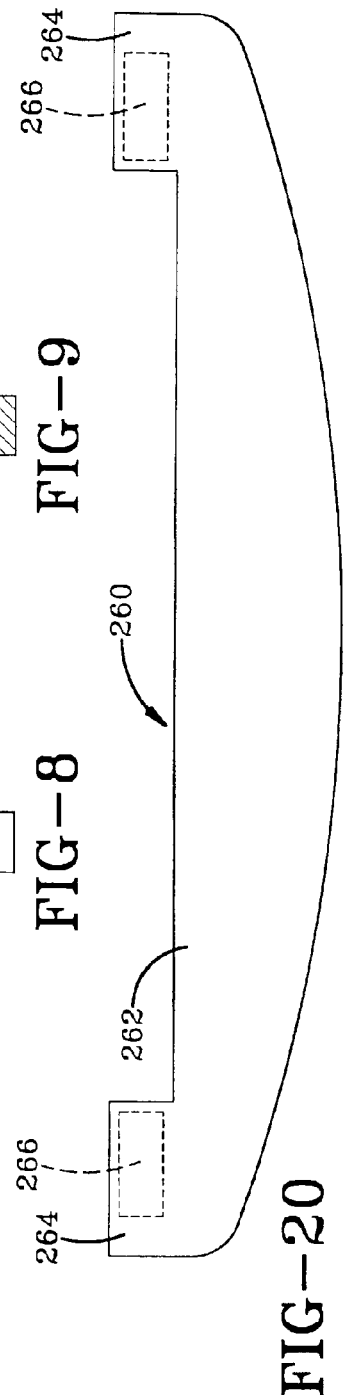

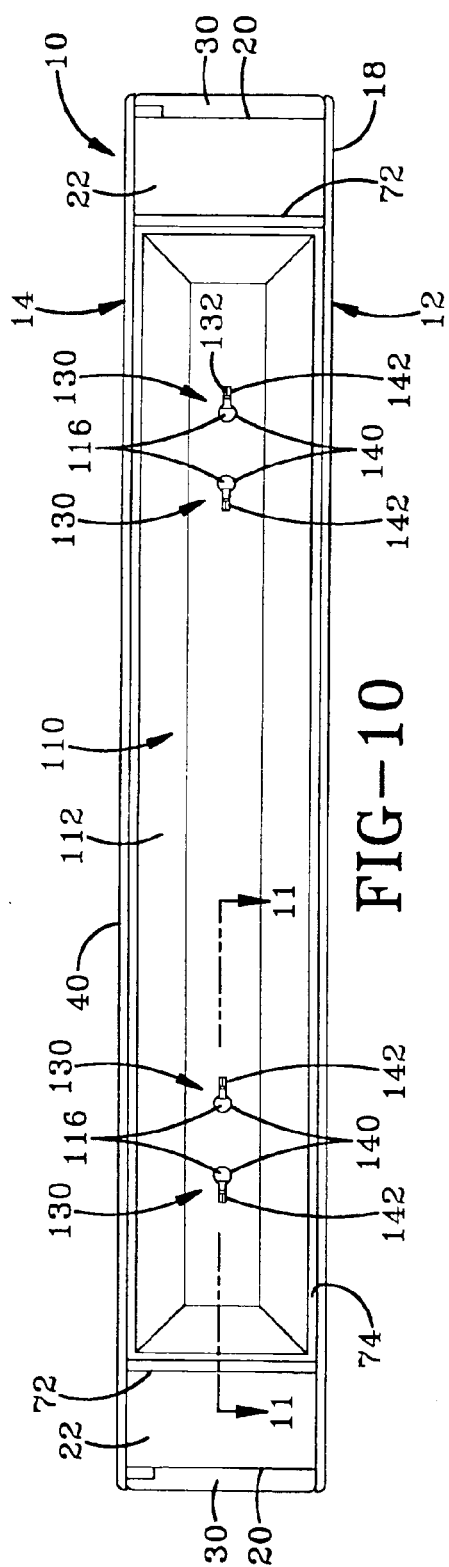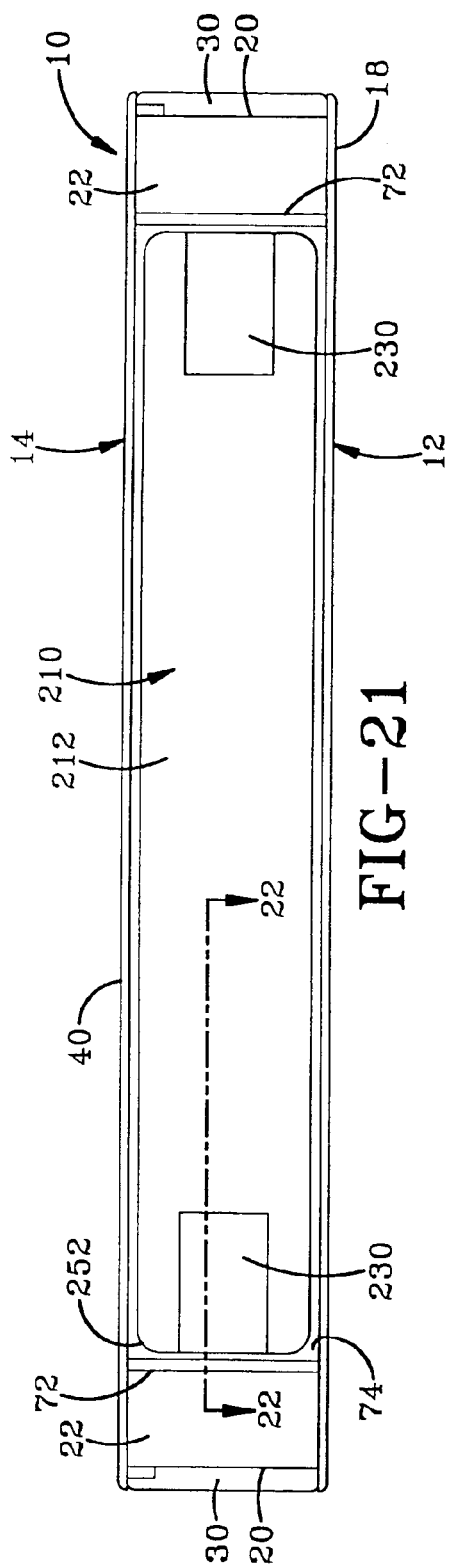

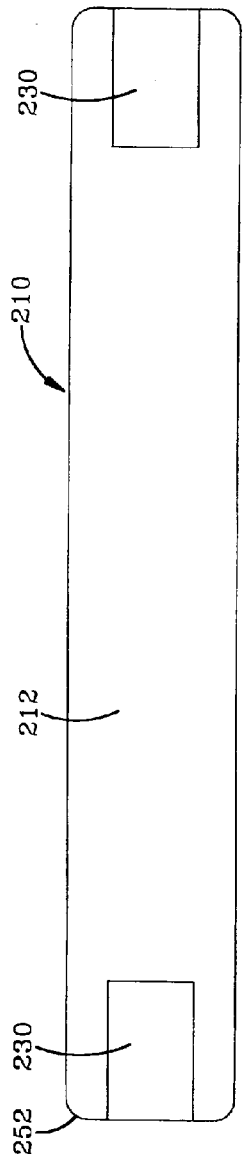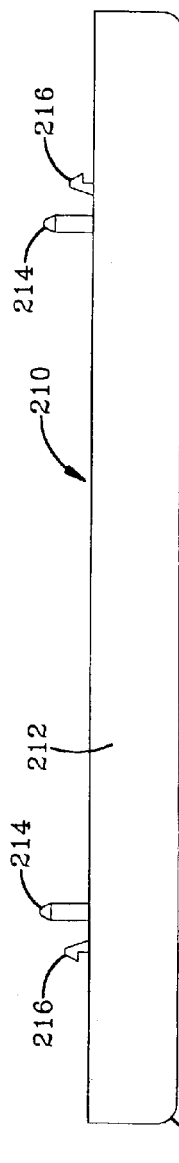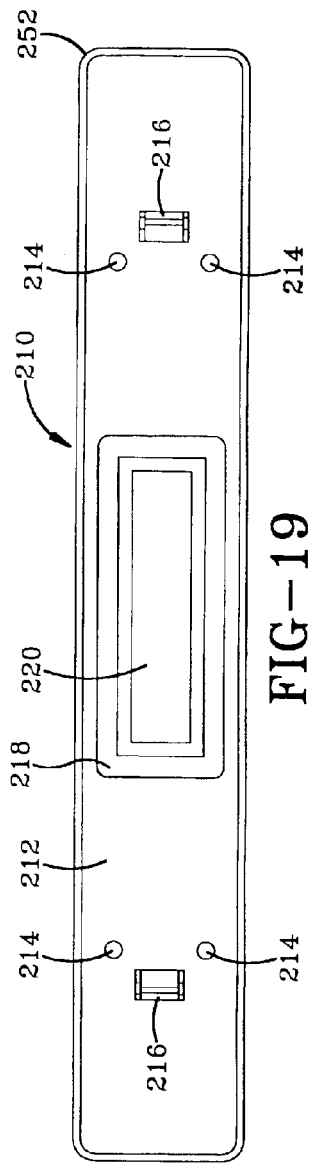

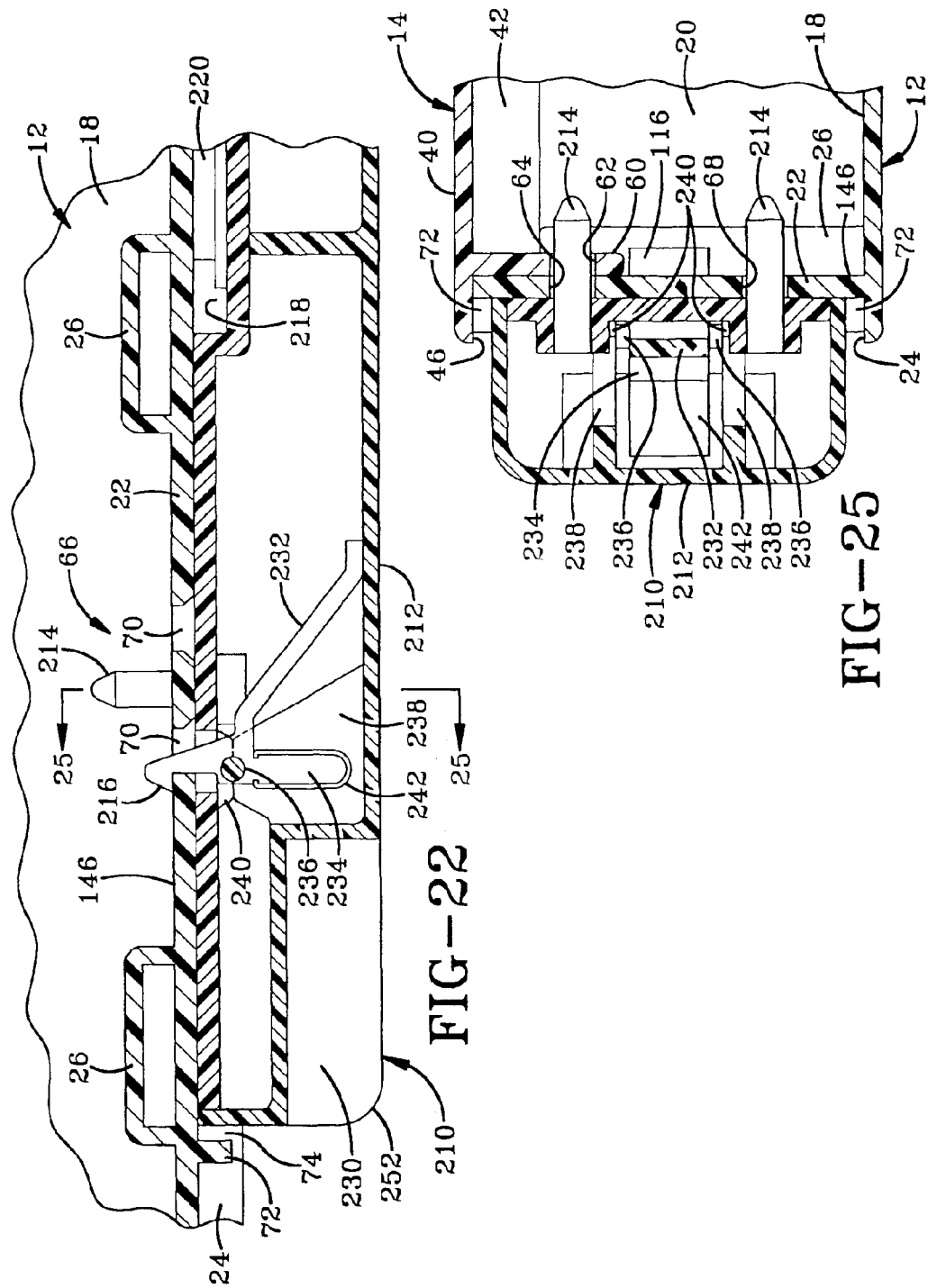

FIG-26

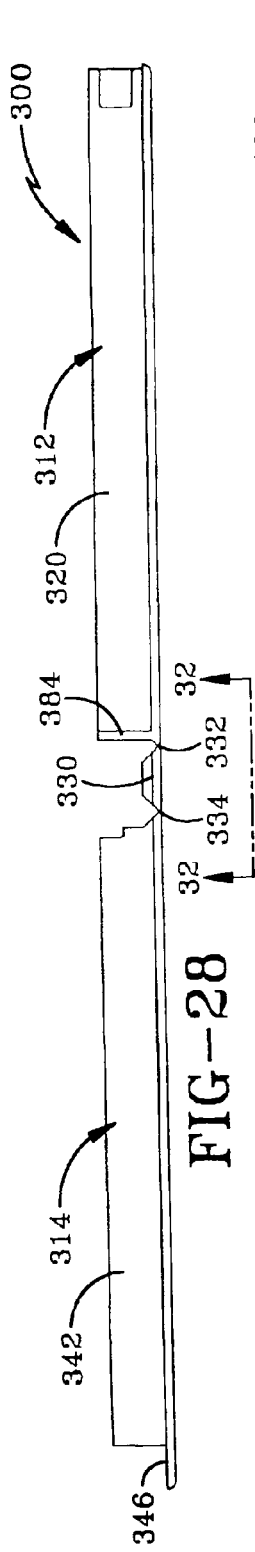
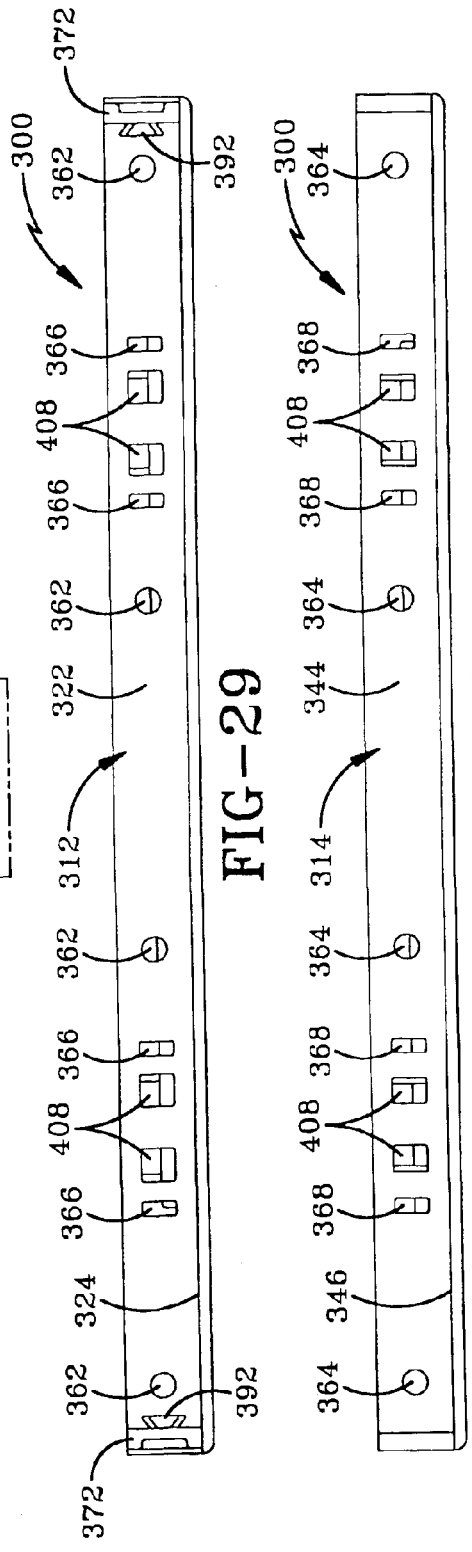
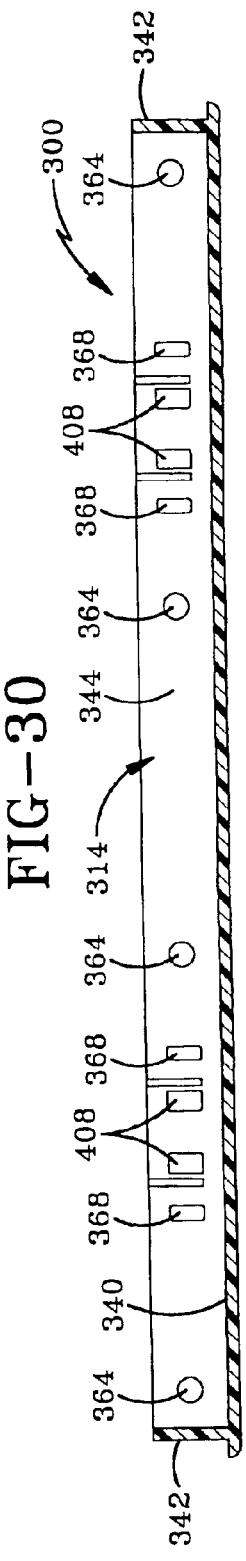

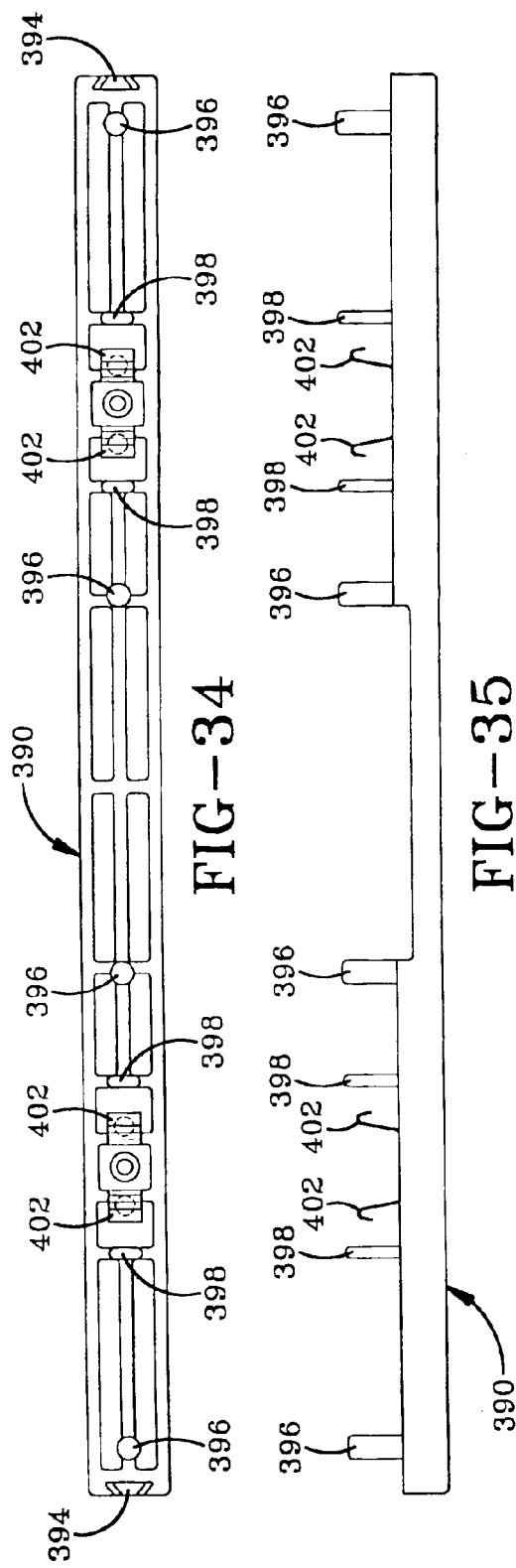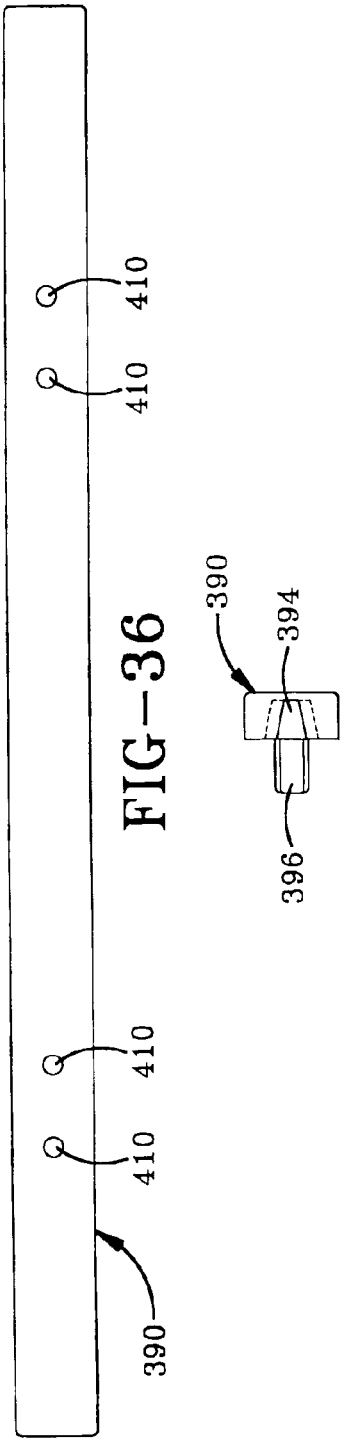

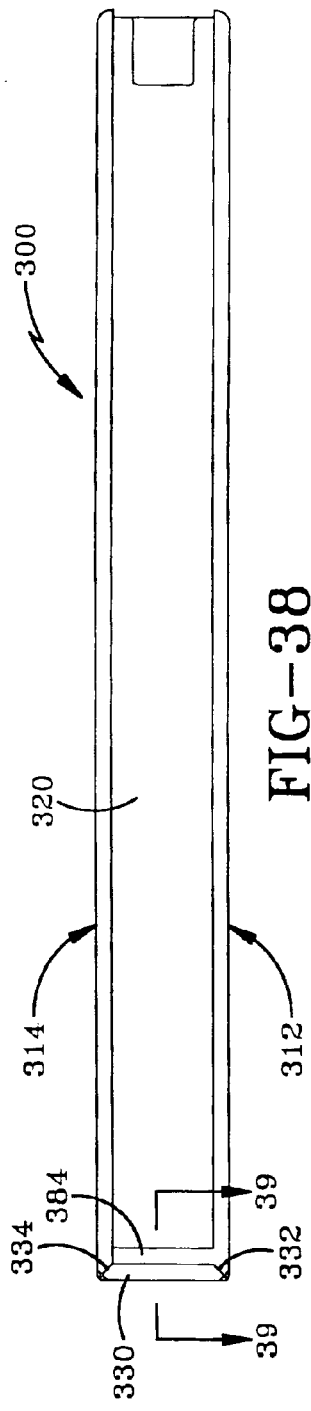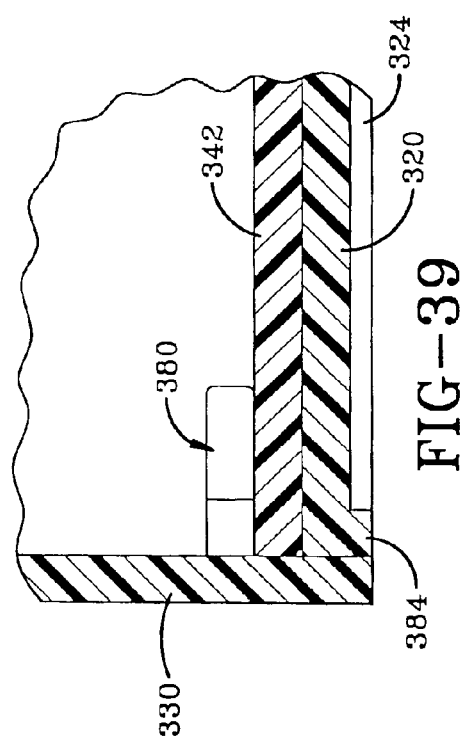

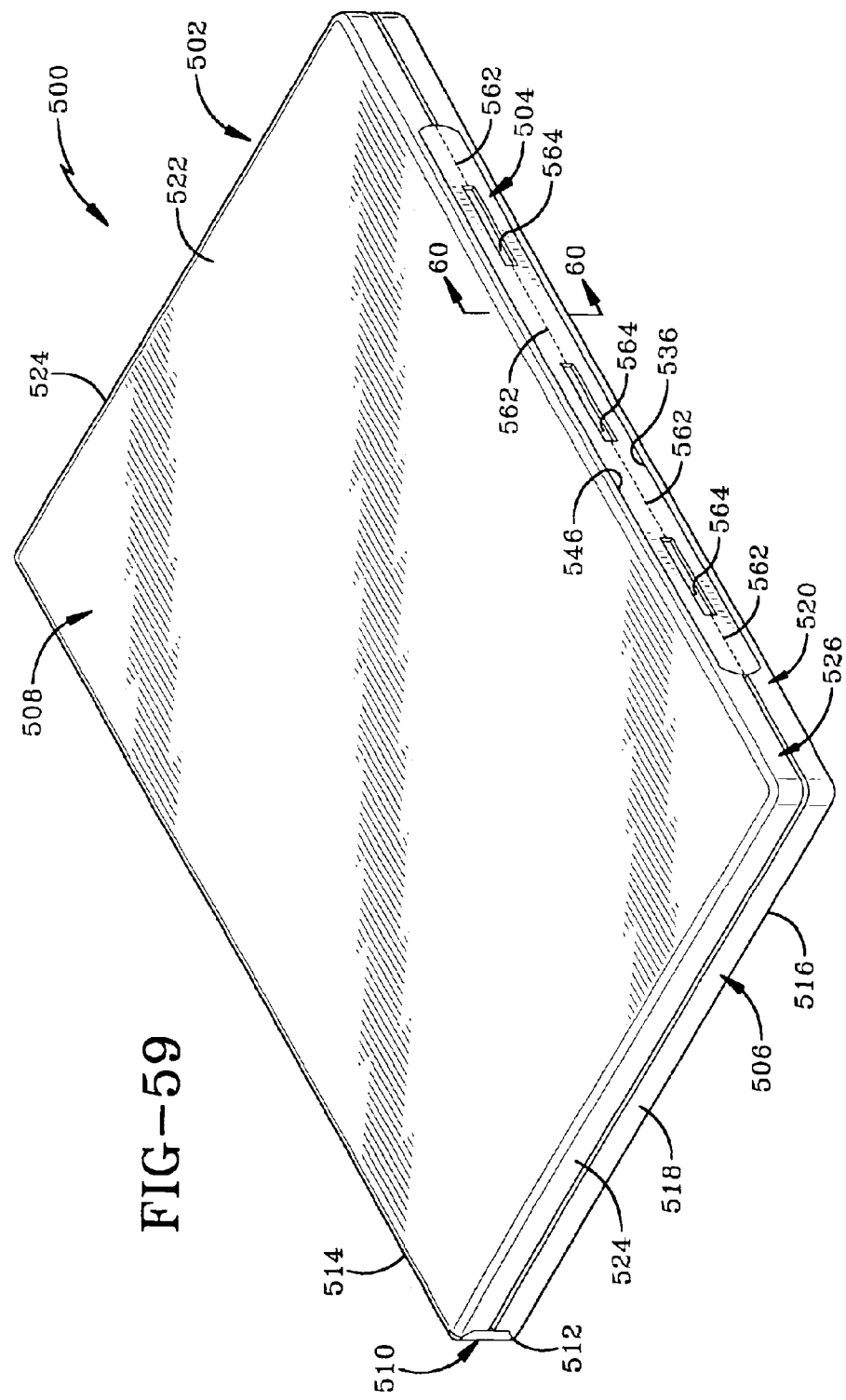

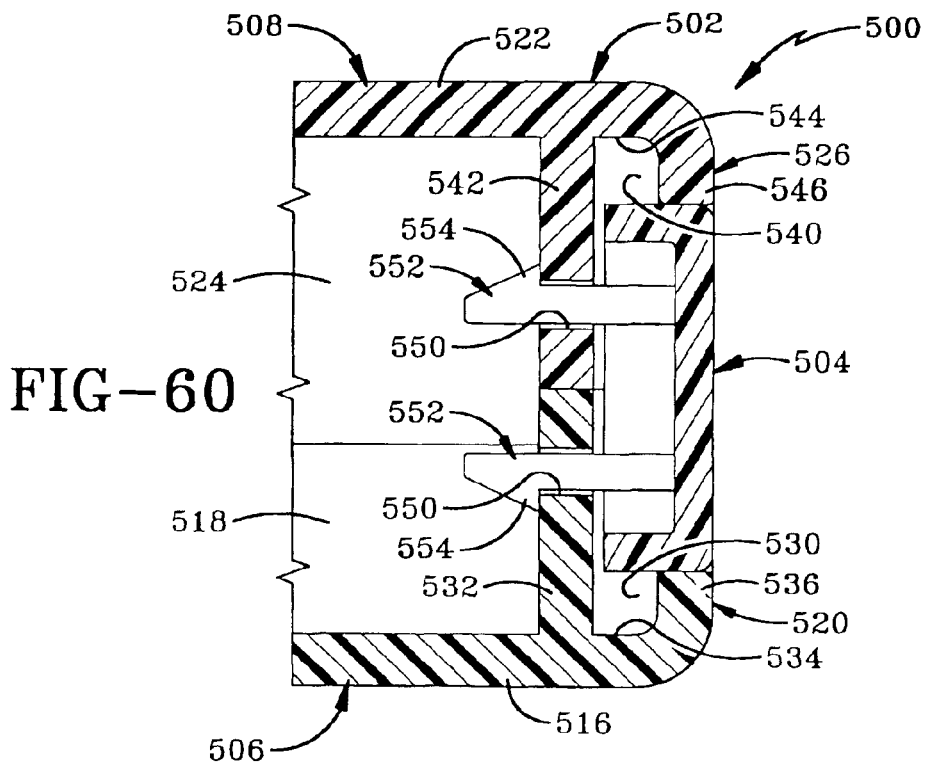
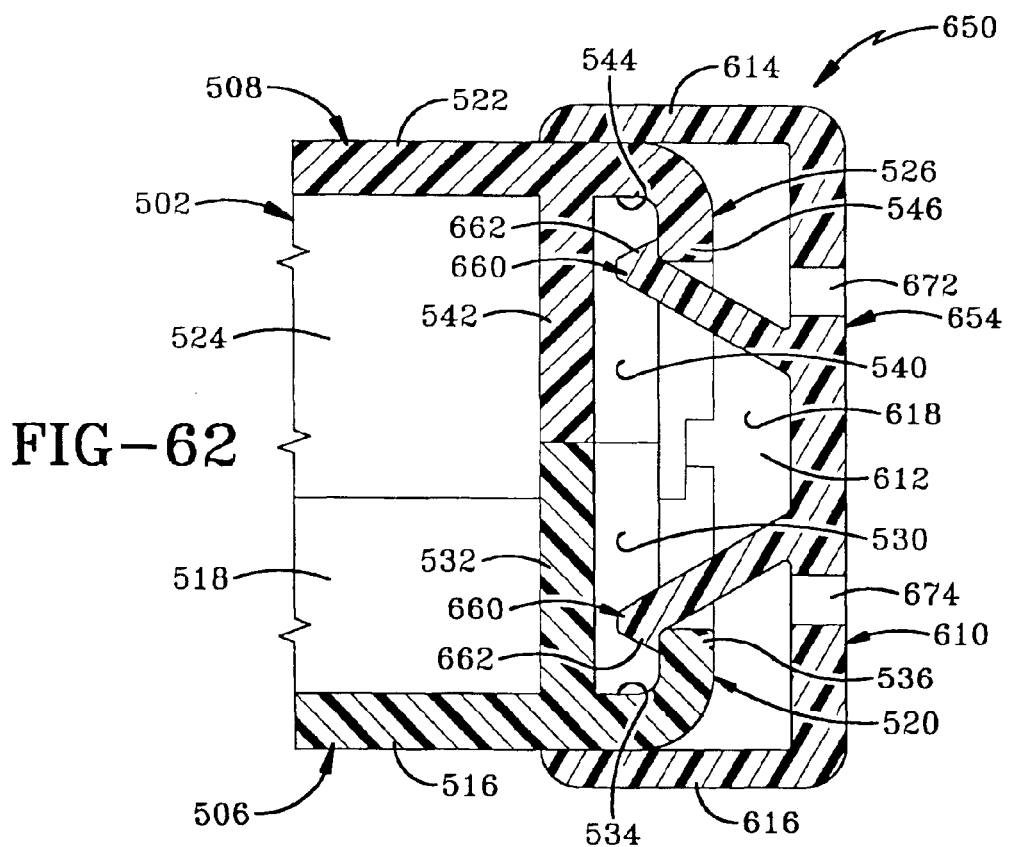

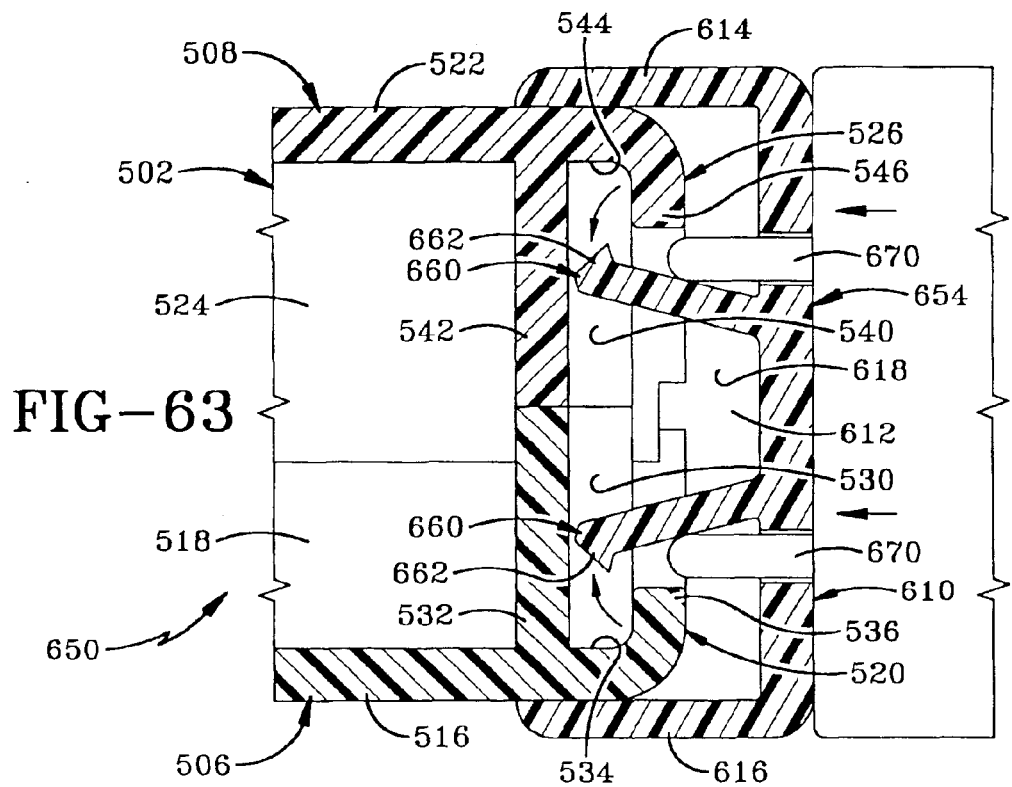
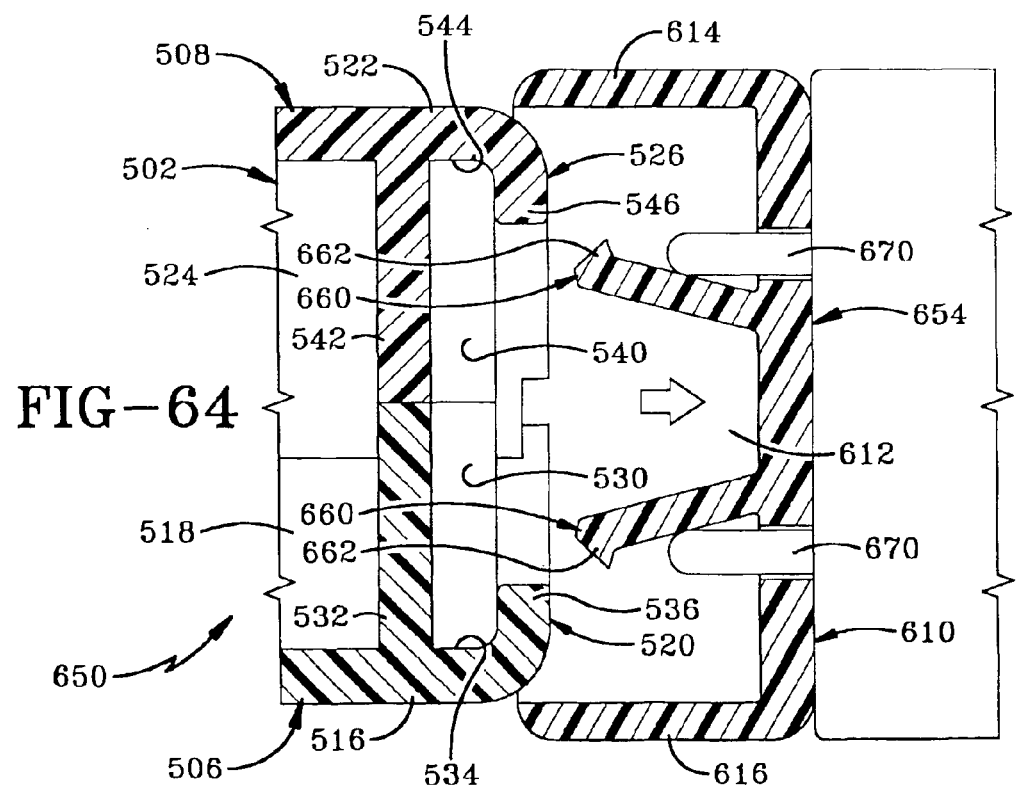

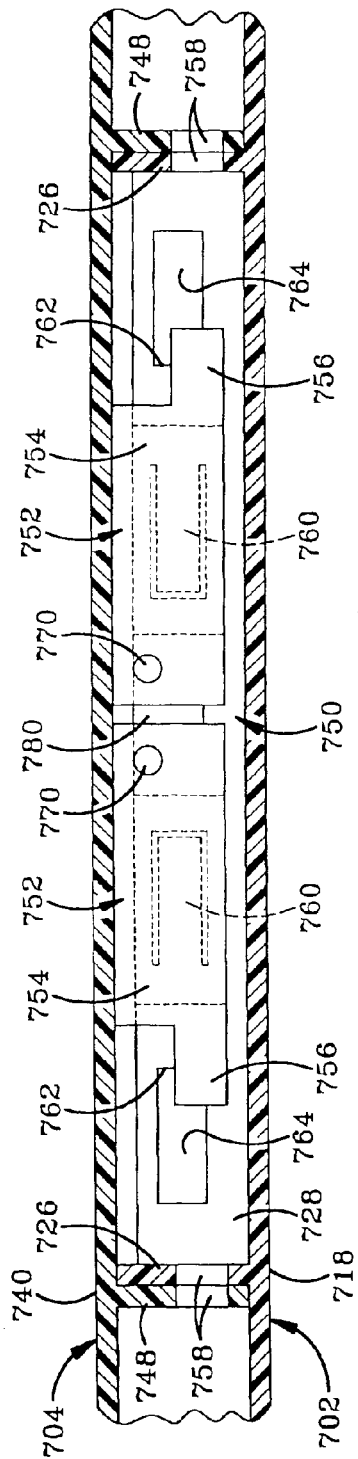
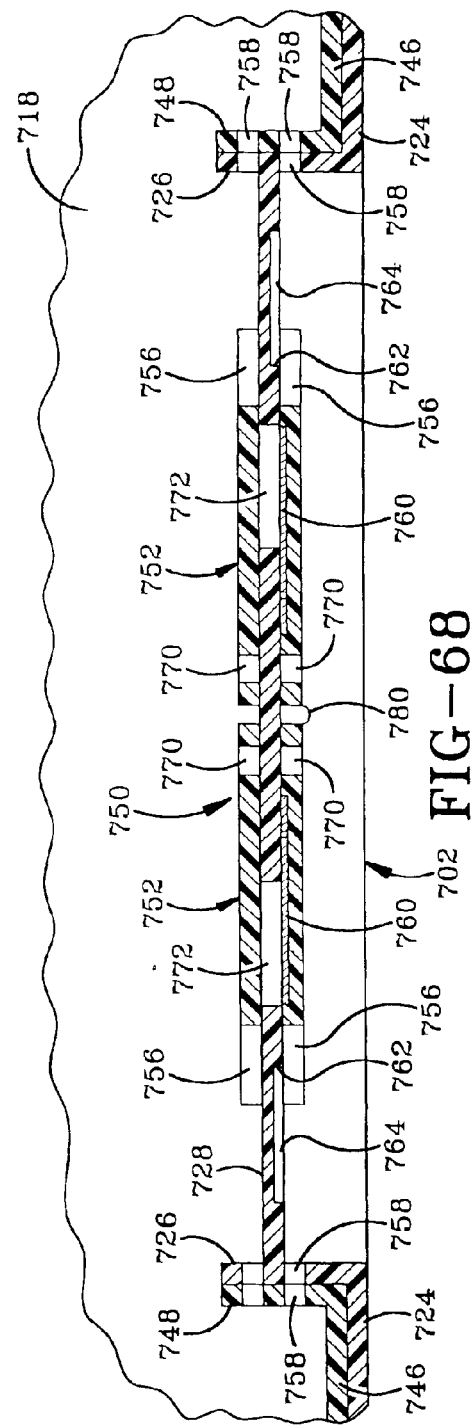

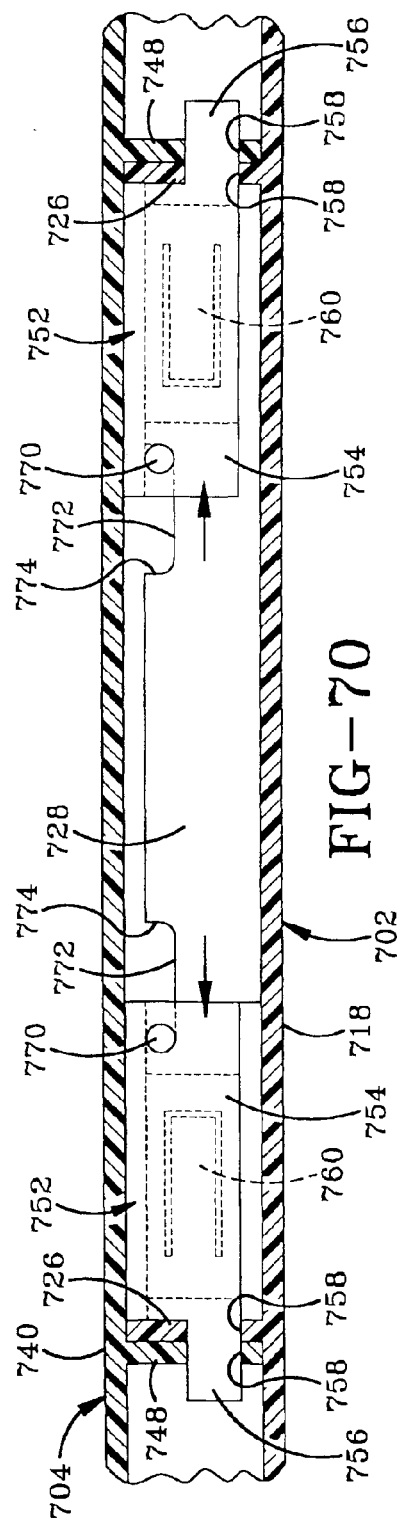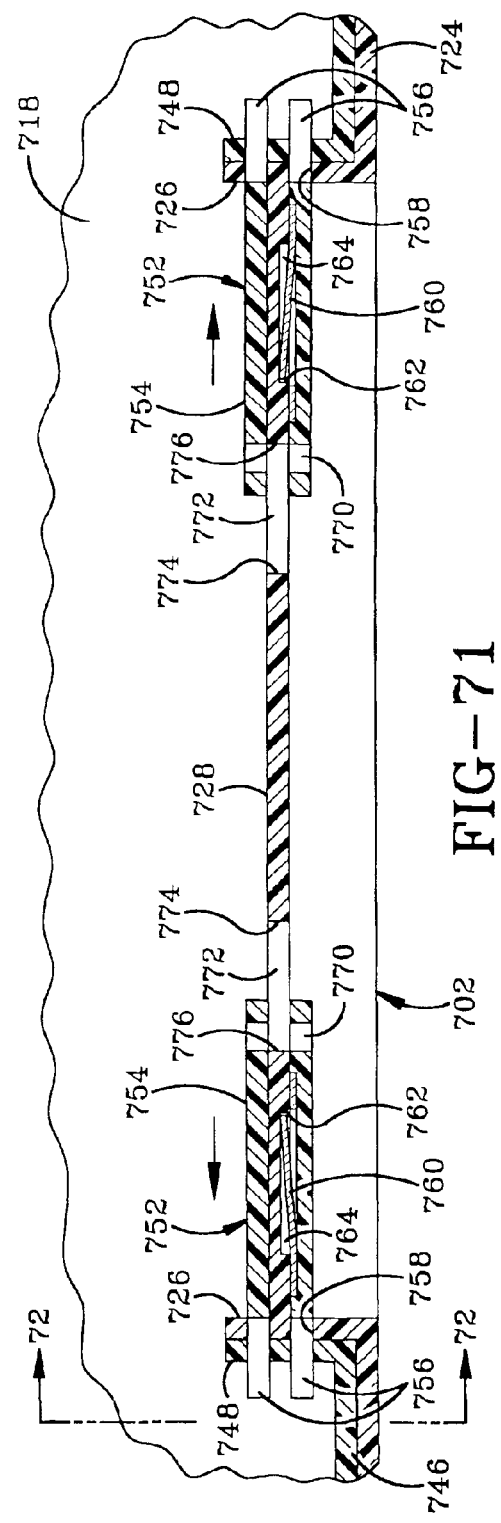

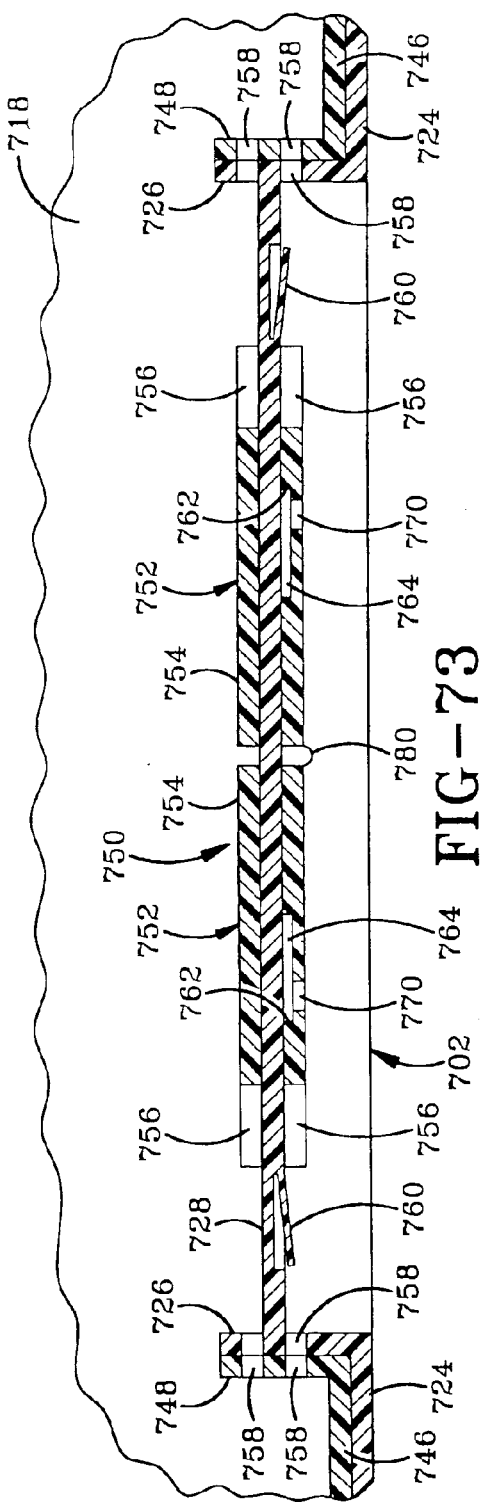
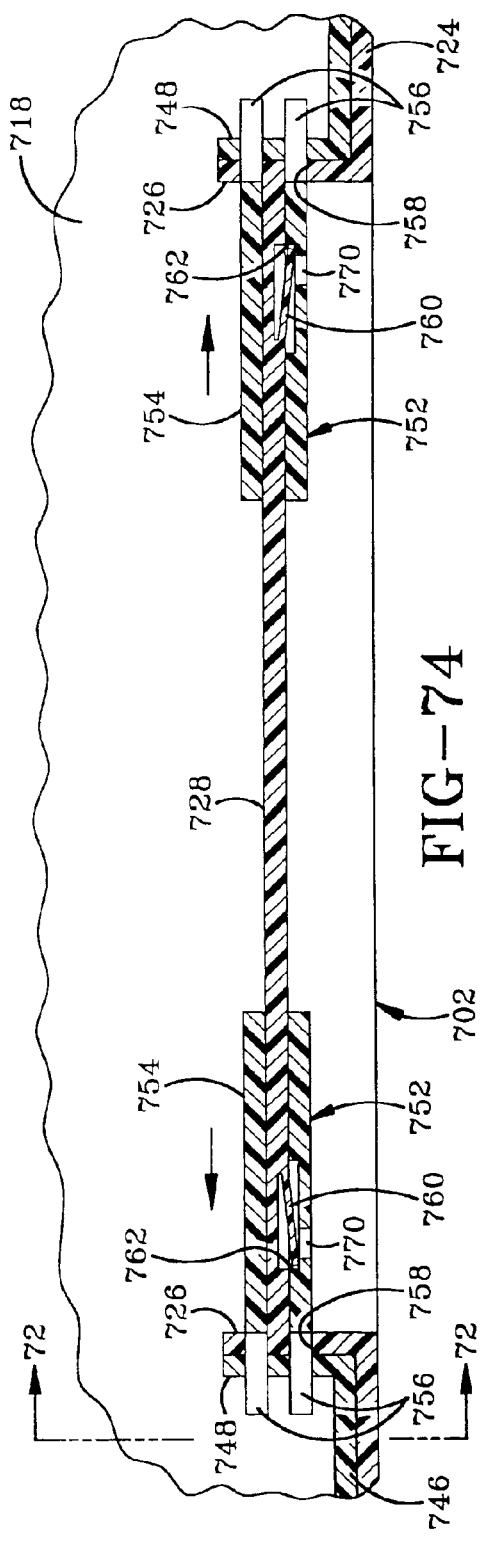
FIG-73
FIG-74

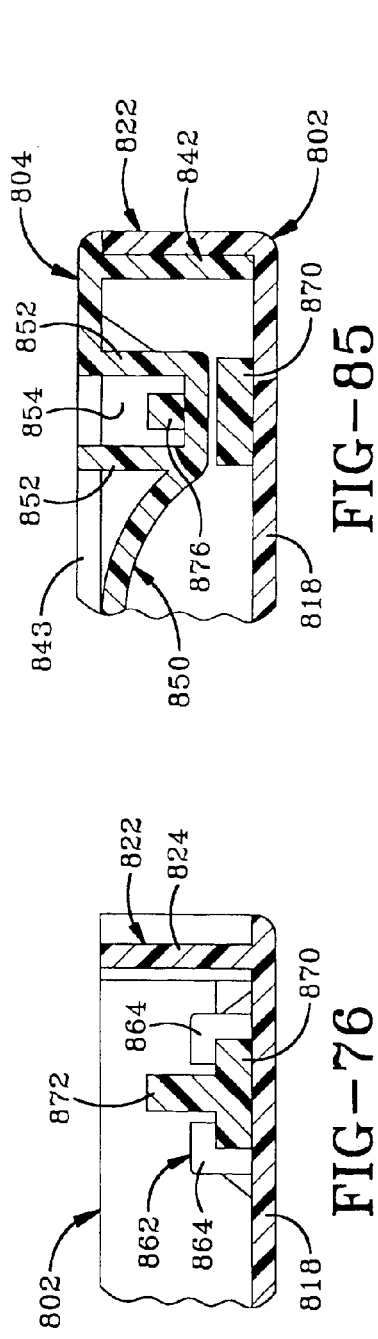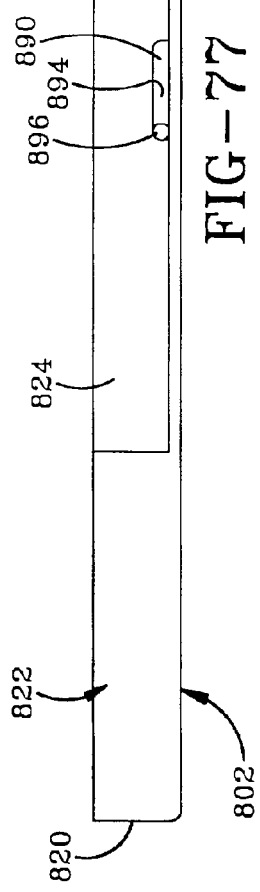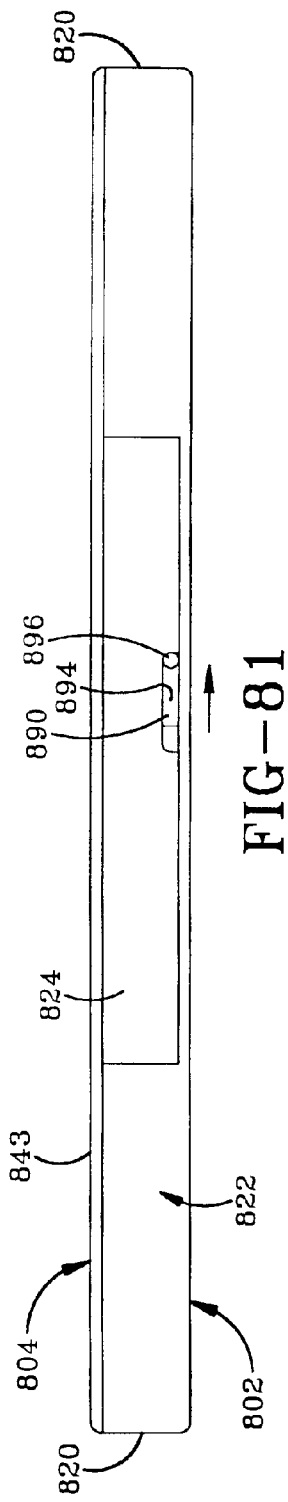

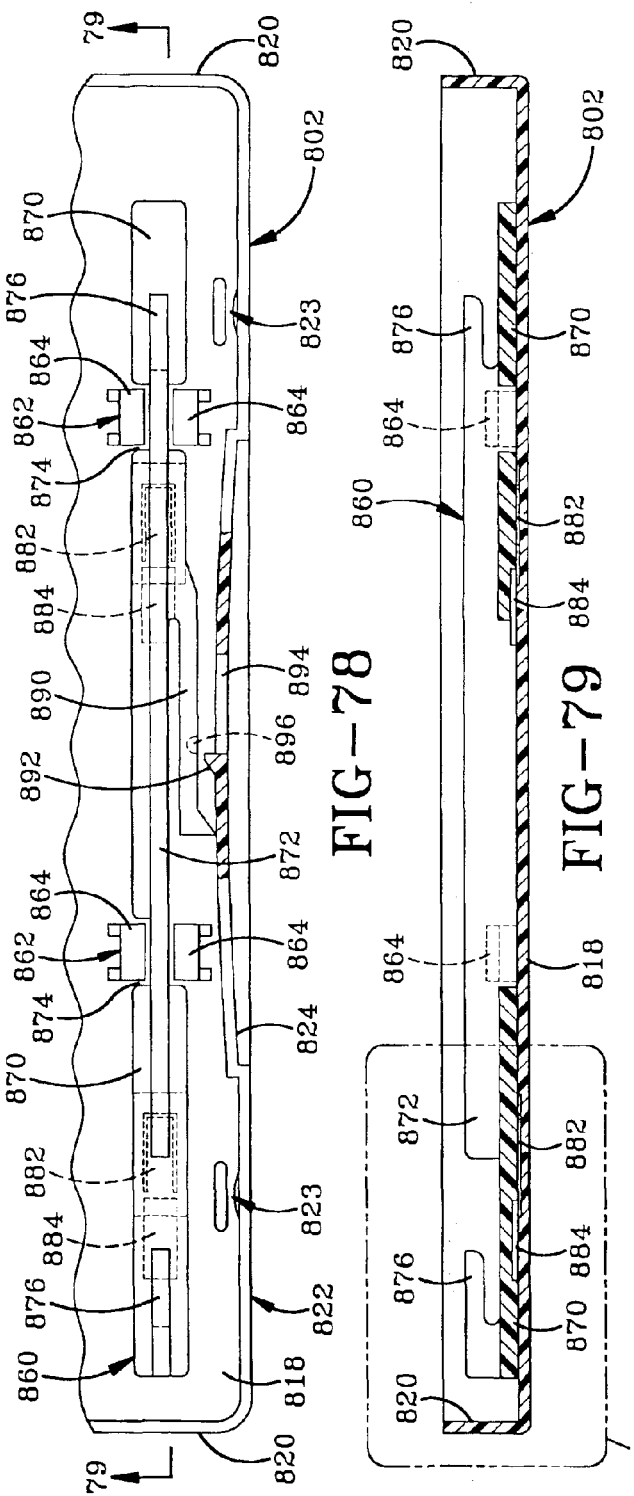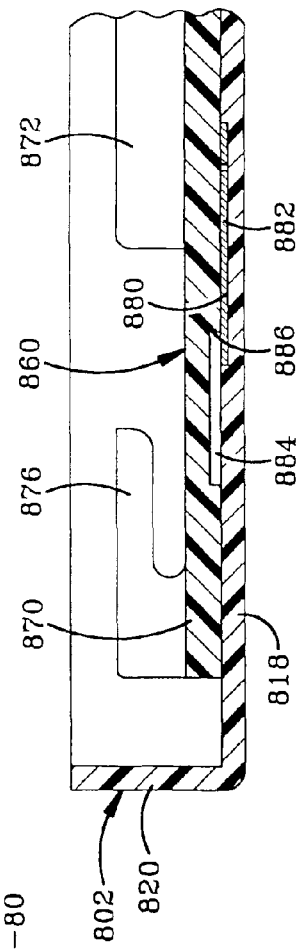

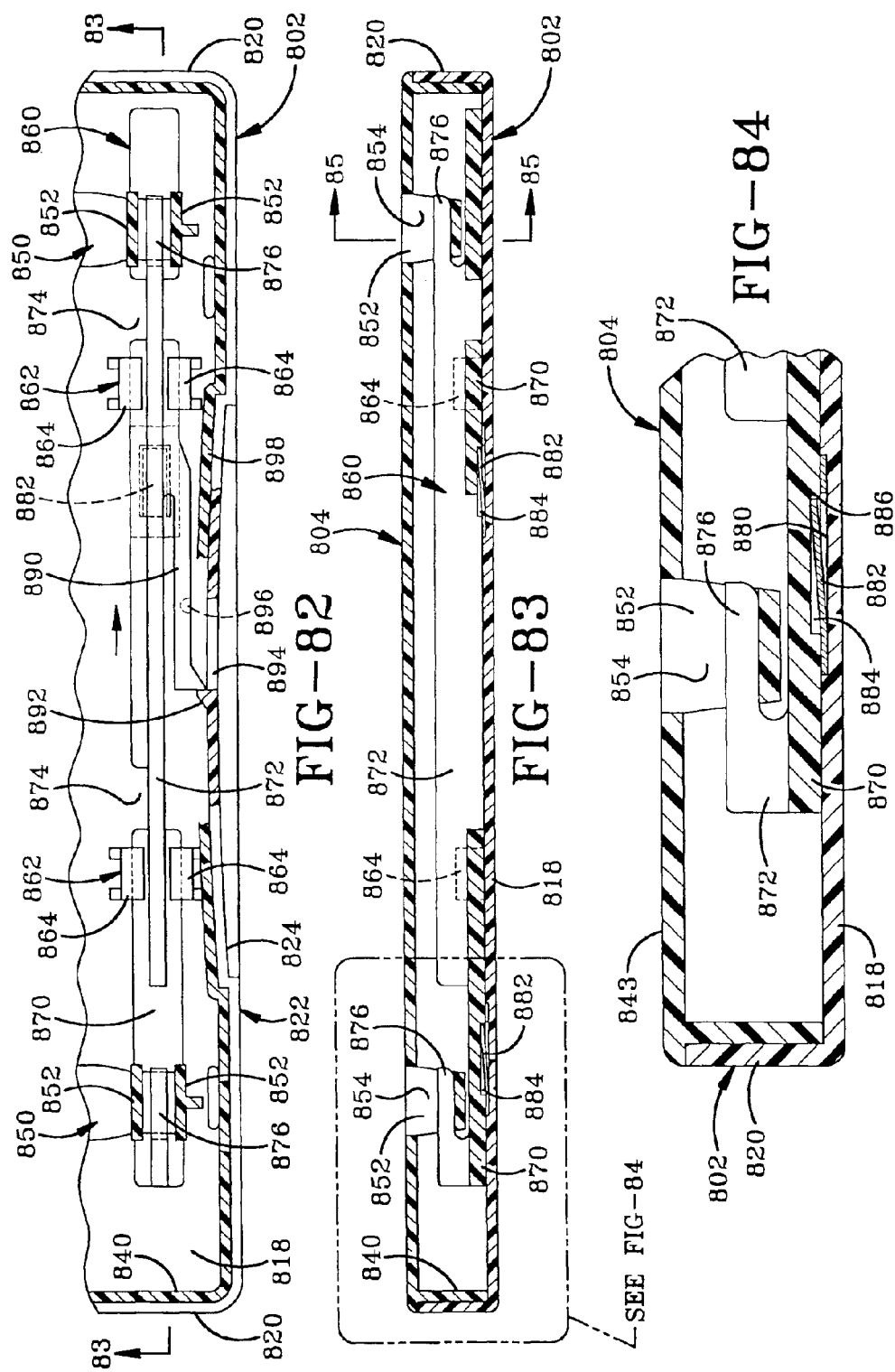

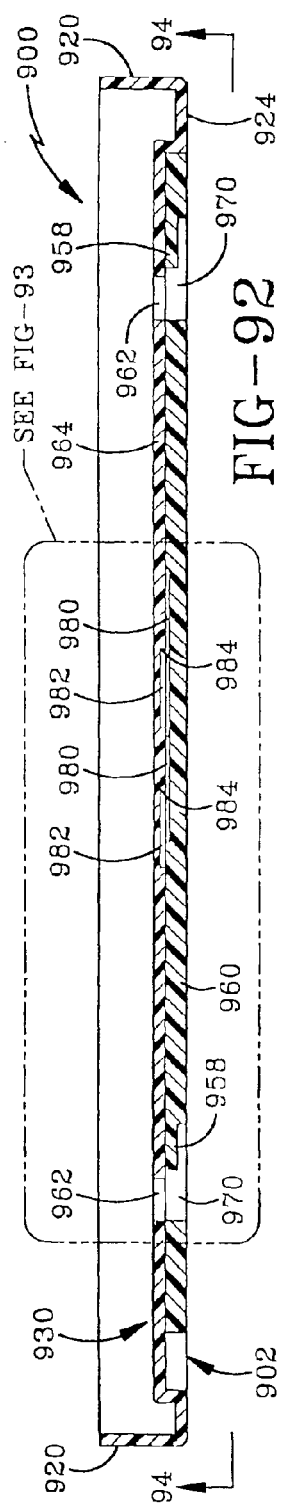
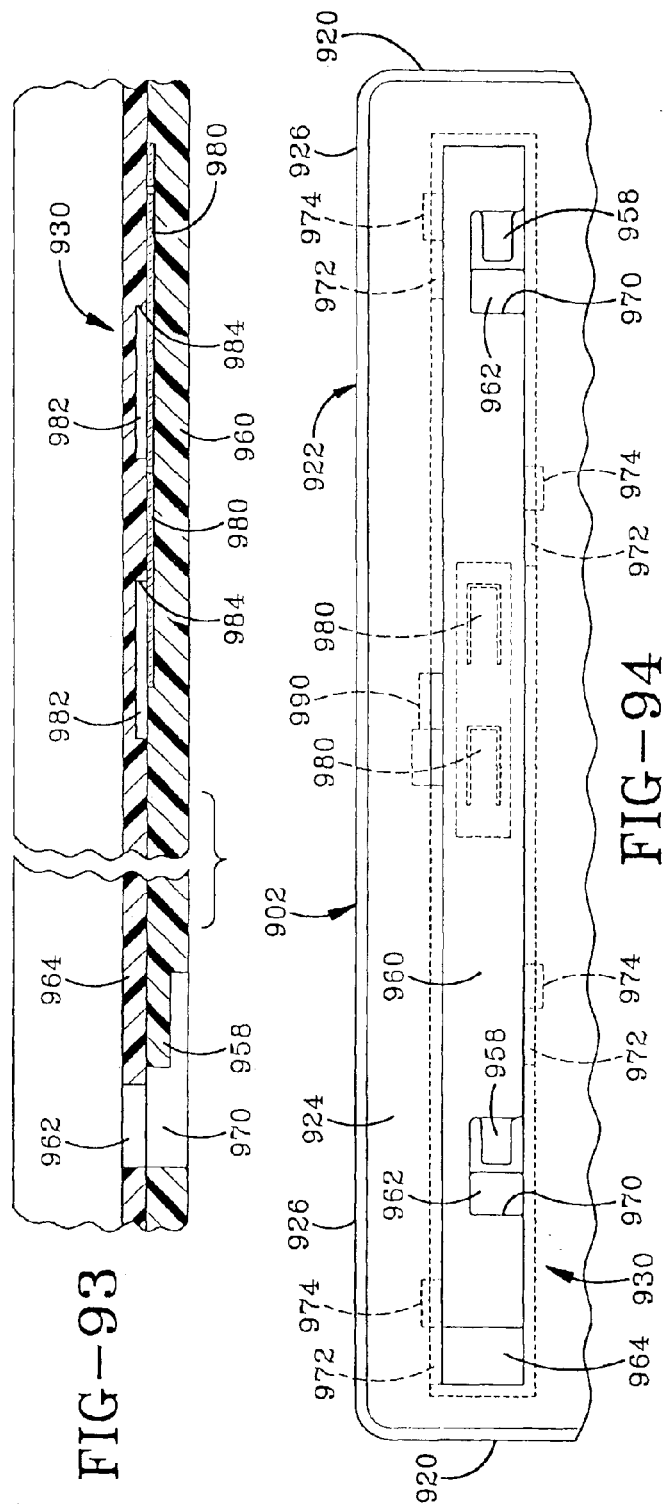

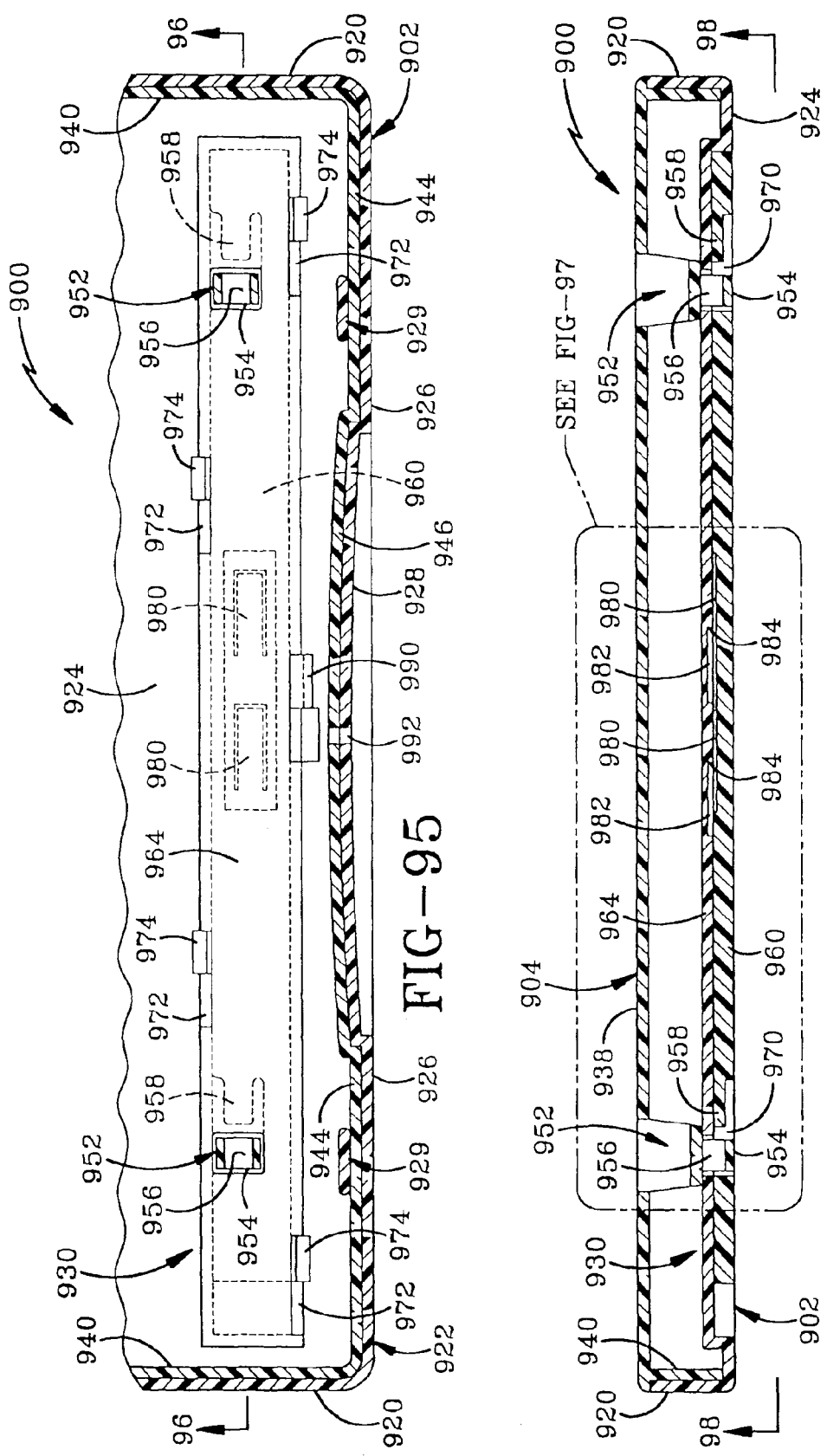

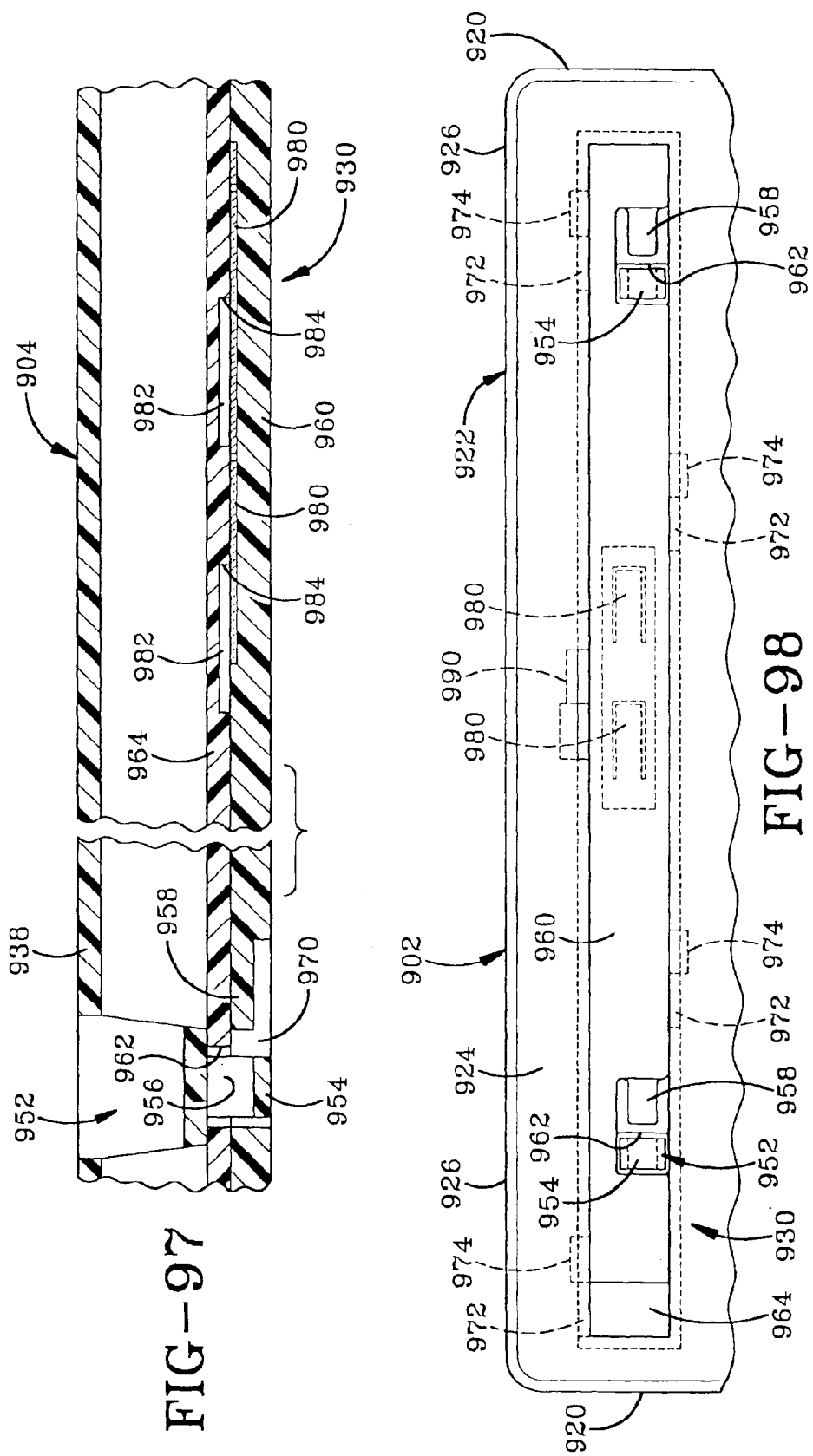

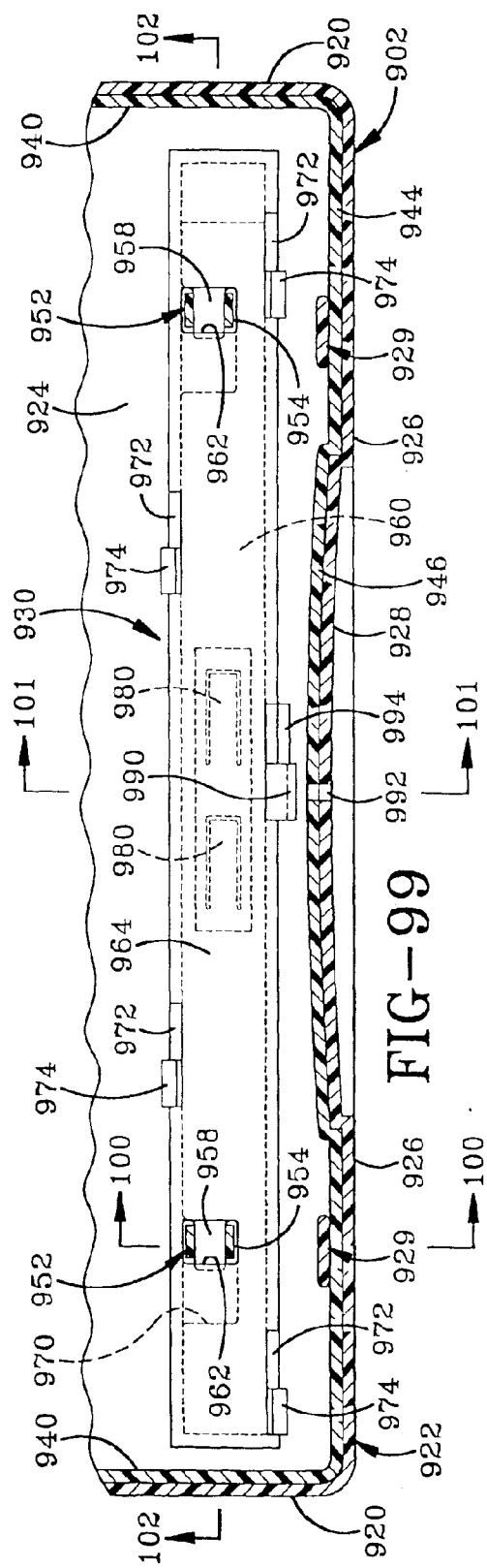
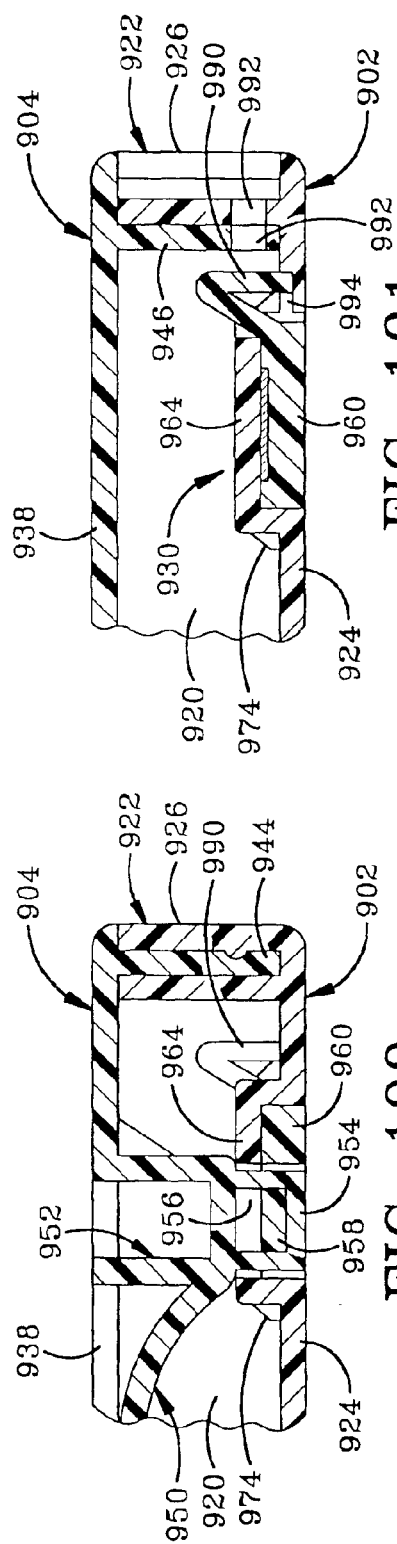
FIG-99
FIG-100
FIG-101

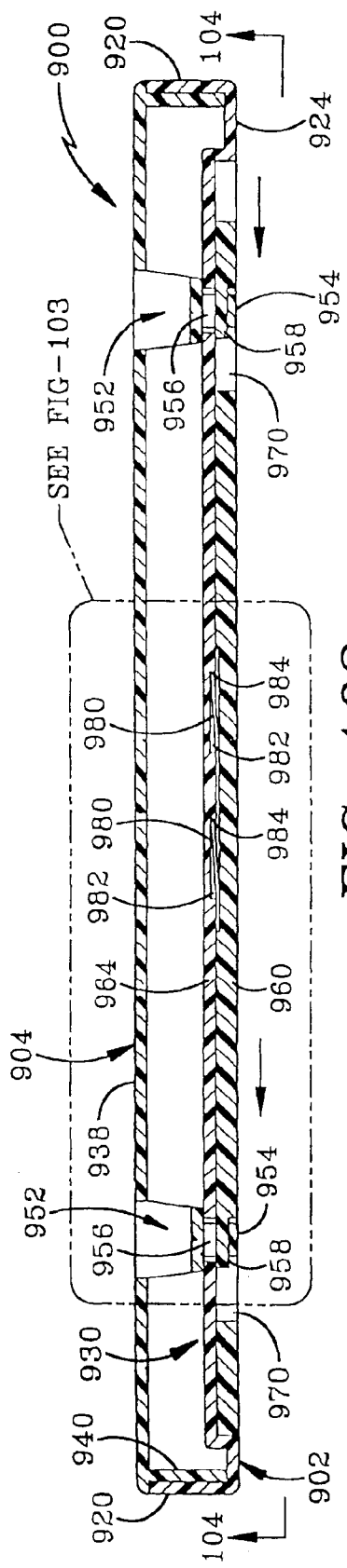
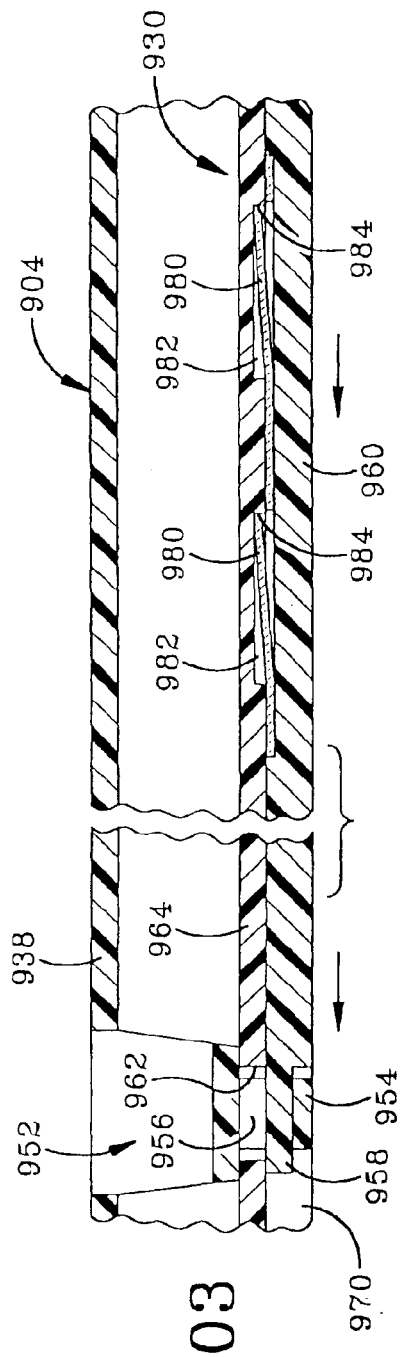
FIG-102
FIG-103

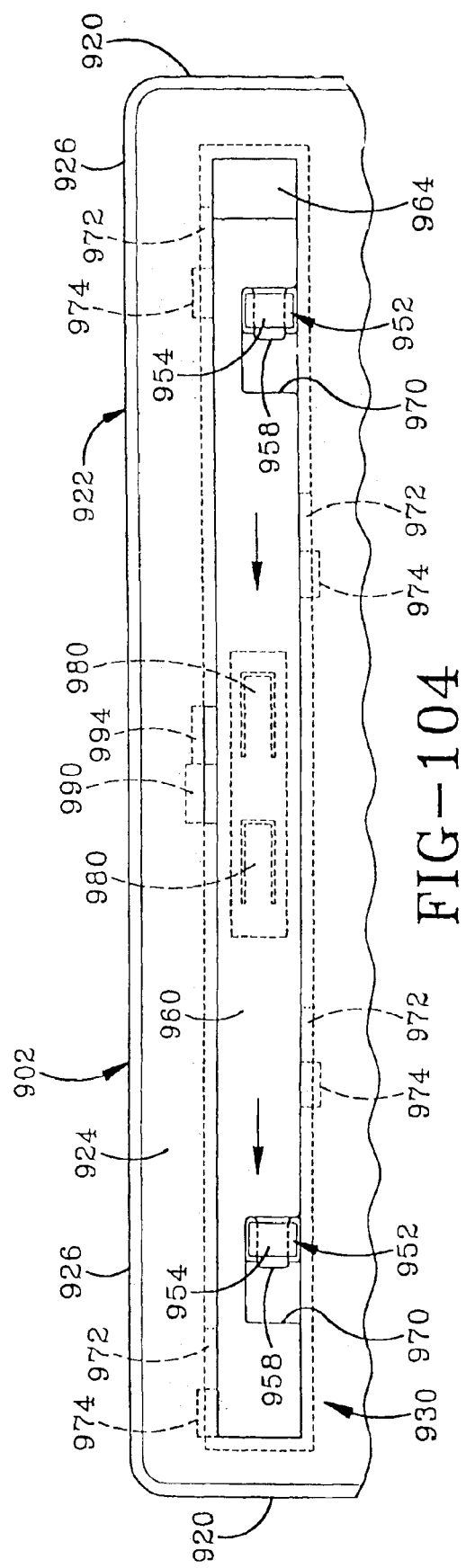

LOCKABLE MEDIA STORAGE BOX WITH LOCK AND KEY

CROSS-REFERENCE TO RELATED APPLICATIONS

This application is a continuation of application Ser. No. 09/711,807, filed Nov. 13, 2000 now U.S. Pat. No. 6,598,742 which is a continuation-in-part of application Ser. No. 09/618,652, filed Jul. 18, 2000, now U.S. Pat. No. 6,601,701, which is a continuation-in-part of application Ser. No. 09/317,554, filed May 24, 1999, now U.S. Pat. No. 6,135,280, which is a continuation of application Ser. No. 09/015,085, filed Jan. 29, 1998, now U.S. Pat. No. 5,944,185. The disclosures of U.S. Pat. No. 6,598,742 are incorporated herein by reference.

BACKGROUND OF THE INVENTION

1. Technical Field

The present invention is generally related to media storage boxes and, more particularly, to a lockable media storage box.

2. Background Information

Renting items of recorded media such as video cassettes and video games has become immensely popular in recent times given the ever increasing number of items available for home viewing and use as well as the decrease in price of the machines that play the media. Typical rental stores display the items available for rental in storage boxes that protect the items from dust, ultraviolet light, and damage from impact if accidentally dropped. Stores protect themselves against theft by placing one or more EAS tags on or inside the item of recorded media. An EAS tag is adapted to activate an alarm when passed through a sensing device that may be disposed around the exit of the store. It is generally desirable to place the EAS tags in places where they cannot be easily removed by a shoplifter.

A rental establishment typically places older rental stock out for sale when it no longer needs the item for rental. When items are put out for sale, the EAS tags are removed from the items and reused on items that are being rented. The EAS tags are removed from the items of recorded media prior to sale so that the purchaser will not activate the alarm systems in other stores with the EAS tags. Without the EAS tags in the items themselves, a rental store must protect itself against shoplifting by placing an EAS tag on the storage container holding the item for sale. It is desirable that the EAS tag be placed on the storage container in a way that allows a sales clerk to quickly and easily remove the tag after the sale is made but also in a manner that prevents a shoplifter from easily removing the tag. Placement of the EAS tag in such a position is, however, difficult because a storage container provides few, if any, areas where the EAS tag may be hidden. If the EAS tag is placed on the storage container in a fashion such that it can be easily removed, a shoplifter may simply remove the tag and steal the item without activating the alarm. It is thus desired in the art to provide a storage container suitable for holding and displaying an item of recorded media during display for rental that has locking holes that can later accept a lock containing an EAS tag when the container is used to sell an item.

Such a storage box and lock combination must be configured to prevent the thief from simply breaking the lock off the storage box with a small pry bar. Although the storage box and lock must be relatively strong, the cost of manufacturing the lock and storage box must not be prohibitive.

It is thus also desired in the art to provide a relatively inexpensive storage box and lock and key combination that securely locks the storage box while preventing a pry bar from being inserted between the lock and the storage box.

SUMMARY OF THE INVENTION

The present invention provides a lockable media storage box having a base and a lid connected to the base with at least one hinge. The base and lid include elements that cooperate with a locking member to allow the lid to be locked in the closed position.

The invention provides a lid and a base that have locking holes that are aligned when the lid is closed. A lock member is disposed through both locking holes to lock the lid in the closed position. The invention provides a lock member that is slidably carried on one of the lids and the base. In other embodiments of the invention, the lock member may be removably mounted to the storage container. The invention provides magnetically actuated and mechanically actuated locks.

BRIEF DESCRIPTION OF THE DRAWINGS

FIG. 3 is a front view of the first embodiment of lock for the media storage box of FIG. 1.

FIG. 4 is a top view of the lock depicted in FIG. 3.

FIG. 5 is a rear view of the lock depicted in FIG. 3.

FIG. 6 is a top view of a key for the lock depicted in FIG. 3.

FIG. 7 is a rear view of the key depicted in FIG. 6.

FIG. 8 is a side view of the key depicted in FIG. 6 taken from the left side;

FIG. 9 is a sectional view taken along line 9—9 of FIG. 7.

FIG. 10 is a front view of the first embodiment of the lock in locked engagement with the media storage box depicted in FIG. 1.

FIG. 17 is a front view of a second embodiment of a lock for the media storage box of FIG. 1.

FIG. 18 is a top view of the lock depicted in FIG. 17.

FIG. 19 is a rear view of the lock depicted in FIG. 17.

FIG. 20 is a top view of a key for the lock depicted in FIG. 17.

FIG. 21 is a front view of the second embodiment of the lock in locked engagement with the media storage box depicted in FIG. 1.

FIG. 22 is a sectional view taken along line 22—22 of FIG. 21 showing one locking finger of the lock engaging a locking hole of the media storage box.

FIG. 25 is a sectional view taken along line 25—25 in FIG. 22 showing the locking pins of the lock engaged with the locking holes of the media storage box.

FIG. 26 is a perspective view of alternative embodiment of the media storage box having locking holes according to the concepts of the present invention.

FIG. 28 is a side elevational view of the security storage container in an open configuration.

FIG. 29 is a front elevational view of the base portion of the security storage container of FIG. 27.

FIG. 30 is a front elevational view of the lid portion of the security storage container of FIG. 27.

FIG. 31 is a sectional view taken along line 31—31 of FIG. 27.

FIG. 34 is a rear elevational view of the lock for the container of FIG. 27.

FIG. 35 is a side elevational view of the lock of FIG. 34.

FIG. 36 is a top plan view of the lock of FIG. 34.

FIG. 37 is a side elevational view of the lock of FIG. 34.

FIG. 38 is a side view of the security storage container in a closed configuration.

FIG. 39 is a sectional view taken along line 39—39 of FIG. 38.

FIG. 59 is a perspective view of another embodiment of the security storage container of the present invention.

FIG. 60 is a sectional view taken along line 60—60 of FIG. 59.

FIG. 62 is a sectional view taken along line 62—62 of FIG. 61.

FIG. 63 is a view similar to FIG. 62 showing a key being inserted into the lock to remove the lock from the container.

FIG. 64 is a view similar to FIG. 62 showing the lock being removed from the container.

FIG. 67 is a sectional view taken in front of the locking members looking into the storage container with the lid in the closed position.

FIG. 68 is a sectional view looking down through the locking members and portions of the front walls of the lid and base.

FIG. 70 is a sectional view similar to FIG. 67 showing the locking members in the locked position.

FIG. 71 is a sectional view similar to FIG. 68 showing the locking members in the locked position.

FIG. 73 is a sectional view similar to FIG. 68 showing an alternative embodiment of the invention.

FIG. 74 is a view similar to FIG. 73 showing the lock members in the locked position.

FIG. 76 is a sectional view taken substantially along line 76—76 of FIG. 75.

FIG. 77 is a front elevational view of the front wall of the base of the storage container.

FIG. 78 is an enlarged top plan view of the locking mechanism of the base with a portion of the front wall of the base broken away to show the opening for the key.

FIG. 79 is a sectional view taken substantially along line 79—79 of FIG. 78.

FIG. 80 is an enlarged view of the encircled portion of FIG. 79.

FIG. 81 is a view similar to FIG. 77 showing the lid in the closed position and the lock being moved to the locked position.

FIG. 82 is a sectional view looking down on the lock mechanism with the lock in the locked position and portions of the front wall of the lid broken away for clarity.

FIG. 83 is a view similar to FIG. 79 with the locking mechanism in the locked position.

FIG. 84 is an enlarged view of the encircled portion of FIG. 84.

FIG. 85 is a sectional view taken along line 85—85 of FIG. 83.

FIG. 89 is an enlarged top plan view of the locking mechanism and front wall of the base.

FIG. 90 is a sectional view taken along line 90—90 of FIG. 89.

FIG. 91 is a sectional view taken along line 91—91 of FIG. 89.

FIG. 92 is a sectional view taken along line 92—92 of FIG. 89.

FIG. 93 is an enlarged view of the encircled portion of FIG. 92.

FIG. 94 is a view taken along line 94—94 of FIG. 92.

FIG. 95 is a sectional view similar to FIG. 89 taken from just below the top wall of the lid looking down on the lock mechanism with the lock mechanism in the unlocked position.

FIG. 96 is a sectional view taken along line 96—96 of FIG. 95.

FIG. 97 is an enlarged view of the encircled portion of FIG. 96.

FIG. 98 is a view taken along line 98—98 of FIG. 96.

FIG. 99 is a view similar to FIG. 95 showing the locking mechanism in the locked position.

FIG. 100 is a sectional view taken along line 100—100 of FIG. 99.

FIG. 101 is a sectional view taken along line 101—101 of FIG. 99.

FIG. 102 is a sectional view taken along line 102—102 of FIG. 99.

FIG. 103 is an enlarged view of the encircled portion of FIG. 102.

FIG. 104 is a view taken along line 104—104 of FIG. 102.

Similar numbers refer to similar parts throughout the specification.

DESCRIPTION OF THE PREFERRED EMBODIMENTS

Figure 1:
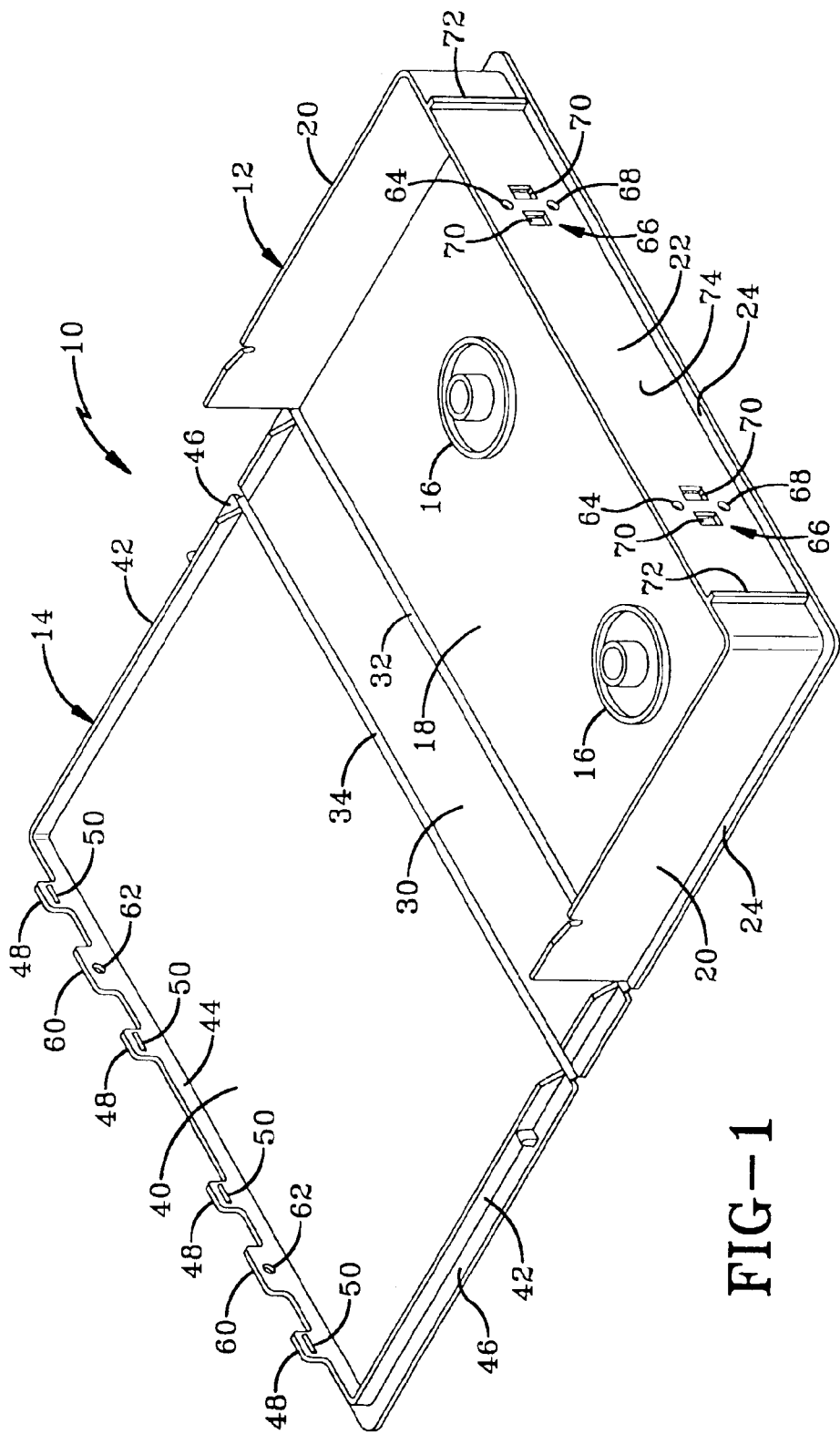
FIG. 1 is a front perspective view of an open media storage box having locking holes according to the concepts of the present invention.
Figure 2:
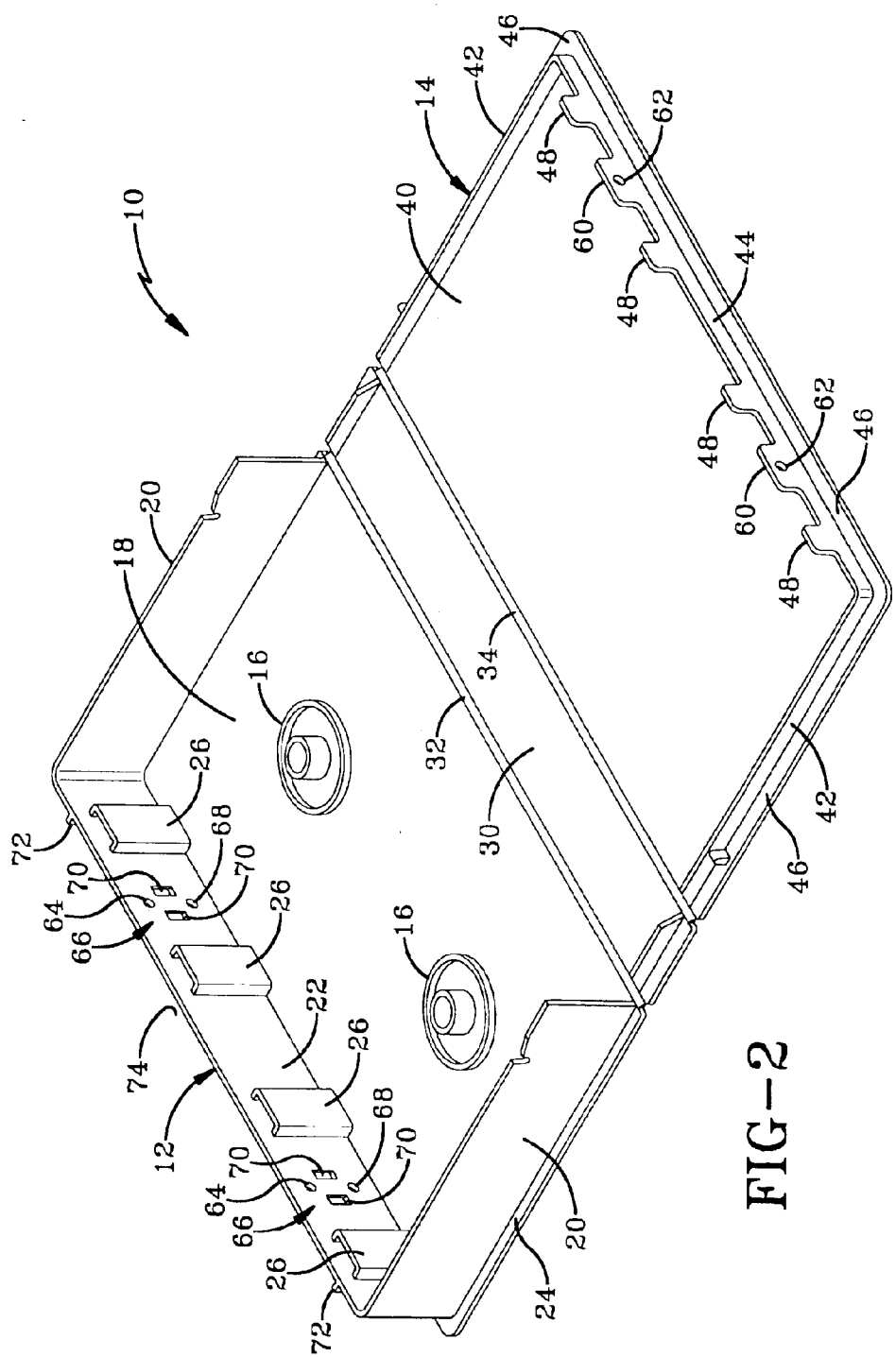
FIG. 2 is a rear perspective view of the storage box depicted in FIG. 1.

The lockable media rental box or storage container of the present invention is indicated generally at 10 in the accompanying drawings. Box 10 generally includes a base, indicated generally at 12, and a lid, indicated generally at 14, that is hingedly connected to base 12 and movable between open and closed positions. The open position is depicted in FIGS. 1 and 2 with the closed position being depicted in all of the other Figures where box 10 appears. When box 10 is in the open position, an item of recorded media (not shown) may be placed into box 10 or removed from box 10. A pair of hubs 16 may be attached to base 12 to help retain the item of recorded media when it is received in box 10. It is to be noted that the particular embodiment of box 10 depicted in the Figures is designed and configured for holding a VHS video cassette. The concepts of the present invention may be employed with a wide variety of differently shaped boxes 10 configured to hold other types of recorded media such as video game cartridges, cassette tapes, compact discs, DVD's, computer discs, and the like. The VHS video cassette embodiment being depicted only to provide an example of the present invention and to provide an embodiment on which to describe the elements of the invention and their interrelationship.

Base 12 generally includes a bottom wall 18 from which projects a pair of sidewalls 20 and a front wall 22. Sidewalls 20 are connected to front wall 22 to provide strength to box 10. Sidewalls 20 and front wall 22 are inwardly disposed from the outer perimeter of bottom wall 18 such that a lower ledge is formed by the portion of bottom wall 18 that extends beyond walls 20 and 22. Base 12 further includes at least but preferably a plurality of retaining channels 26 extending inwardly from front wall 22. Each retaining channel includes an inner protuberance 28 that may be perhaps seen in FIG. 15.

Box 10 further includes a rear wall 30 that is connected to base 12 by a first living hinge 32. Rear wall 30 is connected to lid 14 by a second living hinge 34. Both living hinges 32 and 34 are substantially continuous along the length of rear wall 30. The implementation of two hinges 32 and 34 allows rear wall 30 to be folded downwardly away from sidewalls 20 such that an item of recorded media may be more easily removed and inserted into box 10.

Figures 14, 15:
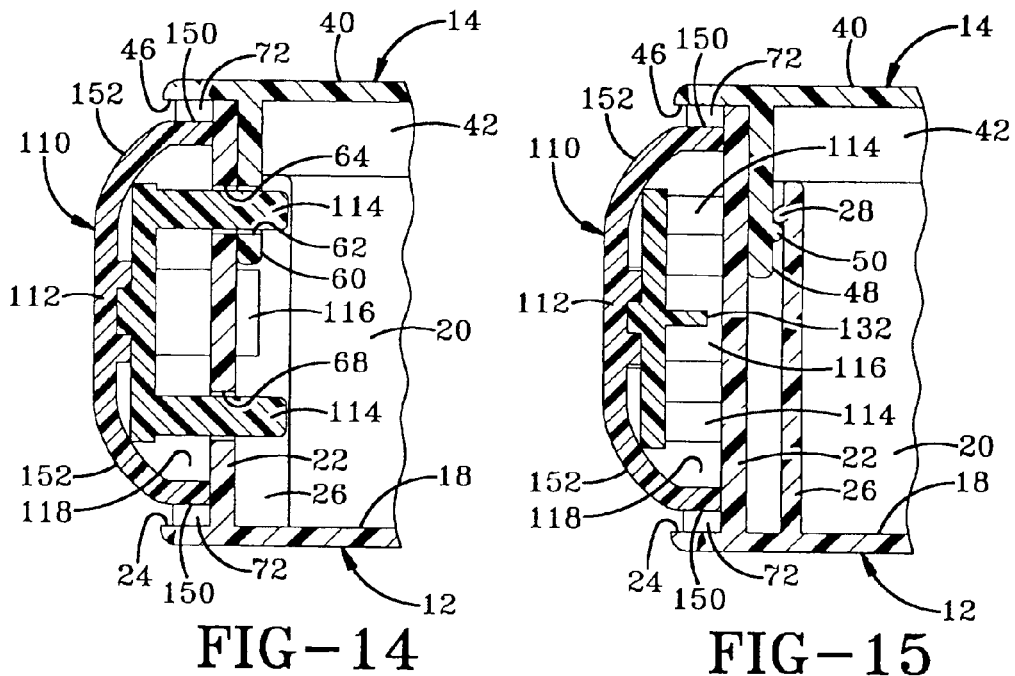
FIG. 14 is a sectional view taken along line 14—14 of FIG. 11 showing the locking pins of the lock in fully engaged positions.
FIG. 15 is a sectional view taken along line 15—15 of FIG. 11 showing one of the locking tabs of the lid in a fully engaged position.

Lid 14 includes an upper wall 40 from which a pair of sidewalls 42 and a front wall 44 extend. Sidewalls 42 and front wall 44 of lid 14 are also disposed inwardly of the outer perimeter of upper wall 40 such that an upper ledge 46 substantially similar to lower ledge 24 is formed. Walls 42 and 44 of lid 14 are disposed inwardly slightly more than walls 20 and 22 of base 12 such that walls 42 and 44 fit inwardly of walls 20 and 22 when lid 14 is in the closed position. It is desirable that walls 42 and 44 frictionally engage walls 20 and 22 when lid 14 is in the closed position to create a frictional force that helps keep lid 14 in the closed position. In addition to this frictional force, a retaining tab 48 extends from front wall 44 of lid 14 to correspond with each retaining channel 26 of base 12. Each retaining tab 48 includes a protuberance 50 configured to cooperate with inner protuberance 28 when lid 14 is in the closed position to hold lid 14 in the closed position as depicted in FIG. 15.

In accordance with one of the primary objectives of the present invention, box 10 includes elements that enable box 10 to receive a lock that locks lid 14 in the closed position when box 10 is removed from the rental shelf and used to sell an item of recorded media. These elements include the configuration of front wall 22 and at least one locking tab 60 that extends from front wall 44 of lid 14. In accordance with one of the primary objectives of the present invention, box 10 includes at least one locking tab 60, but preferably two locking tabs 60, that extend from lid 14 with each tab 60 having a first locking hole 62 therethrough. Front wall 22 of base 12 includes a second locking hole 64 that is disposed to align with first locking hole 62 of locking tab 60 when lid 14 is in the closed position as depicted in FIG. 14. As will be discussed in more detail below, the alignment of holes 62 and 64 allows box 10 to be locked by an appropriate lock.

Wall 22 may further include a locking hole set 66 that may include second locking hole 64. Each locking hole set 66 may include a third locking hole 68 that is positioned vertically below second locking hole 64 for a purpose described in more detail below. Each locking hole set 66 may also include a pair of locking finger holes that are configured to receive a lock as is described below in more detail.

In accordance with another objective of the present invention, a pair of protection ribs 72 extend between lower ledge 24 and upper ledge 46 when lid 14 is in the closed position. Ribs 72 are disposed outward of locking hole sets 66. Protection ribs 72, lower ledge 24, and upper ledge 46 form a lock reception cavity 74 around locking hole sets 66.

It may thus be understood that box 10 is capable of holding an item of recorded media (not shown) preferably an item that is being repeatedly rented. Box 10 is further capable of storing an item of recorded media while the item is displayed for sale and is configured to receive a lock that prevents lid 14 from being opened when the lock is in place.

Figure 26:
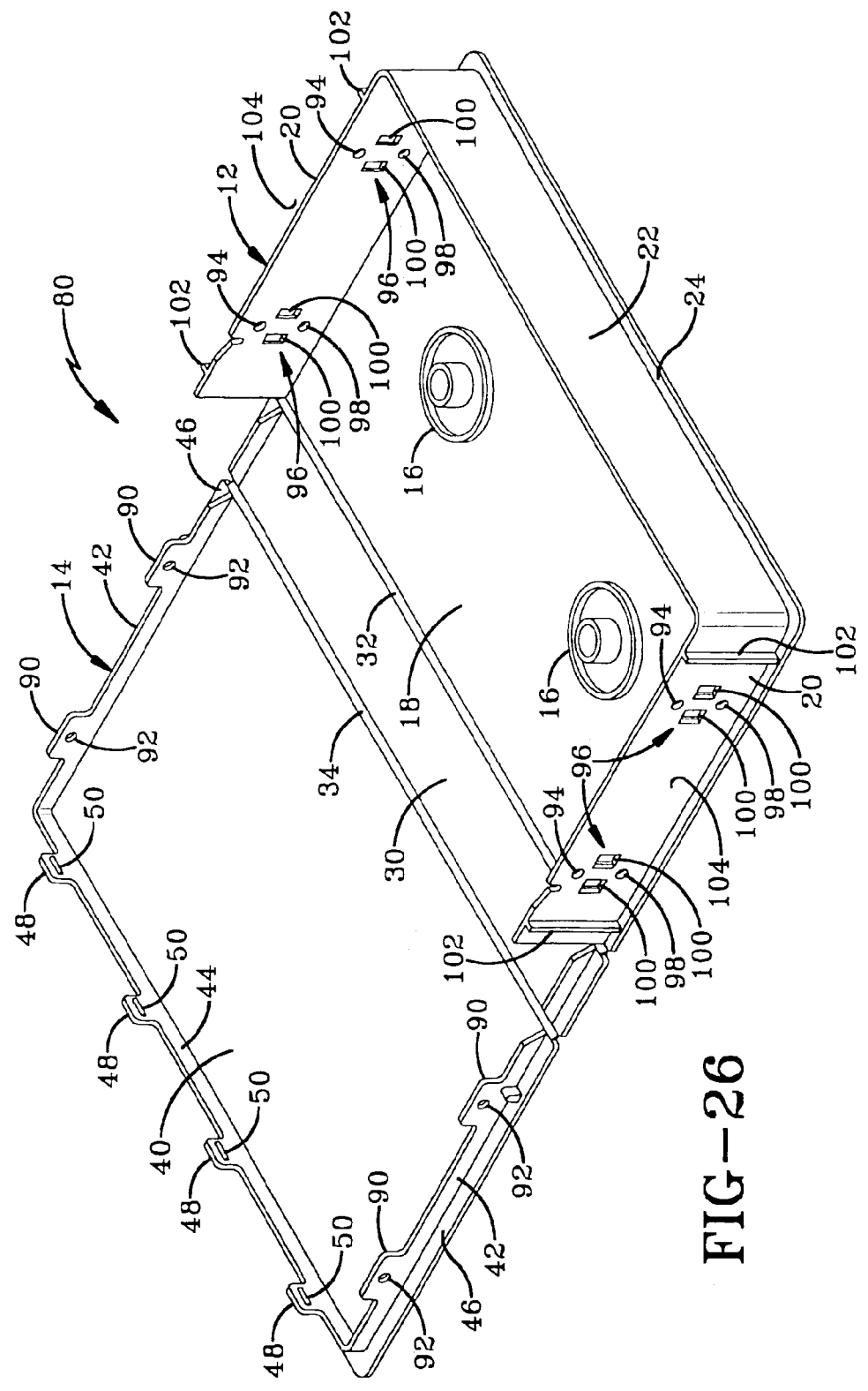

An alternative lockable box is depicted in FIG. 26 and is indicated generally at 80. Alternative embodiment of box 80 is substantially similar to the embodiment of box 10 described in detail above and thus similar numbers are used to refer to similar parts. Box 80 includes a base 12 and a lid 14 as in the previously-described embodiment. Base 12 includes a bottom wall 18 from which extend a pair of sidewalls 20 and a front wall 22. Lid 14 is hingedly attached to base 12 by a pair of living hinges 32 and 34 and a rear wall 30.

Lid 14 includes an upper wall 40 from which a pair of sidewalls 42 and a front wall 44 extend. Both walls 20, 22, and wall 42 and 44 are disposed inwardly from the outer perimeters of bottom wall 18 and upper wall 40 to form a lower ledge 24 and an upper ledge 46. A plurality of retaining tabs 48 extend from front wall 44 and carry protuberances 50 that help frictionally engage base 12 to hold lid 14 in the closed position.

Box 80 also includes at least one locking tab 90 extending from at least one of sidewalls 42 of lid 14. Each locking tab 90 has a first locking hole 92 disposed therein. In the embodiment of box 80 depicted in FIG. 26, four locking tabs 90 extend from lid 14. In other embodiments of the present invention, locking tabs 90 may only be provided on one of sidewalls 42.

Sidewalls 20 of base 12 include a second locking hole 94 that is disposed to align with first locking hole 92 when lid 14 is in the closed position. Each second locking hole 94 is part of a locking hole set 96 that includes a third locking hole 98 and a pair of locking finger holes 100. A pair of protection ribs 102 extend outwardly from each sidewall 20 having locking hole sets 96. Protection ribs 102 cooperate with lower ledge 24 and upper ledge 46 to define a lock reception cavity 104.

It may thus be understood that box 80 provides a lockable box that is capable of holding an item of recorded media during its rental period and subsequent storage prior to sale. Box 80 is lockable when lid 14 is in the closed position causing first locking holes 92 to align with second locking holes 94. In this position, a lock may be passed through these holes preventing lid 14 from being opened.

A first embodiment of a lock for either box 10 or 80 is depicted in FIGS. 3 through 5 and is indicated generally by the numeral 110. Lock 110 generally includes a body 112, at least one locking pin 114, and at least one locking finger 116. In general, at least one locking pin 114 prevents box 10 or 80 from being opened when lock 110 lockably engages box 10 or 80. Locking fingers 116 provide the locked connection between lock 110 and box 10 or 80. Body 112 also defines a storage cavity 118. An EAS tag 120 may be disposed fully within cavity 118 such that no portion of EAS tag 120 protrudes beyond the boundaries of body 112 as may be seen in FIG. 4. Body 112 also defines a key hole 130 that is disposed in body 112 to align with each locking finger 116.

In addition to locking pins 114 and locking fingers 116, lock 110 also includes a cantilevered arm 132 having an anchored end 134 and a free end 136 disposed adjacent one of locking fingers 116. Cantilevered arms 132 provide visual deterrents to a shoplifter by making lock 110 appear more complicated to pick than it actually is by partially blocking key hole 130. It may be understood that one cantilevered arm 132 may be disposed adjacent each locking finger as depicted in the drawings but that other combinations are also contemplated by the present invention.

Each key hole 130 includes a first portion 140 that may be substantially circular as depicted in the drawings and a second portion 142 that may be rectangular as depicted in the drawings. As can be seen in FIG. 3, first portion 140 of each key hole 130 is disposed to align with a locking finger 116. It may also be seen that second portion 142 is aligned with free end 136 of cantilevered arm 132.

Figure 11:
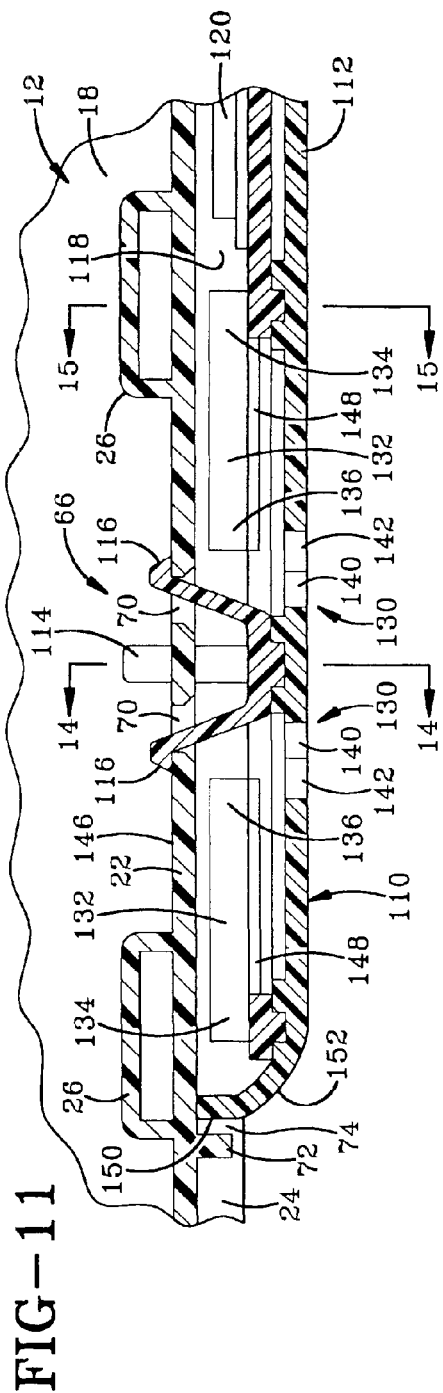
FIG. 11 is a sectional view taken along line 11—11 of FIG. 10 showing the locking fingers of the lock engaged with the locking holes of the media storage box.

Each locking finger 116 and cantilevered arm 132 is fabricated to be resilient such that it may be urged away from its rest position by a force and when the force is removed they return to the at rest position depicted in FIG. 5. Locking pins 114 are preferably fabricated from a metal that may not be easily sheared but may also be fabricated from a suitable plastic. Each locking pin 114 is long enough to pass through both front wall 22 and locking tab 60 of box 10 as specifically depicted in FIG. 14. Similarly, each locking finger 116 is configured to extend into a locking finger hole 70 in front wall 22 of box 10 and engage the rear surface 146 thereof as depicted in FIG. 11. Furthermore, each cantilevered arm 132 has an angled face 148 that faces key hole 130.

In accordance with another objective of the present invention, lock 110 may not be easily pried from box 10 when lock 110 is locked onto box 10. As may be seen in FIG. 11, body 112 includes a rectangular perimeter portion 150 having a height no greater than the depth of lower ledge 24 or upper ledge 46. Body 112 further includes a slanted portion 152 that prevents a pry bar from gaining a solid grip on lock 110. It may thus be understood that lock 110 is partially disposed within lock reception cavity 74 of box 10 when lock 110 is in locked engagement with box 10. In this position, ledges 24 and 46 cooperate with protection ribs 72 to prevent a pry bar from being inserted under lock 110.

Lock 110 is placed into locked engagement with box 10 by aligning locking fingers 116 and locking pins 114 with the holes of locking hole sets 66 and pressing lock 110 against box 10. The force causes locking fingers 116 to flex inwardly and snap through locking finger holes 70 in wall 22. Holes 70 may have angled sidewalls to facilitate the engagement. Locking fingers 116 may also have angled edges that cooperate with holes 70. When locking fingers 116 are fully inserted in holes 70, they snap back outwardly and engage inner surface 146 of front wall 22. As may be seen in FIG. 11, lock 110 may not be removed until locking fingers 116 are urged inwardly. While in the locked position, locking pins 114 of lock 110 are received in holes 64 and 68 of locking hole set 66.

As may be seen in FIG. 14, pin 114 received in second locking hole 64 is also received in first locking hole 62 of locking tab 60 to lock lid 14 in a closed position. Locking pin 114 received in the third locking hole 68 provides stability to lock 110 but does not engage lid 14 in the embodiment of the invention depicted in the drawings. In other alternative embodiments, both locking pins 114 may engage lid 14.

It may be understood that lock 110 may be attached to box 10 in two orientations due to the symmetry of locking pins 114, locking fingers 116, and locking hole sets 66. Such symmetry allows lock 110 to be quickly and easily installed on box 10 without concern for the proper alignment of pins 114 and fingers 116.

Figure 12:
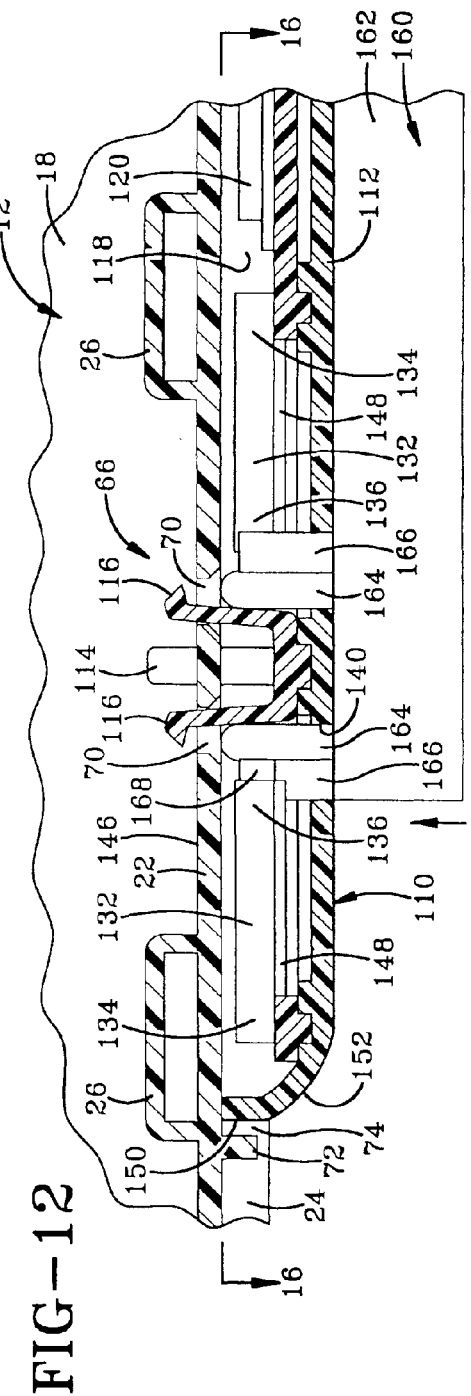
FIG. 12 is a section view similar to FIG. 11 with the key of FIG. 6 in a fully engaged position having moved the locking fingers into a disengaged position.
Figure 13:
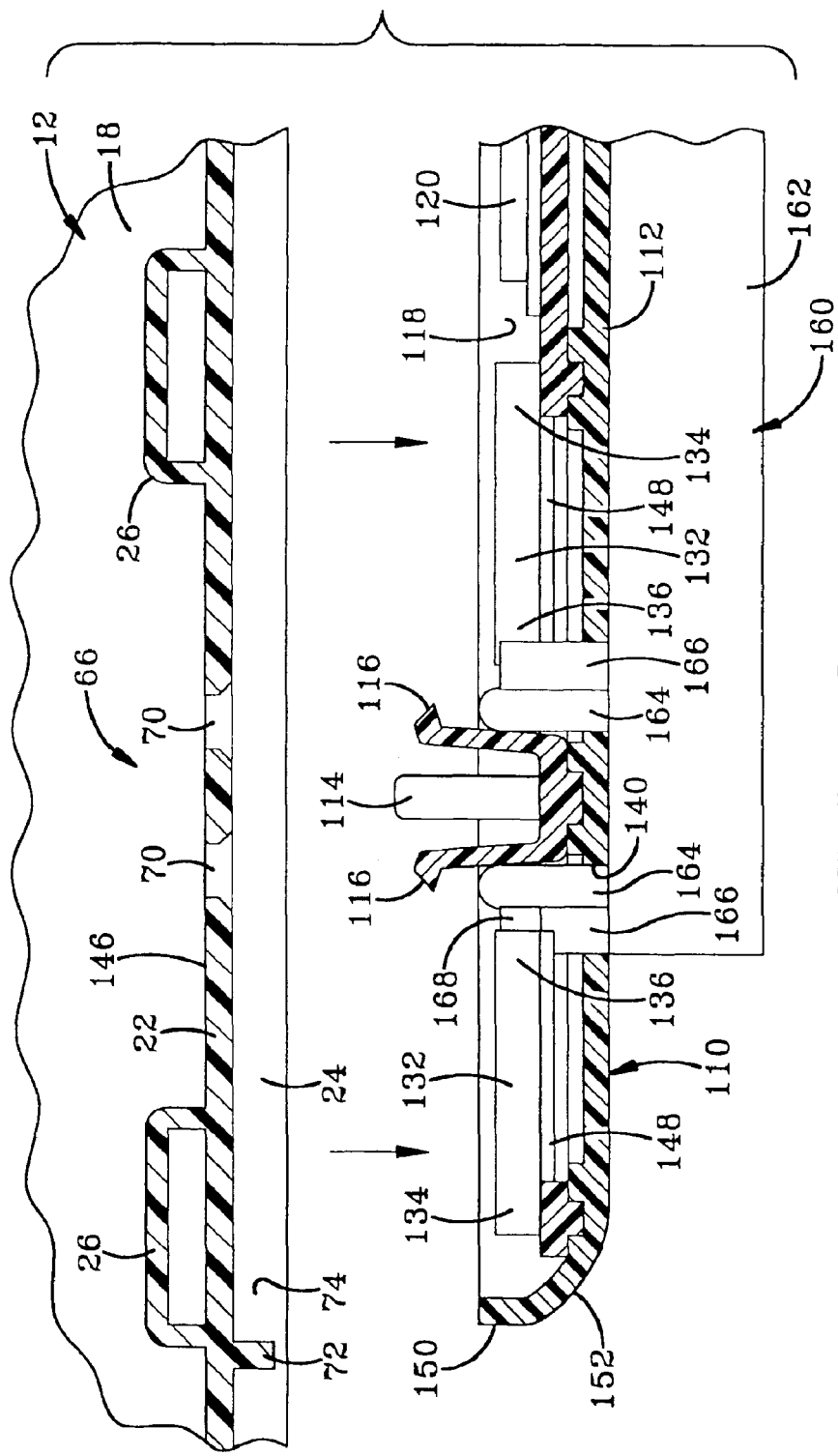
FIG. 13 is a sectional view similar to FIG. 11 with the key in the fully engaged position and the lock completely disengaged from the media storage box.
Figure 16:
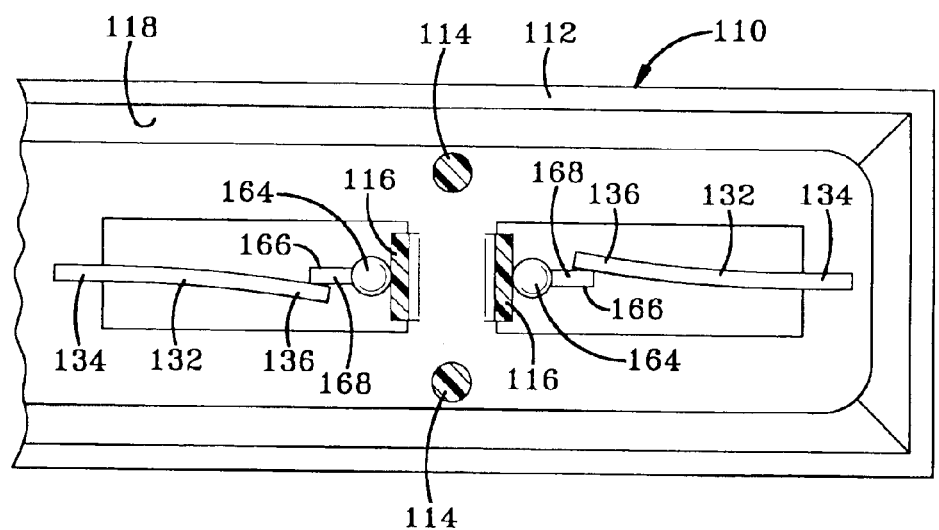
FIG. 16 is a sectional view taken along line 16—16 of FIG. 12 showing the chiseled tangs of the key engaging the cantilevered arms of the lock.

A key for use with lock 110 is depicted in FIGS. 6 through 9 and is indicated generally at 160. Key 160 includes a spine 162 from which extends key shanks 164. Key shanks 164 are configured to be slidably received in first portion 140 of key hole 130. Each shank 164 has a tooth 166 extending therefrom that is configured to be slidably received in second portion 142 of key hole 130. Each tooth 166 has a chiseled face 168 that engages free end 136 of cantilevered arm 132 when key 160 is inserted into a fully engaged position with lock 110. When fully engaged, each tooth 166 engages cantilevered arm 132 and urges it to one side or the other as depicted in FIG. 16. When key 160 is in the fully engaged position, each shank 164 engages locking finger 116 to urge it inwardly such that lock 110 may be removed from box 10 as depicted in FIGS. 12 and 13. It may be understood that key 160 is also symmetric such that it may be properly inserted into lock 110 in either of two orientations.

It may thus be understood that box 10 may not be opened when lock 110 is in locked engagement with box 10. Lid 14 of box 10 may not be opened because at least one of locking pins 114 extends through front wall 22 of base 12 and at least one locking tab 60 of lid 14. Further, a shoplifter cannot remove EAS tag 120 from lock 110 without either removing or damaging lock 110. Lock 110 may not be removed without key 160 because at least one locking finger 116 lockingly engages front wall 22 of box 10 until urged out of engagement by shanks 164 of key 160. Thus the objectives of the invention are achieved by box 10, lock 110, and key 160.

A second embodiment of a lock for either box 10 or 80 is depicted in FIGS. 17 through 19 and is indicated generally at 210. Lock 210 generally includes a body 212, at least one locking pin 214, and at least one locking finger 216. In general, at least one locking pin 214 prevents box 10 or 80 from being opened when lock 210 lockingly engages box 10 or 80. Locking fingers 216 provide the locked connection between lock 210 and box 10 or 80. Body 212 also defines a storage cavity 218. An EAS tag 220 may be disposed fully within cavity 218 such that no portion of EAS tag 220 protrudes beyond the boundaries of body 212 as is seen in FIGS. 19 and 22. Body 212 also defines a pair of key slots 230 that are disposed on either end of lock 210. Each locking pin 214 is preferably fabricated from a metal that is anchored in body 212 of lock 210. Metal is preferred because it may not easily be sheared but other suitable plastics may be used in place of metal locking pins 214 without departing from the scope of the present invention. Each locking pin 214 is long enough to pass through both front wall 22 and locking tab 60 of box 10 as is specifically depicted in FIG. 25.

Each locking finger 216 is configured to extend into a locking finger hole 70 in front wall 22 of box 10 and engage rear surface 146 thereof as depicted in FIG. 22. Each locking finger 216 is integrally connected to a resilient arm 232 and a pivot arm 234. Locking fingers 216, resilient arms 232, and pivot arms 234 are pivotally carried by body 212 on a pivot pin 236 that is clamped between a first flange 238 and a second flange 240. To allow locking fingers 216 to be pivoted by a key which is generally indicated at 260, a metal clip 242 is carried by pivot arm 234. Clip 242 must be fabricated from a material that is magnetically attractive so that pivot arm 234 may be moved by magnetic force.

In accordance with another object of the present invention, lock 210 may not be easily pried from box 10 when lock 210 is locked onto box 10. As seen in FIGS. 21 and 22, body 212 includes a curved portion 252 that prevents a pry bar from gaining a solid grip on lock 210. Body 212 is also configured to fit closely within lock reception cavity 74 of box 10. In this position, ledges 24 and 46 cooperate with protection ribs 72 to prevent a pry bar from being inserted under lock 210.

Lock 210 is placed into locked engagement with box 10 by aligning locking fingers 216 and locking pins 214 with the holes of locking hole set 66 and pressing lock 210 against box 10. The force causes locking fingers 216 to engage front wall 22 adjacent holes 70 causing resilient arms 232 to flex allowing locking fingers 216 to snap into holes 70 and engage rear surface 146 of front wall 22. Holes 70 may have angled sidewalls to facilitate the engagement. Locking fingers 216 may also have angled edges that cooperate with holes 70. When locking fingers 216 are fully inserted in holes 70, they snap back outwardly due to the resilient force of resilient arms 232. As is seen in FIG. 22, lock 210 may not be removed from box 10 until locking fingers 216 are urged inwardly. While in the locked position, locking pins 214 of lock 210 are received in holes 64 and 68 of locking hole set 66. As seen in FIG. 25, pin 214 received in second locking hole 64 is also received in first locking hole 62 of locking tab 60 to lock lid 14 in a closed position. Locking pin 214 received in third locking hole 68 provides stability to lock 210 but does not engage lid 14 in the embodiment of the invention depicted in the drawings. In other alternative embodiments, both locking pins 214 may engage lid 14.

Lock 210 may be attached to box 10 in two orientations due to the symmetry of locking pins 214, locking fingers 216, and locking hole set 66. Such symmetry allows lock 210 to be quickly and easily installed on box 10 without concern for the proper alignment of pins 214 and fingers 216.

Figure 23:
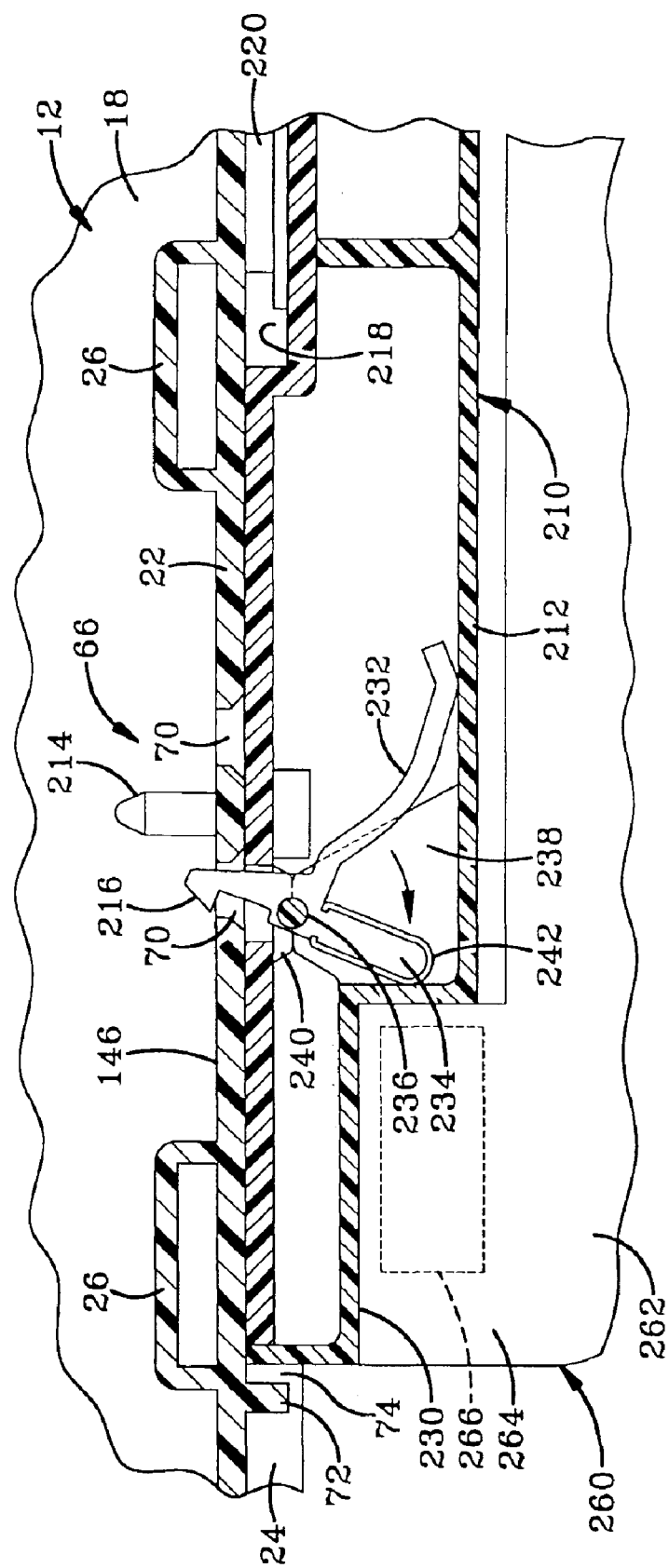
FIG. 23 is a sectional view similar to FIG. 22 with the key of FIG. 20 in a fully engaged position showing the locking finger of the lock disengaged from the locking hole.
Figure 24:
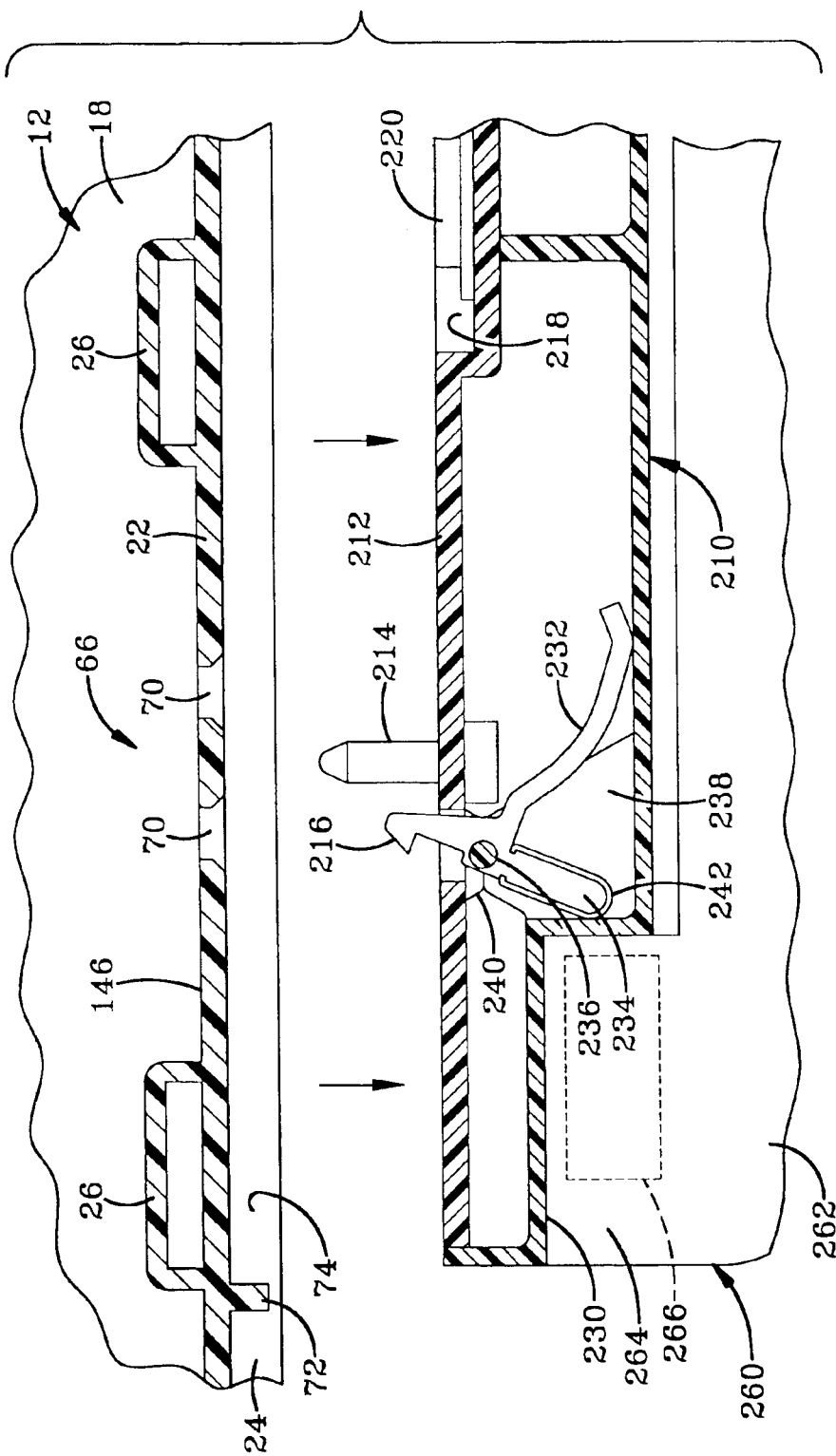
FIG. 24 is a sectional view similar to FIG. 23 with the key of FIG. 20 in the fully engaged position and lock completely disengaged from the media storage box.

A key for use with lock 210 is depicted in FIG. 20 and is indicated generally at 260. Key 260 includes a spine 262 and a pair of arms 264. Each arm 264 carries a magnet 266 that is strong enough to pull pivot arm 234 toward itself while flexing resilient arm 232 to cause locking finger 216 to release wall 22. Magnets 266 are positioned such that their magnetic field does not damage the item of recorded media (not shown) carried in box 10 or EAS tag 220. This protection is provided in part by the configuration of lock body 212 in that it places multiple layers of body 212 material between magnet 266 and box 10. Further protection is provided by the arrangement of magnets 266 such that their strongest magnetic field is directed away from interior of box 10. Spine 262 and arms 264 are configured to place arms 264 within slots 230 when key 260 engages lock 210. This position is depicted in FIG. 23. In this position, magnets 266 attract pivot arms 234 causing locking fingers 216 to disengage wall 22. Magnets 266 are strong enough to flex resilient arms 232. When key 260 is removed from lock 210, resilient arms 232 return to their at rest position and reset lock 210. Key 260 is also symmetric such that it may be properly inserted into lock 210 in either of two orientations.

Figure 27:
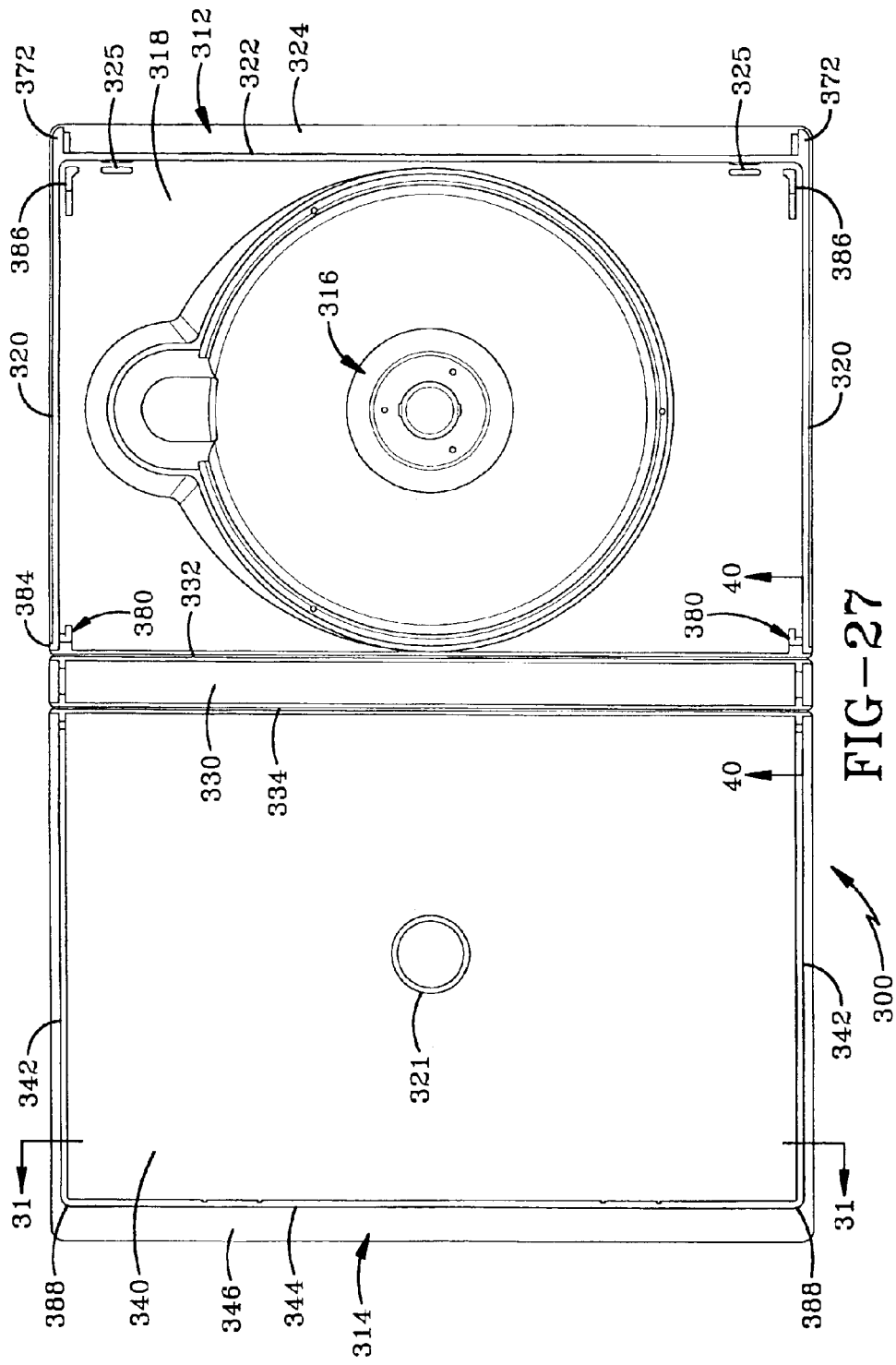
FIG. 27 is a top plan view of another embodiment of the security storage container of the present invention.
Figure 32:
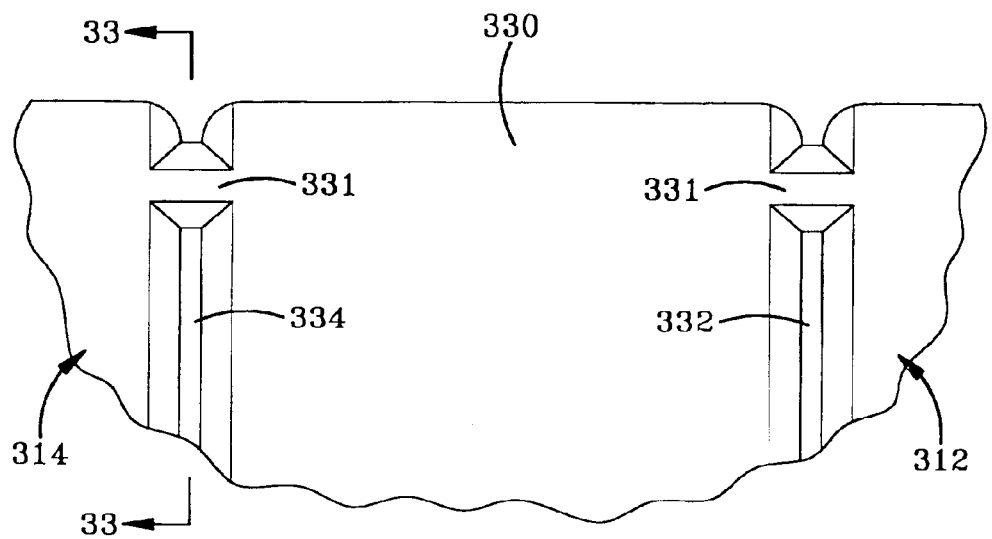
FIG. 32 is a view taken along line 32—32 of FIG. 28.
Figure 33:
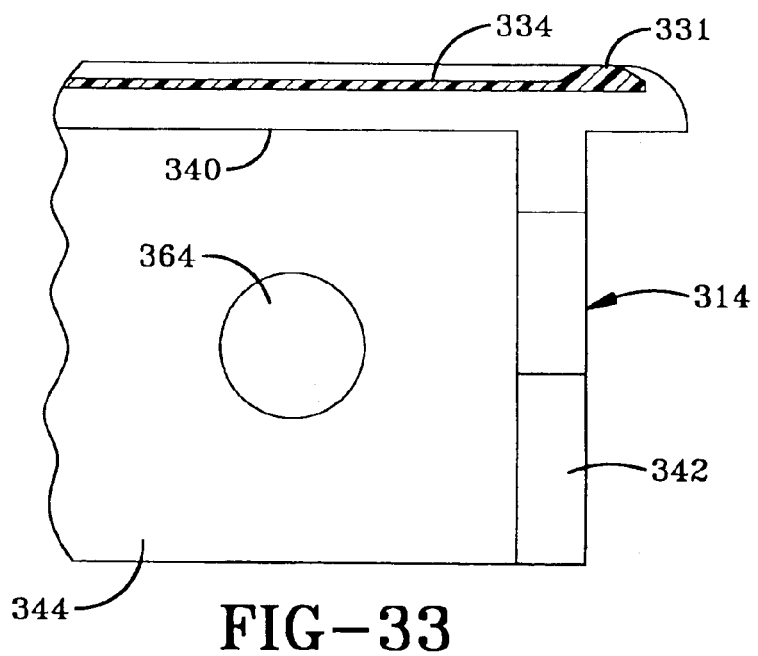
FIG. 33 is a sectional view taken along line 33—33 of FIG. 32.
Figure 40:
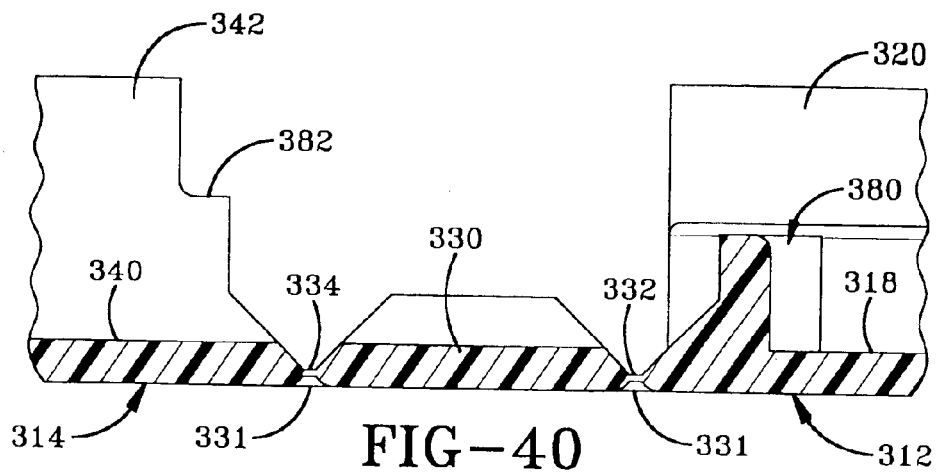
FIG. 40 is a sectional view taken along line 40—40 of FIG. 37.

Another embodiment of the box or security storage container of the present invention is indicated generally by the numeral 300 in FIGS. 27–53. Security storage container 300 includes a base 312 and a lid 314 hingedly connected to base 312 and moveable between open and closed positions. The open position is depicted in FIGS. 27 and 28 with the closed position being depicted in FIG. 38. When security storage container 300 is in the open position, an item of recorded media 315 such as a CD or DVD may be placed into storage container 300 or removed from storage container 300. In the embodiment of storage container 300 depicted in the drawings, base 312 is configured to receive a CD or DVD on a mounting hub 316 (see FIG. 45). Hub 316 may be any of a variety of hubs known in the art adapted to hold a CD or DVD 315 on hub 316. In the embodiment of the invention depicted in the drawings, hub 316 includes a support shelf 317 disposed above the inner surface of base 312 and at least a pair of protuberances 319 that are disposed over the upper surface of disc 315 to hold disc 315 on hub 316. In addition to protuberances 319, storage container 300 includes a retaining ring 321 that extends inwardly from lid 314. Ring 321 overlies hub 316 and prevents disc 315 from falling off of hub 316 even when container 300 is subjected to impact forces. Ring 321 may be continuous or broken into individual portions.

Although the specific embodiment of storage container 300 shown in the drawings is designed to hold a CD or DVD, those skilled in the art will understand that the concepts of the present invention may be employed with a wide variety of differently shaped storage containers configured to hold other types of recorded media such as video game cartridges, cassette tapes, compact discs, DVDs, computer discs, VHS tapes, video tapes, digital audio tapes, and the like. The CD/DVD storage container depicted in the drawings only provides an example of the present invention to provide an embodiment on which to describe the elements of the invention and their interrelationship.

Base 312 generally includes a bottom wall 318 from which projects a pair of sidewalls 320 and a front wall 322. Sidewalls 320 are connected to front wall 322 to provide strength to storage container 300. Front wall 322 is inwardly disposed from the outer perimeter of bottom wall 318 such that a lower ledge 324 is formed by the bottom portion of bottom wall 318 that extends beyond wall 322. Sidewalls 320 are preferably disposed very close to the outer perimeter of bottom wall 318 so that a shoplifter cannot grasp the protruding portion of bottom wall 318 and tear bottom wall 318 away from sidewalls 320. Base 312 further includes latches 325 that are configured to engage 314 as will be described in more detail below.

Base 312 of storage container 300 further includes a rear wall 330 that is connected to bottom wall 318 by a first living hinge 332. Rear wall 330 is connected to lid 314 by a second living hinge 334. Both living hinges 332 and 334 are substantially continuous along the length of rear wall 330 with the exception of strengthening ribs 331 depicted in FIG. 32. Strengthening ribs 331 are breaks in living hinges 332 and 334 that strengthen hinges 332 and 334 against tearing. Ribs 331 are preferably fabricated adjacent the outer edge of wall 300.

Lid 314 includes an upper wall 340 from which a pair of sidewalls 342 and a front wall 344 extend. Sidewalls 342 and front wall 344 of lid 314 are disposed inwardly of the outer perimeter of upper wall 340 such that an upper ledge 346 is formed. Walls 342 and 344 of lid 314 are disposed inwardly more than walls 320 and 322 of base 312 such that walls 342 and 344 fit inwardly of walls 320 and 322 when lid 314 is in the closed position. Walls 342 and 344 frictionally engage walls 320 and 322 when lid 314 is moved to the closed position to create a frictionally holding force that helps keep lid 314 in the closed position. In addition to this frictional force, latches 325 engage wall 344 to hold lid 314 closed.

In accordance with one of the objectives of the present invention, storage container 300 includes elements that enable storage container to receive a lock that locks lid 314 in the closed position when the user of storage container 300 desires to prevent access to the item of recorded media stored in storage container 300. These elements include at least one but preferably four first locking holes 362 defined by front wall 322 of base 312. Front wall 344 of lid 314 includes corresponding second locking holes 364 that align with first locking holes 362 when lid 314 is in the closed position. The alignment of holes 362 and 364 allows storage container 300 to be locked with an appropriate lock.

Front wall 322 may additionally include an additional set of third locking holes 366 that correspond to fourth locking holes 368 defined by wall 344. In accordance with one of the objectives of the present invention, holes 362, 364, and 366 are symmetrically disposed in walls 322 and 344 so that the lock used to lock lid 314 may be installed in two configurations.

In accordance with another objective of the present invention, a pair of protection ribs 372 extend from base 312 between lower ledge 324 and upper ledge 346 when lid 314 is in the closed position. Ribs 372 are disposed outward of locking holes 362, 364, and 366 to form a lock reception cavity 374 around the locking holes.

The locking holes of storage container 300 may also be formed on walls 320 and 342 if desired.

Base 312 and lid 314 include various elements that help to securely hold base 312 and lid 314 together when storage container 300 is locked. These elements help to prevent the shoplifter from prying container 300 open by prying the corners and joints of container 300 apart when container 300 is locked.

Figure 41:
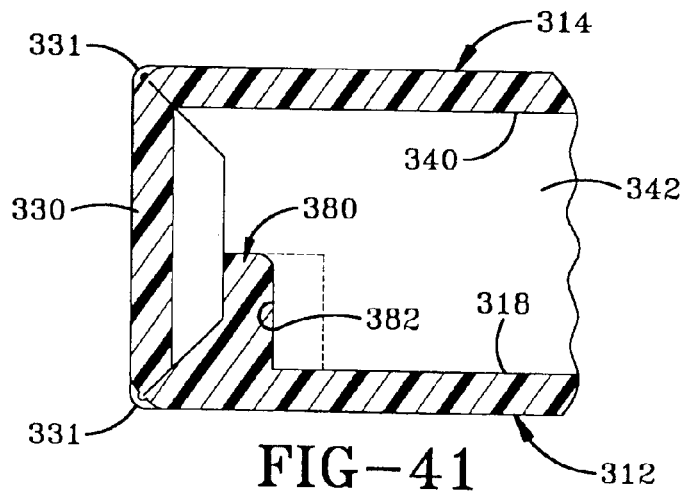
FIG. 41 is a view similar to FIG. 40 showing a container in a closed configuration.
Figure 42:
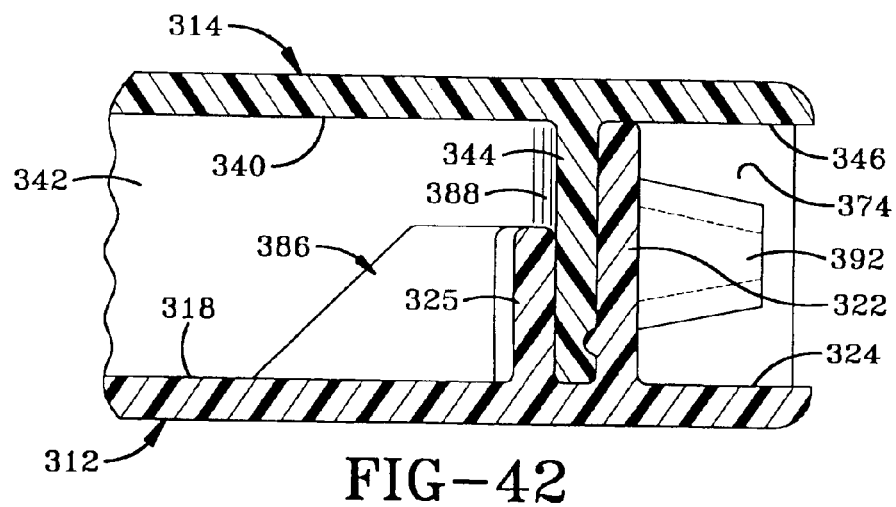
FIG. 42 is a sectional view taken through one of the latches of the container when the lid is closed.
Figure 43:
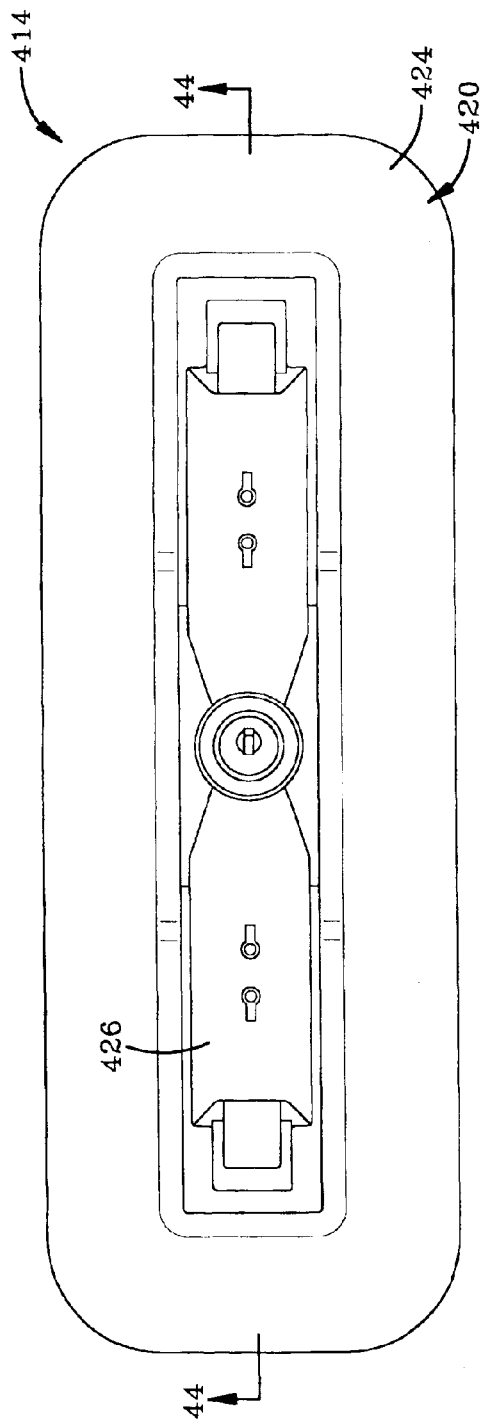
FIG. 43 is a top plan view of a first embodiment of the key.

One of the security elements is a pair of L-shaped walls 380 formed on base 312 adjacent hinge 332 and sidewalls 320. L-shaped walls 380 receive the end portions of walls 342 of lid 314 when lid 314 is in the closed position as depicted in FIGS. 39 and 41. As perhaps best shown in FIG. 40, the inner end of wall 342 includes a step 382 that corresponds with L-shaped wall 380 so that step 382 abuts wall 380 when lid 314 is closed as depicted in FIG. 41. Each L-shaped wall 380 includes a first portion disposed substantially parallel to hinge 332 that prevents wall 342 from being moved toward wall 330 when lid 314 is closed. Each L-shaped wall 380 further includes a second portion disposed substantially parallel to walls 320 that prevents walls 320 and 342 from being pushed inwardly when lid 314 is closed. The cooperation of L-shaped walls 380 and walls 342 thus reinforce the connection of lid 314 and base 312 adjacent hinges 332 and 334 and help resist an attack by a shoplifter in these areas.

The inner end of each wall 320 includes an extension 384 that extends outwardly from wall 320 to the end of wall 330 as shown in FIG. 39. Extension 384 prevents the shoplifter from grasping or striking wall 330 in an attempt to break living hinges 332 or 334 and access the storage compartment of container 300 through wall 330.

Figure 46:
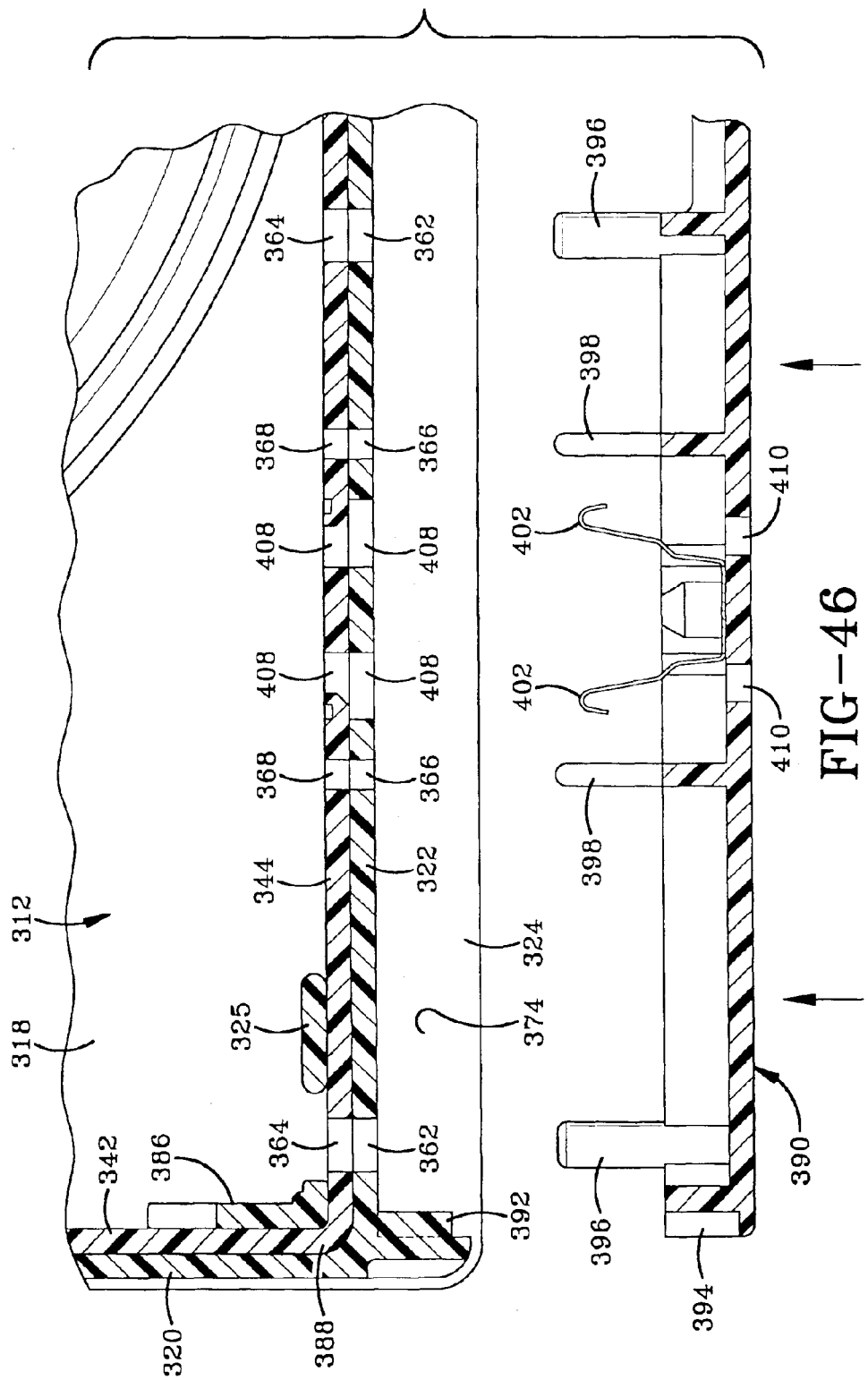
FIG. 46 is a sectional view of the container in a closed configuration with the lock being aligned for insertion.
Figure 47:
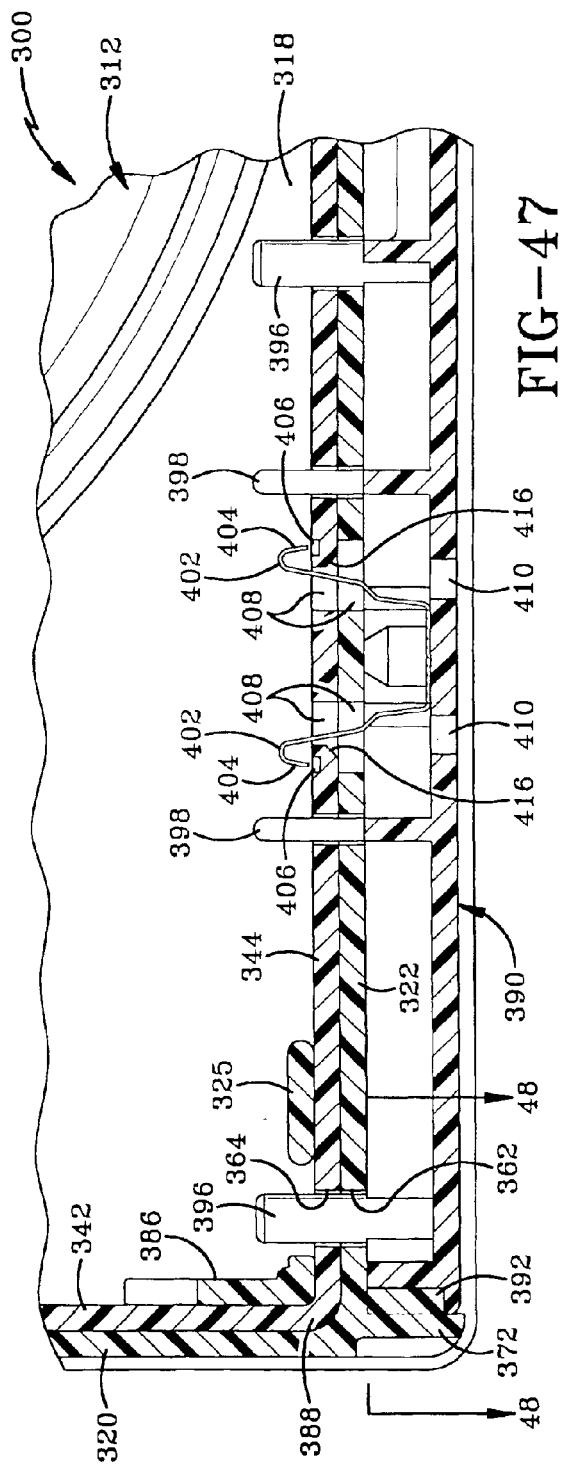
FIG. 47 is a view similar to FIG. 46 showing the lock in the inserted and locked position.
Figure 48:
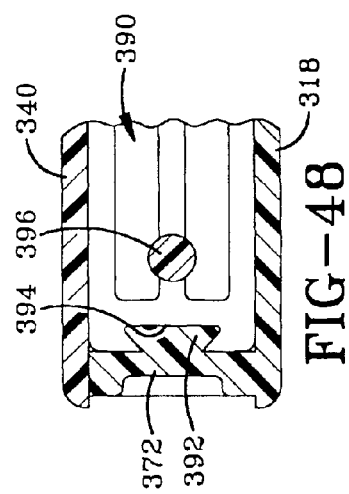
FIG. 48 is a sectional view taken along line 48—48 of FIG. 47.
Figure 49:
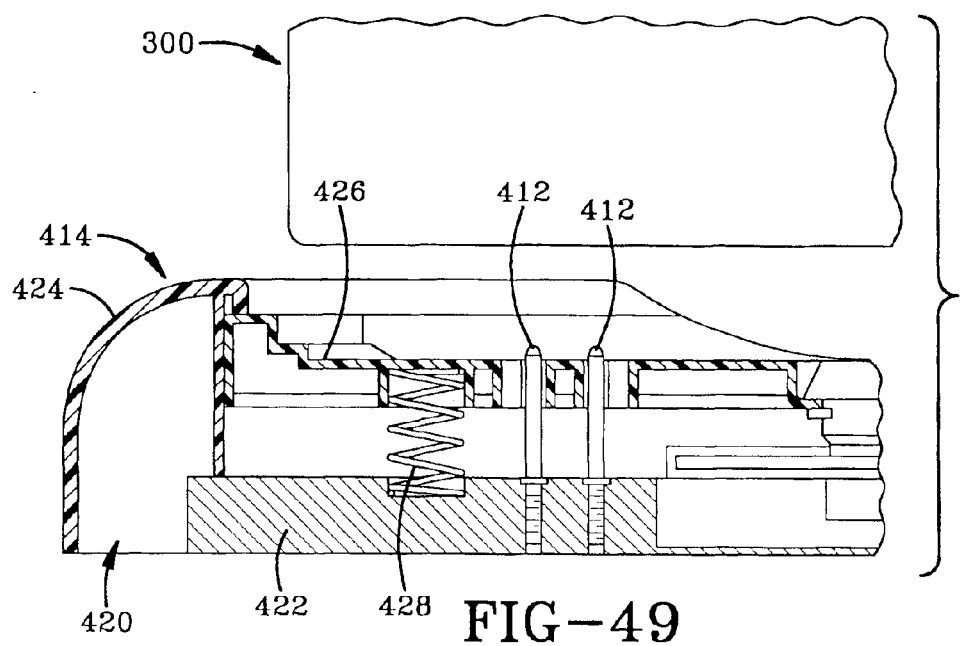
FIG. 49 is a view, partially in section, of the container being lowered onto the key.

Another security element is a pair of corner walls 386 extending upwardly from wall 318 adjacent the intersection of walls 320 and wall 322. Corner walls 386 form channels that snugly receive the corners 388 on lid 314 where walls 342 and 344 intersect. FIG. 46 also shows the reception of corners 388 in between corner walls 386 and walls 320/322. This arrangement increases the rigidity of container 300.

Another security feature is a dovetailed connection between the lock 390 and container 300. The dovetailed connection between the two elements is achieved by providing a pair of inwardly projecting male dovetailed lugs 392 on base 312 that preferably project inwardly from protection ribs 372 as shown in FIG. 29. Lock 390 defines female dovetailed slots 394 at its ends that cooperate with lugs 392 so that a snug, sliding connection is formed when lock 390 is mounted in lock reception cavity 374. The dovetailed connection between lock 390 and container 300 helps container 300 to resist prying forces imparted by a shoplifter who is trying to break into container 300.

The outer dimensions of lock 390 allow lock 390 to be entirely disposed within lock reception cavity 374 in the locked position. Lock 390 includes a set of first lock pins 396 that are spaced and configured to be received in lock holes 362 and 364 to prevent lid 314 from being moved away from the closed position when lock 390 is in the locked position. In the preferred embodiment, lock 390 includes four first lock pins 396. Lock 390 also includes four guide pins 398 that are configured and arranged to be received in holes 366/368 formed in base 312 and lid 314. Guide pins 398 also lock lid 314 to base 312 thus increasing the number of security elements from four to eight.

Lock 390 is locked to container 300 with locking fingers 402. Each locking finger 402 is preferably formed from a resilient material such as spring steel that is flexible but will return to its original position. Each locking finger 402 includes a hooked end 404 configured to be received in lock cavities 406 when lock 390 is pulled away from container 300. Lock fingers 402 also pass through walls 322 and 344 creating four more elements holding walls 322 and 344 together when lock 390 is in the locked position. Lock fingers 402 are inserted through locking finger holes 408 defined by walls 322 and 344. In the preferred embodiment of the invention, lock fingers 402 are disposed between guide pins 398 with both guide pins 398 and lock fingers 402 disposed between pairs of first lock pins 396.

Lock 390 further includes pin openings 410 that allow key pins 412 on a key 414 to move locking fingers 402 from the locked to the unlocked position. In the preferred embodiment, one pin opening 410 is aligned with each lock finger 402. Locking finger holes 408 formed in wall 344 include an angled wall 416 that directs key pins 412 toward locking finger 402 to insure that locking finger 402 is properly moved from the locked position to the unlocked position.

Figure 44:
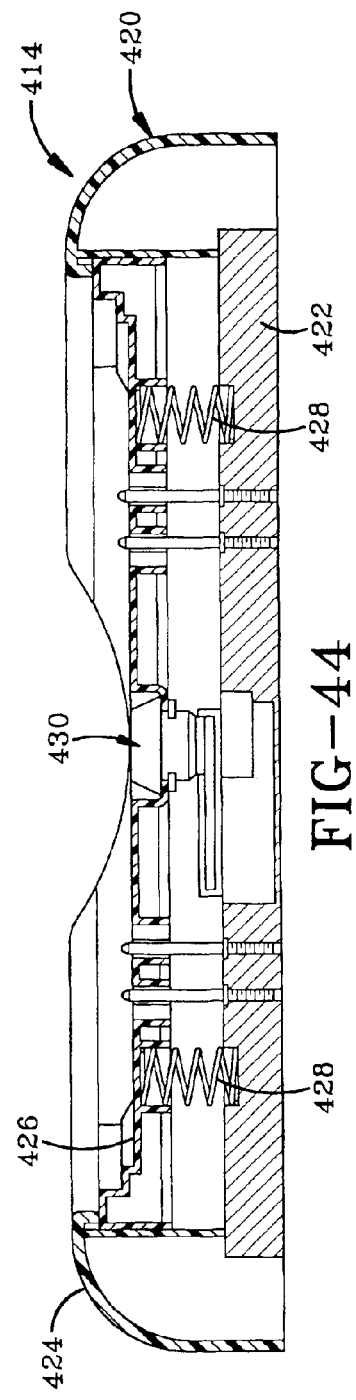
FIG. 44 is a sectional view taken along line 44—44 of FIG. 43.
Figure 45:
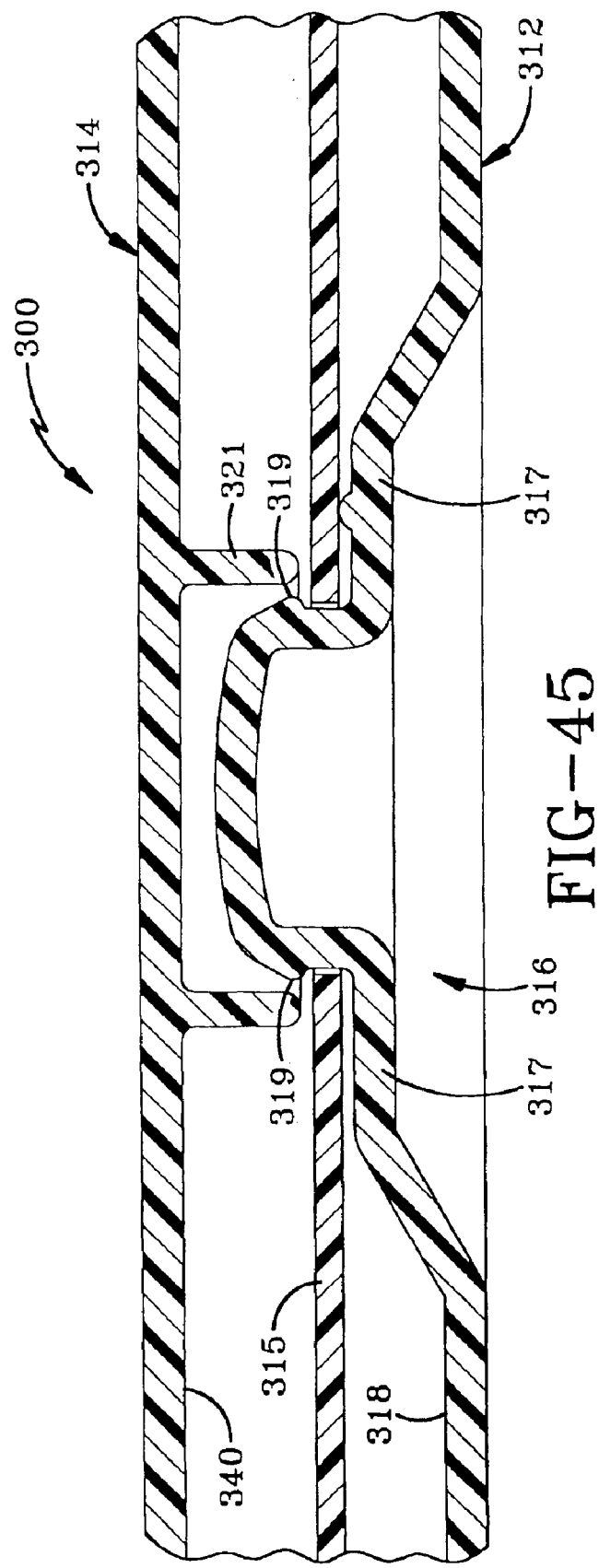
FIG. 45 is a sectional view of the hub and retaining ring in a closed configuration holding a CD or DVD in the security storage container.
Figure 50:
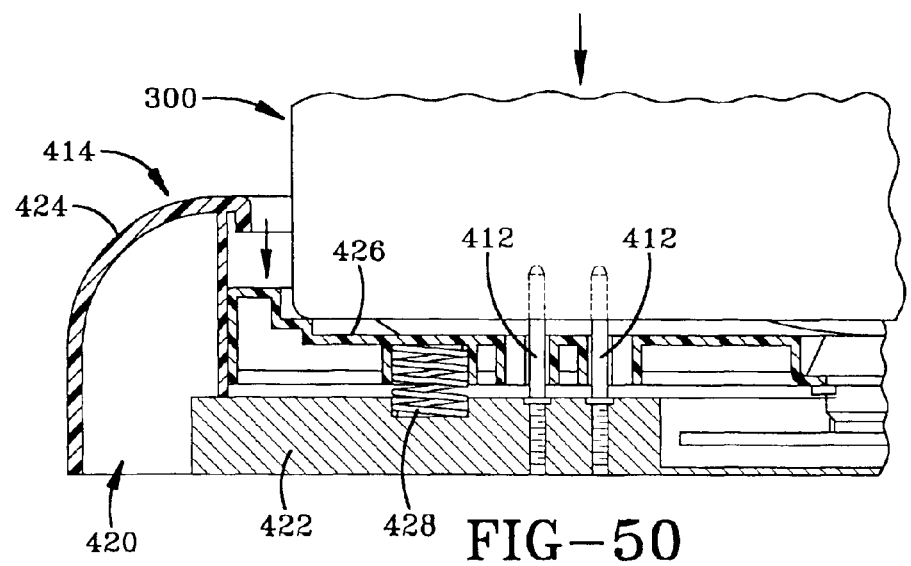
FIG. 50 is a view similar to FIG. 49 showing the container depressing the moveable portion of the key with the key pins inserted into the lock.
Figure 51:
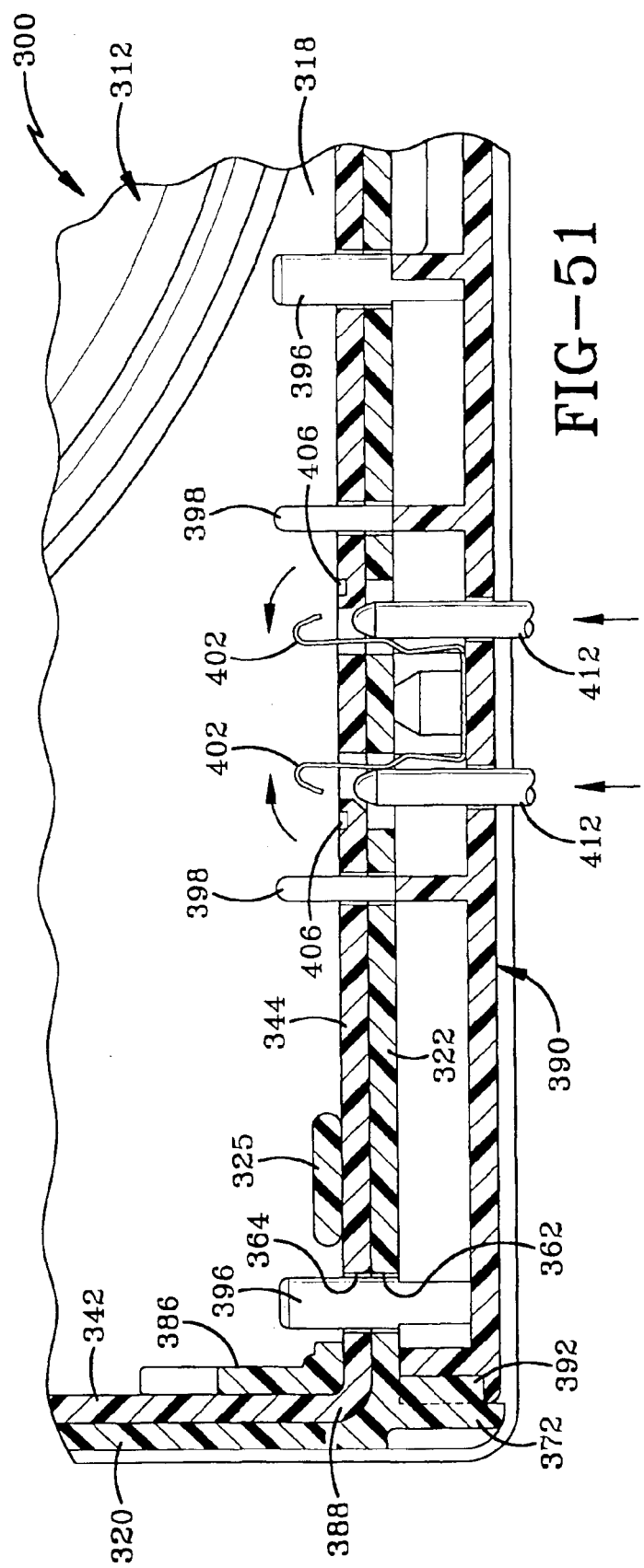
FIG. 51 is a view similar to FIG. 46 showing the key pins releasing the lock fingers from the container.
Figure 52:
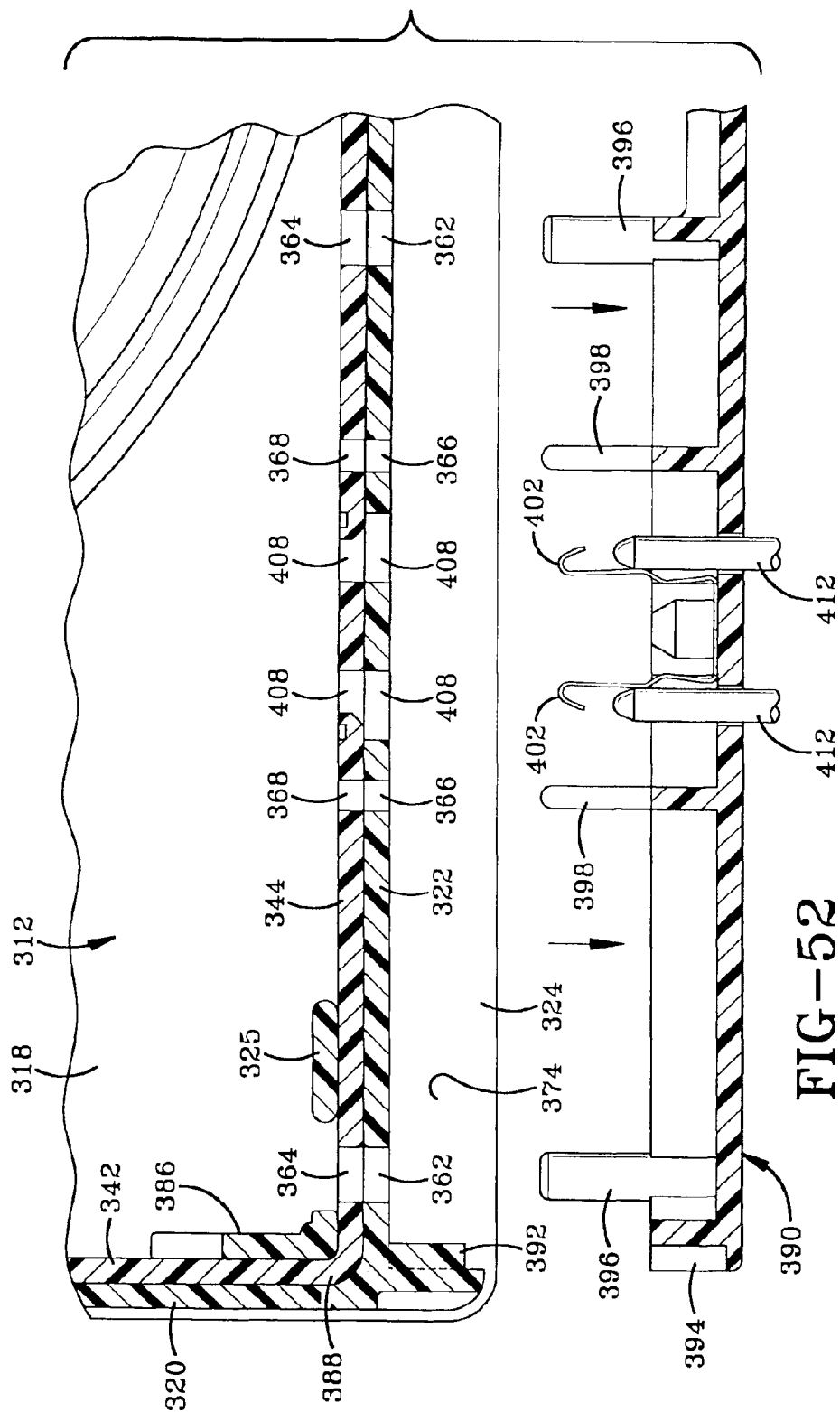
FIG. 52 is a view similar to FIG. 46 showing the lock being removed from the container.
Figure 53:
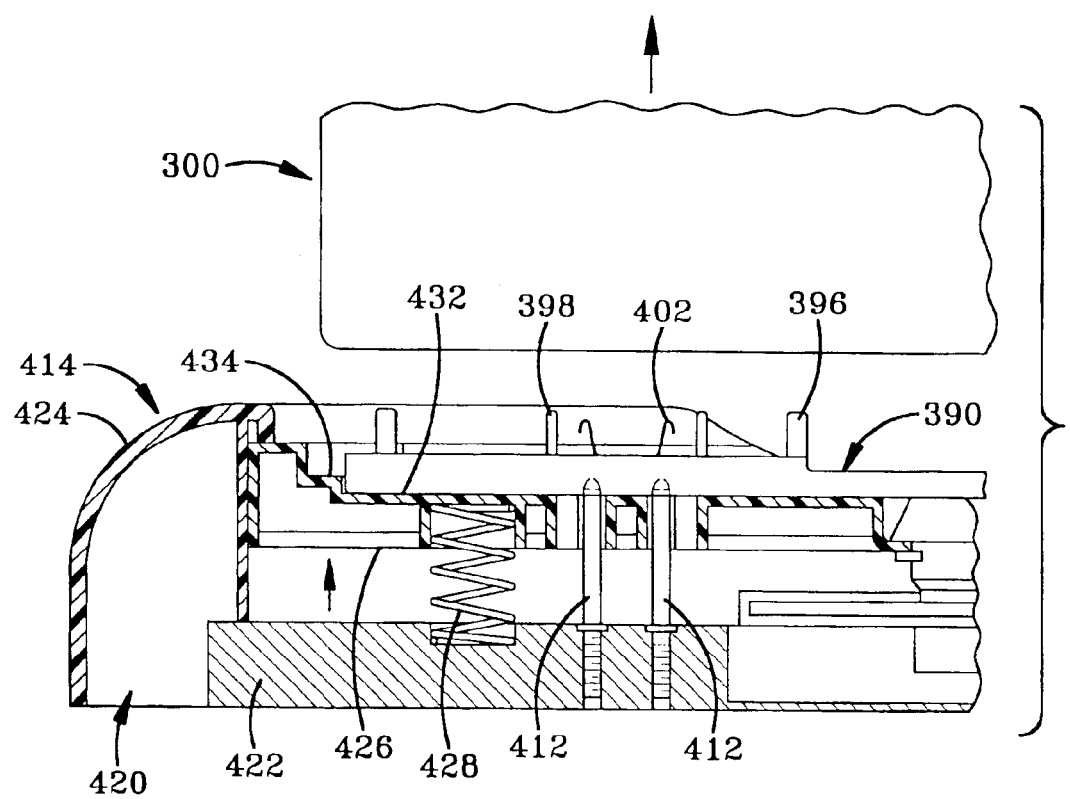
FIG. 53 is a view similar to FIG. 49 showing the container being moved from the key with the lock being held on the key.
Figure 54:
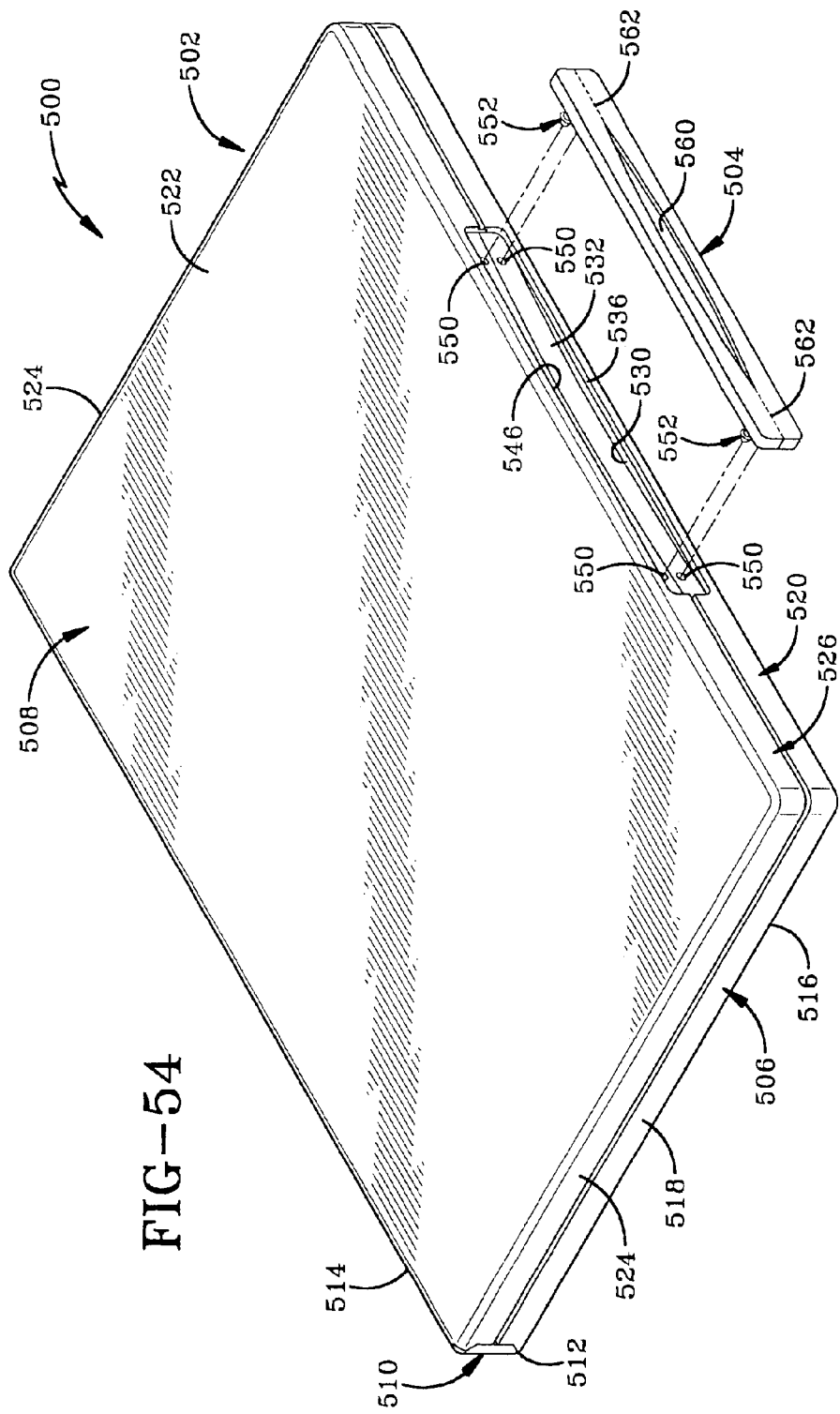
FIG. 54 is a perspective view of another embodiment of the security storage container of the present invention.

Key pins 412 are arranged on key 414 to coincide with each lock finger 402. Key 414 includes a body 420 and a base 422. Key pins 412 are anchored in base 422 and extend upwardly through body 420. Body 420 includes a fixed perimeter portion 424 and a moveable portion 426. Moveable portion 426 is mounted on a pair of resilient members such as springs 428 between upper and lower positions. Key pins 412 extend up through moveable portion 426 and are just barely visible above the upper surface of moveable portion 426 when moveable portion 426 is in the upper position as depicted in FIG. 44. When moveable portion 426 is moved to the lower position, key pins 412 extend up farther as shown in FIG. 50. A lock 430 is carried on moveable portion 426 and allows moveable portion 426 to be locked in the upper position so that key 414 may not be used.

Moveable portion 426 includes a tray 432 configured to receive lock 390 when lock 390 is removed from container 300. A second tray 434 engages container 300 and prevents container 300 from moving down into tray 432.

Security storage container 300 functions by first placing disc 315 over hub 316 and moving lid 314 to the closed position. The user may then insert lock 390 into lock reception cavity 374 so that lid 314 is locked in the closed position. When the user wishes to open lid 314, container 300 and lock 390 are lowered onto key 414 until container 300 engages tray 434. The engagement of container 300 and tray 434 allows the user to move moveable portion 426 downwardly so that key pins 412 move up through lock 390 to release lock fingers 402 from container 300. When released, lock 390 falls into tray 432 and the user may remove container 300 and open lid 314. Lock 390 may be reused on container 300 or any other similar container 300.

Another embodiment of the security storage container of the present invention is indicated generally by the numeral 500 in FIGS. 54–56 and 59–60. Security storage container 500 generally includes a storage container 502 and a lock 504 that is configured to lock storage container 502 in a closed position until lock 504 is removed from container 502. In this embodiment of the invention, lock 504 is intended to be sold along with container 502 and the item of recorded media stored therein to the consumer wherein the consumer removes lock 504 and discards lock 504. Lock 504 is thus a single-use lock that is intended to be destroyed when it is removed from storage container 502.

In the embodiments of the invention depicted in the drawings, storage container 502 is configured to hold a disc-shaped item of recorded media such as a CD or a DVD. Storage container 502 may also be configured to hold other types of recorded media such as those described above with respect to the other embodiments of the invention.

Storage container 502 includes a base 506 and a lid 508. Base 506 includes a hinge wall 510 that hinges base 506 to lid 508. Hinge wall 510 is preferably includes a first living hinge 512. Hinge wall 510 is preferably connected to lid 508 by second living hinge 514. Base 506 and lid 508 cooperate to entirely surround the item of recorded media stored in container 502. Container 502 may include some type of holding device to mount the item of recorded media while the item of recorded media is stored within container 502. The holding device may be one of the numerous hubs known in the art.

Base 506 also includes a bottom wall 516, a pair of sidewalls 518, and a front wall 520. Lid 508 includes a top wall 522, a pair of sidewalls 524, and a front wall 526.

Front wall 520 of base 506 includes a concave indentation 530 that is defined by a rear wall 532 and a lower wall 534. Front wall 520 also includes an upwardly extending lip 536 extending across cavity 530 in front of rear wall 532.

Figure 56:
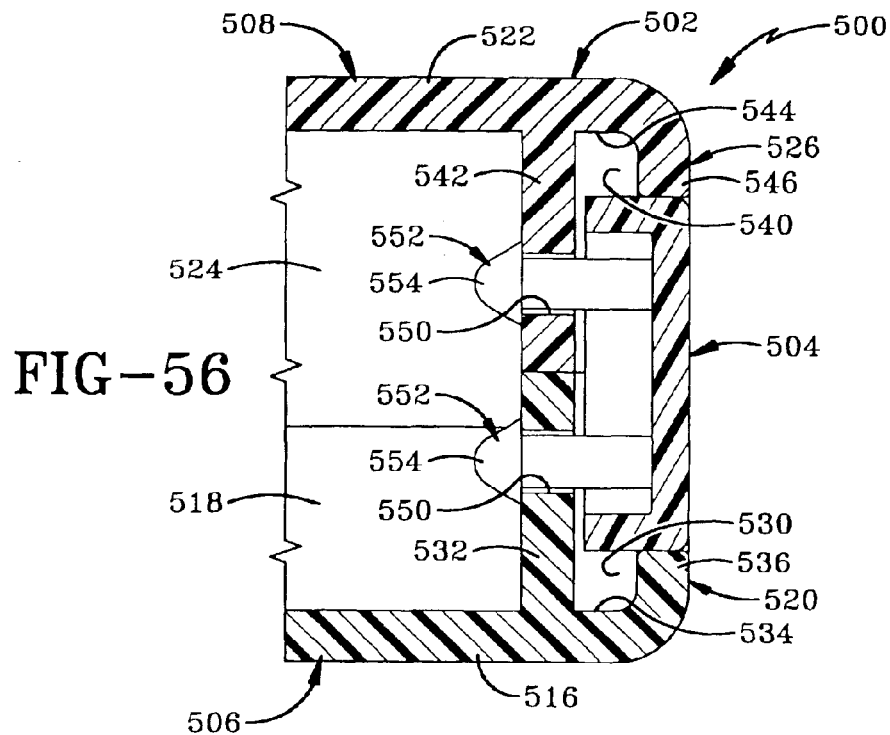
FIG. 56 is a sectional view taken along line 56—56 of FIG. 55.

Front wall 526 also includes a cavity 540 that substantially matches cavity 530 described above. Cavity 540 is defined by rear wall 542 and a upper wall 544. Front wall 526 also includes a lip 546 extending across cavity 540 in front of rear wall 542. When lid 508 is in the closed position as depicted in the drawings, cavities 530 and 540 cooperate to form a lock reception cavity configured to entirely receive lock 504. In the preferred embodiment of the invention, lock 504 does not protrude out of the lock reception cavity when lock 504 is in the locked position as depicted in FIGS. 56 and 60. In accordance with one of the objectives of the present invention, lock reception cavity is the same concave cavity formed in most existing front walls of existing storage containers.

Security storage container 500 includes at least one, but preferably two, lock holes 550 defined by rear walls 532 and 542. Lock 504 includes lock fingers 552 disposed on lock 504 to engage lock holes 550 when lock 504 is positioned in the lock reception cavity. Each lock finger 552 includes a protuberance 554 that is sized somewhat larger than the diameter or opening of its lock hole 550 so that lock 504 cannot be easily pulled back out of the lock reception cavity once lock fingers 552 and protuberances 554 are snapped through lock holes 550. Protuberances 554 are fabricated from a material that is pliable or flexible enough to be forced through lock holes 550. Each protuberance 554 is configured to have a catch surface that prevents protuberance 554 from being easily pulled back through lock hole 550. In the embodiment of the invention depicted in FIG. 56, each protuberance 554 extends entirely around lock finger 552. In the embodiment depicted in FIG. 60, each protuberance 554 extends around only half of lock finger 552.

Figure 55:
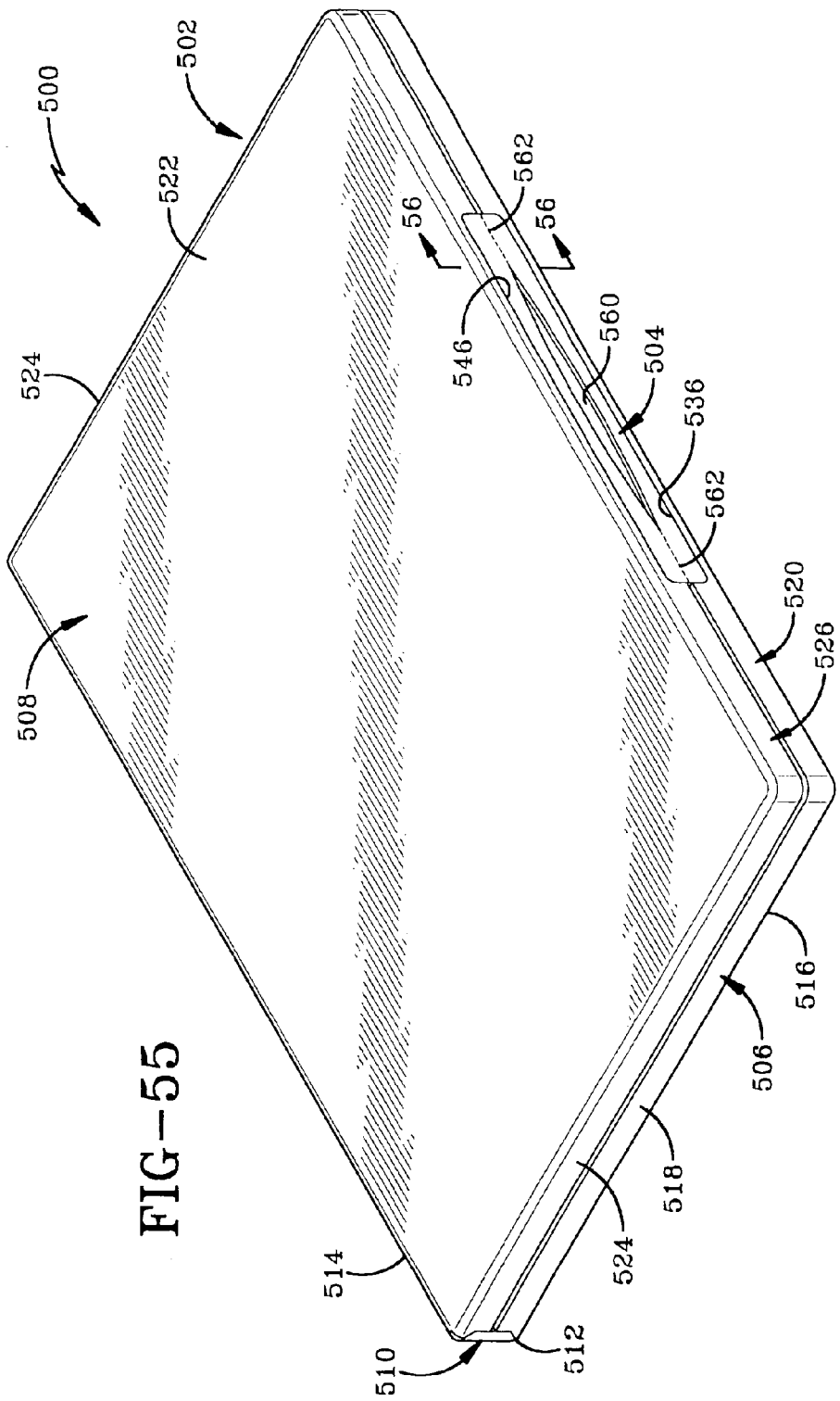
FIG. 55 is a view similar to FIG. 54 with the lock inserted within the lock reception cavity.

Lock 504 is configured to be disposed entirely within the lock reception cavity in the preferred embodiments of the invention so that a shoplifter cannot easily grasp lock 504 and pull lock 504 away from container 502. In other embodiments of the invention, lock 504 may be substantially disposed within the lock reception cavity such that portions of lock 504 may extend from the lock reception cavity but those portions would be difficult to grasp by the shoplifter. In accordance with another objective of the invention and as shown in FIGS. 55 and 59, lock 504 substantially fills the lock reception cavity so that the shoplifter cannot easily insert a thick pry bar between walls 520/526 and lock 504.

When lock 504 is installed by snapping lock fingers 552 through lock holes 550, lid 508 may not be moved from the closed position to an open position without removing lock 504 or destroying another portion of container 502. Lock 504 is designed to be sold to the consumer along with container 502 and the item of recorded media stored in container 502. The consumer removes lock 504 by destroying lock 504. In the embodiment depicted in FIGS. 54–56, lock 504 is formed with a centrally disposed opening 560 that allows the consumer to cut lock 504 into two pieces by using a knife or a pair of scissors. Opening 560 allows relatively easy access to lock 504 during the cutting procedure. Lock 504 may additionally include visible cut lines 562 that show the consumer where the cuts must be made to open container 502. Cut lines 562 may be perforations formed in lock 504 or simply lines formed on the outer surface of lock 504. After lock 504 is cut into two pieces, lid 508 may be moved to the open position and the consumer may remove the pieces of lock 504 by pushing lock fingers 552 back through holes 550 or by severing protuberances 554 and removing lock 504.

In the embodiment of the invention depicted in FIGS. 59 and 60, lock 504 includes a plurality of spaced, aligned openings 564 that allow the consumer to cut lock 504 into two pieces to allow container 502 to be opened.

Figure 58:
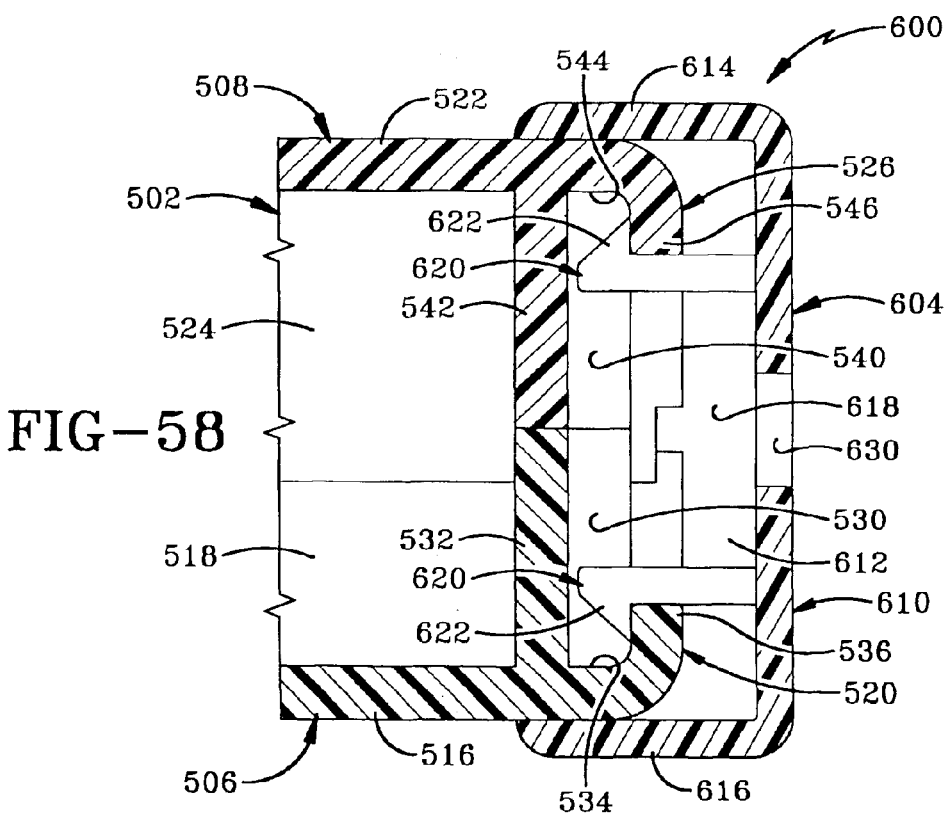
FIG. 58 is a sectional view taken along line 58—58 of FIG. 57.
Figure 57:
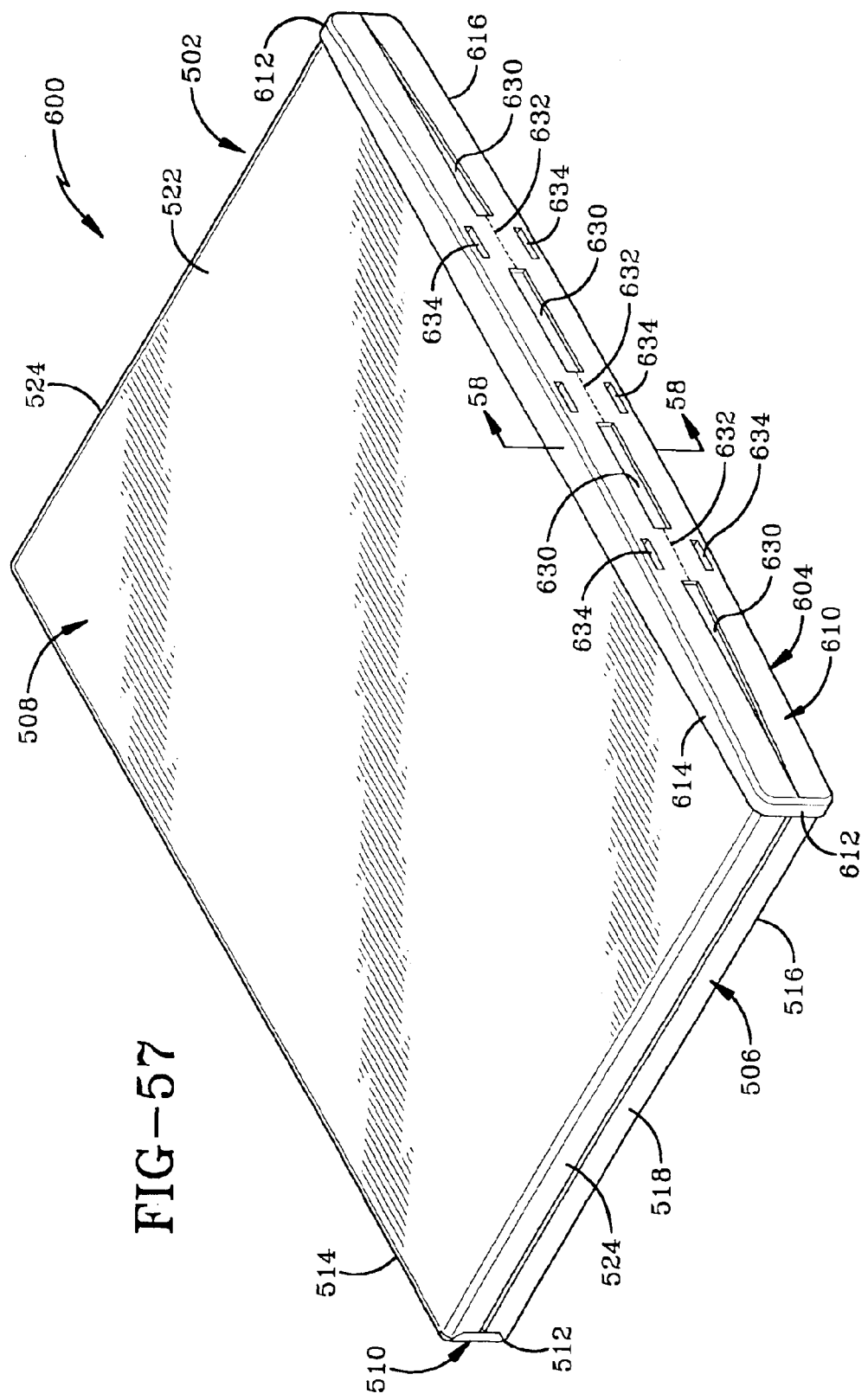
FIG. 57 is a perspective view of another embodiment of the security storage container showing the lock in a locked position.

Another embodiment of the security storage container of the present invention is indicated generally by the numeral 600 in FIGS. 57 and 58. Security storage container 600 includes storage container 502 described above and a lock 604 that holds lid 508 in the closed position with respect to base 506 when lock 604 is in the locked position.

Lock 604 is configured to extend over at least a portion of five walls of container 502 to hold container 502 in the closed position until lock 604 is removed. In the preferred embodiment of the invention, lock 604 is snapped onto the end of container 502 that opens opposite hinge wall 510 as depicted in FIG. 57.

Lock 604 includes a front wall 610 configured to be slightly larger than a combination of walls 520 and 526 of container 502. A pair of sidewalls 612, a top wall 614, and a bottom wall 616 extend rearwardly from front wall 610 to form a container reception cavity 618. Walls 612, 614, and 616 are configured to snugly and frictionally engage container 502 about the perimeter of container 502 and at least partially cover or engage four of the walls of container 502. In the embodiment depicted in the drawings, sidewalls 612 engage walls 518 and 524, top wall 614 covers or engages wall 522, and bottom wall 616 covers or engages wall 516. Front wall 610 covers front walls 520 and 526 of container 502.

Lock 604 includes a plurality of lock fingers 620 that extend rearwardly from front wall 610. Each lock finger 620 includes a protuberance 622 in the form of a hook configured to engage a lip 536 or 546 to hold lock 604 securely on container 502 so that it cannot be easily removed. Each protuberance 622 preferably has an angled surface that engages the outer edge of lip 536 or 546 as lock 604 is being placed on container 502. The force created by the angled wall bends lock finger 620 around lip 536 or 546 until the catch surface of finger 620 snaps behind lip 536 or 546 to secure lock 604 to container 502.

In the embodiment of the invention depicted in FIGS. 57 and 58, lock 604 includes a plurality of openings 630 that are spaced apart and aligned. Openings 630 allow the consumer to cut lock 604 into two halves to remove it from container 502 after security container 600 is purchased and removed from the retail establishment. Lock 604 may further include cut lines 632 that identify the areas that must be cut to remove lock 604 from container 502. In the preferred embodiment, lock 604 only includes opening 630. In other embodiments, lock 604 may include additional openings 634 that provide additional openings for the consumer to attack lock 604.

Another embodiment of the security storage container of the present invention is indicated generally by the numeral 650 in FIGS. 61–64. Security storage container 650 includes storage container 502 and a lock 654 that may be selectively locked to and unlocked from container 502. Lock 654 is thus reusable and may be removed by a retail clerk when container 502 is sold. Lock 654 includes many of the same elements discussed above with respect to lock 604 and the same numbers are used to refer to these elements.

Figure 61:
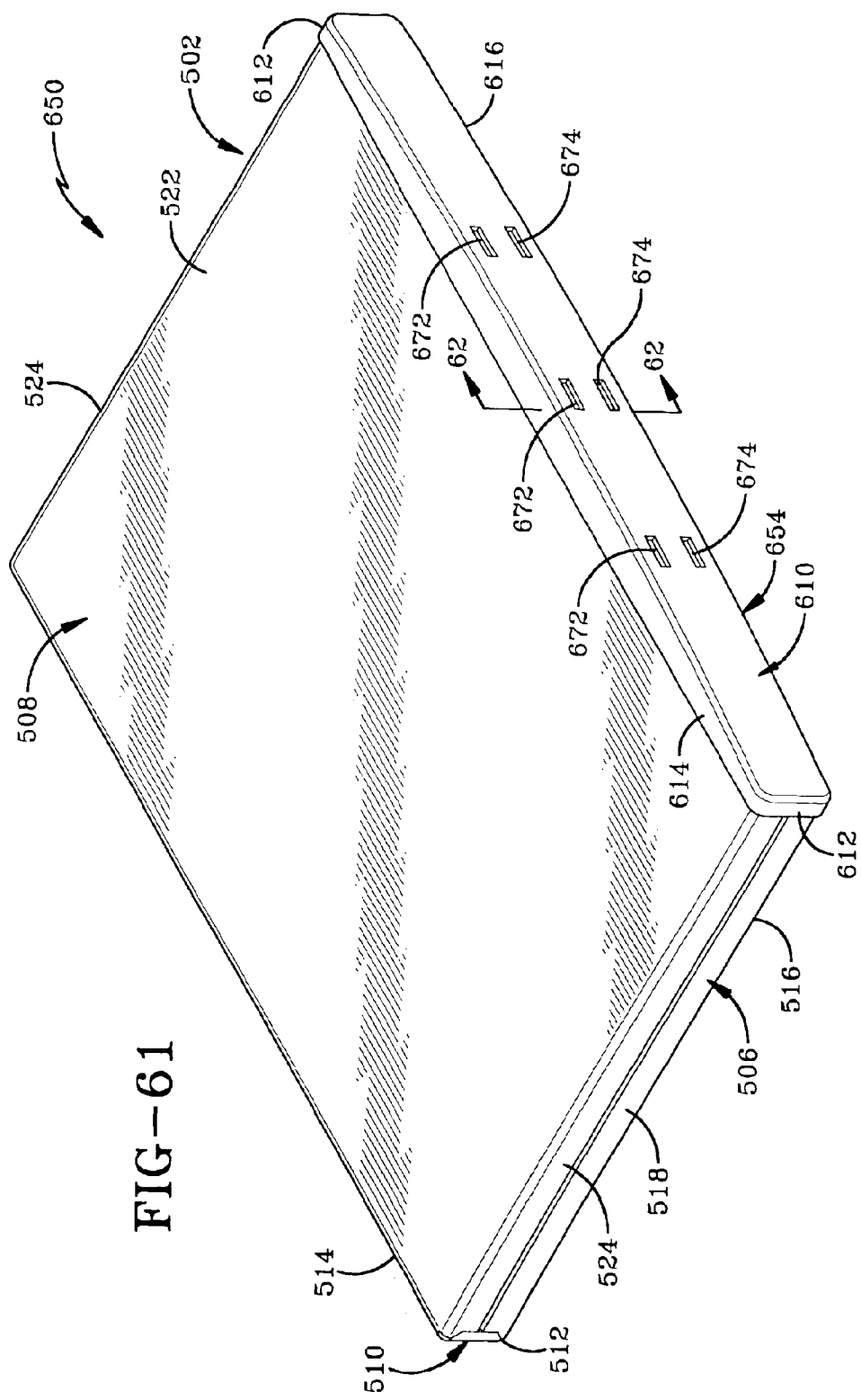
FIG. 61 is a perspective view of another embodiment of the security storage container of the present invention.

Lock 654 includes lock fingers 660 that are configured to engage lips 536 and 546. Lock fingers 660 include protuberances 662 that catch on lips 536 and 546 in a manner similar to protuberances 622 described above. Each lock finger 660 in lock 654 is configured so that it may be moved from a locked position to an unlocked position by a key pin 670. In the embodiment depicted in the drawings, key 654 includes a plurality of lock fingers 660 projecting upwardly and a plurality of lock fingers projecting downwardly. Each upwardly projecting lock fingers 660 is aligned with a key hole 672 with each downwardly projecting lock fingers 660 being aligned with a key hole 674 (FIGS. 61 and 62). Key hole 672 and 674 allow the user to insert key pin 670 as shown in FIG. 63. Key pins 670 engage lock fingers 660 to move them from the locked position to the unlocked position as depicted in the arrows drawn in FIG. 63. Once lock fingers 660 are in the unlocked position, the user may withdraw lock 654 from container 502 and reuse lock 654.

Those skilled in the art will recognize that other configurations for lock fingers 660 and key holes 672 and 674 may be used without departing from the concepts of the present invention. In accordance with the objectives of the present invention, lock 654 may be used to lock container 502 without altering container 502. Container 502 does not require holes to be formed in any walls for lock 654 to properly function.

Another embodiment of the lockable media storage box of the invention is indicated generally by the numeral 700 in FIGS. 65–74. Storage box 700 includes a base 702 and a lid 704 that is hingedly connected to base 702 between open and closed positions. Lid 704 may be connected to base 702 with a pair of living hinges 706 that are separated by a back wall or hinge wall 708. A hub 710 is carried by base 702. Hub 710 is configured to hold an item of recorded media. In the embodiment of the invention depicted in FIG. 65, hub 710 is configured to hold a disc-shaped item of recorded media such as a CD, a DVD, or a game disc. The concepts of the present invention may be used with a wide variety of differently shaped bases 702 that may be configured to hold different types of recorded media such as video game cartridges, cassette tapes, VHS video tapes, and the like.

Base 702 generally includes a bottom wall 718, a pair of sidewalls 720, and a front wall 722. Sidewalls 720 are generally opposed with front wall 722 extending between the ends of sidewall 720 opposite hinge 706. Base 702 further includes latches 723 that are adapted to hold lid 704 in a closed position.

Front wall 722 includes a pair of oppositely-disposed lateral portions 724, a pair of tabs 726 and a central portion 728. Tabs 726 extend inwardly from the inner end of each lateral portion 724 with central portion 728 extending between tabs 726 at a position inward from the outer edge of bottom wall 718 such that a concave indentation is formed in front wall 722.

Lid 704 includes a top wall 740, a pair of sidewalls 742, and a front wall 744. Front wall 744 includes a pair of lateral portions 746 and a pair of tabs 748. Sidewalls 742 and front wall 744 are disposed inwardly of the outer perimeter of upper wall 740 so that walls 742 and 744 will be disposed inwardly of walls 720 and 722 when lid 704 is in the closed position. The overlapping wall configuration adds strength to container 700. Furthermore, tabs 748 are disposed adjacent tabs 726 when lid 704 is closed as shown in FIGS. 67 and 68. Lid 704 also includes a pair of literature clips 749 adapted to hold printed literature on lid 704.

Figure 65:
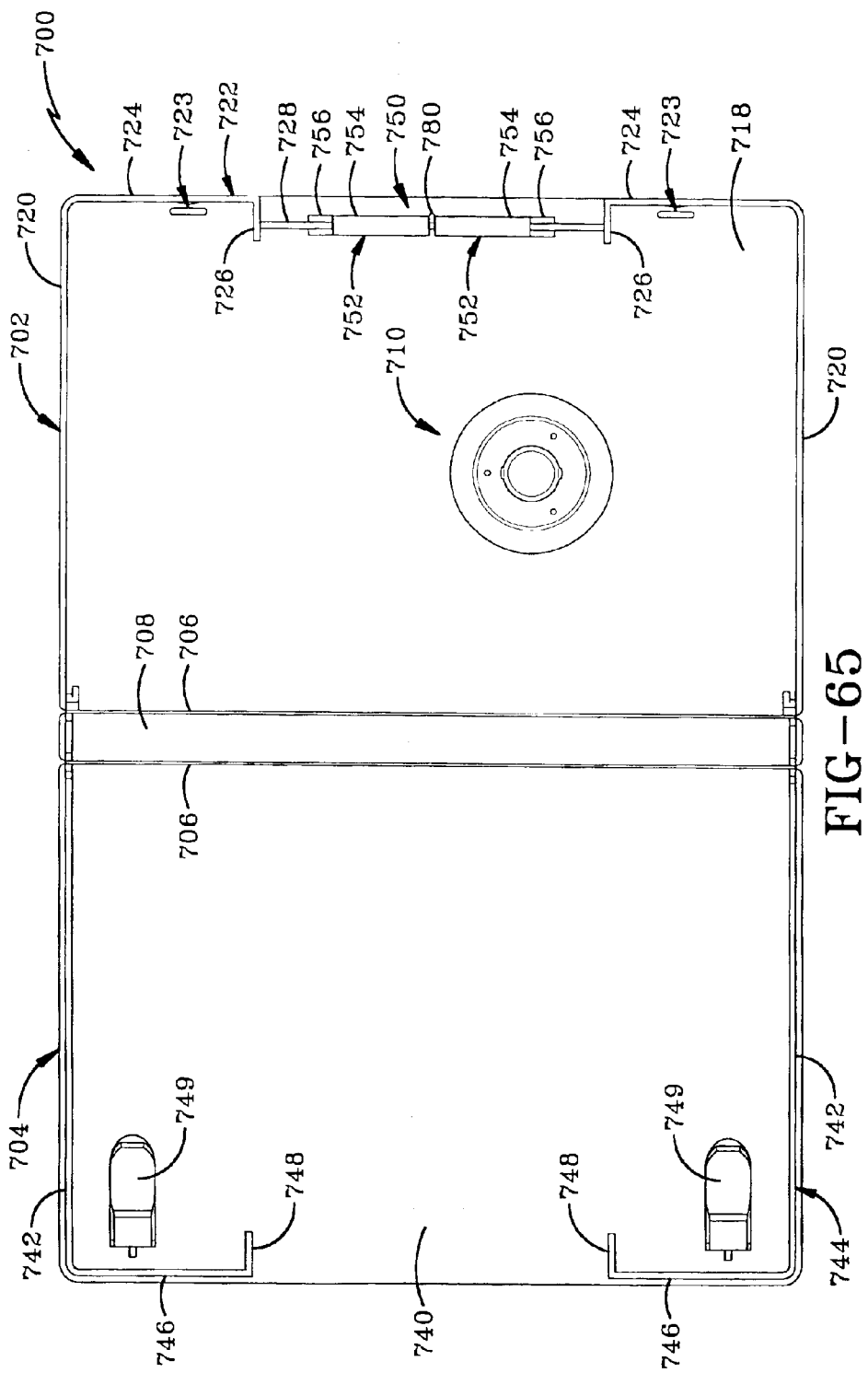
FIG. 65 is a top plan view of another embodiment of the lockable media storage box of the present invention with the lid in the open position.
Figure 66:
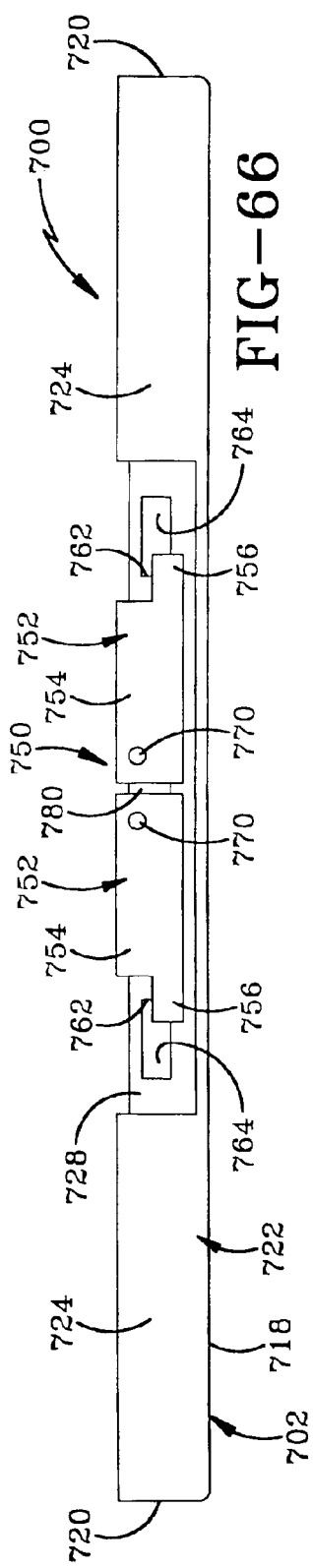
FIG. 66 is a front view of the front of the base with the locking member in the unlocked position.
Figure 69:
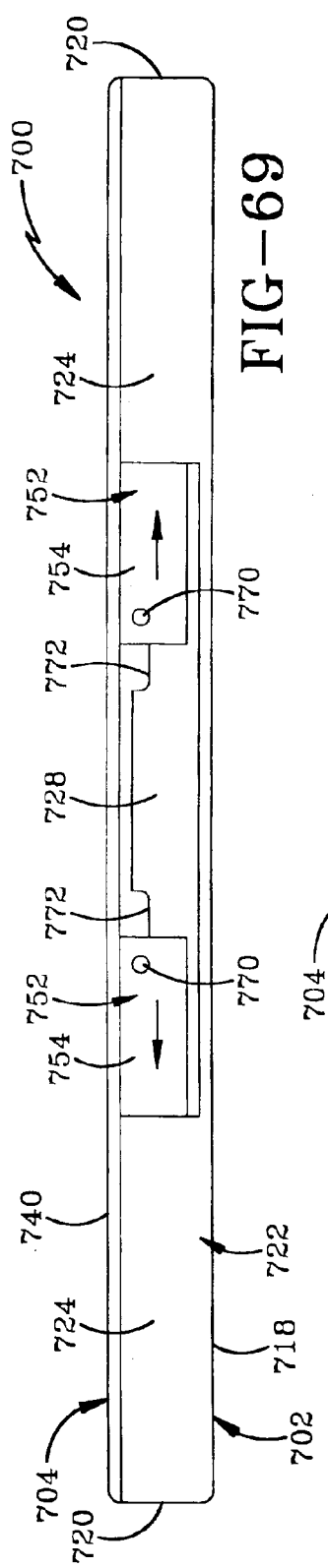
FIG. 69 is a front view similar to FIG. 66 with the lid closed and the lock members in the locked position.
Figure 72:
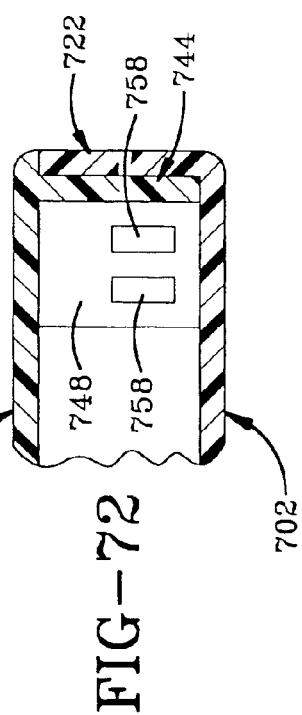
FIG. 72 is a sectional view taken with the lid in the closed position showing the two locking holes in the lock tab.

Storage container 700 includes a locking mechanism 750 that may be moved between the unlocked position depicted in FIGS. 65 and 66 to a locked position (FIG. 69). In the unlocked position, lid 704 may be freely moved between the open and closed position. When lid 704 is closed and locking mechanism 750 is in the locked position, lid 704 may not be opened because locking mechanism 750 holds lid 704 closed until the user opens locking mechanism 750 with an appropriate key.

Locking mechanism 750 includes a pair of lock members 752 that each include a body 754 and at least one lock pin 756. Each tab 726 and 748 defines at least one locking hole 758 that are aligned about a common axis when lid 704 is in the closed position. Lock pin 756 of each lock member 752 is disposed in locking hole 758 when locking mechanism 750 is in the locked position. The disposition of lock pin 756 in locking holes 758 of both base 702 and lid 704 prevents lid 704 from being moved to the open position.

As shown in FIG. 68, each lock member 752 is selectively slidably disposed on central portion 728 of front wall 722. Each body 754 defines a slot that slidably engages central portion 728. Each body 754 further carries a locking finger 760 that engages a ledge 762 disposed at one edge of a locking finger opening 764 defined by central portion 728. Each locking finger opening 764 is formed in the front surface of central portion 728 with each locking finger 760 projecting rearwardly from body 754. When lock member 752 moves to the locked position as depicted in FIG. 71, locking finger 760 engages locking finger opening 764 and springs rearwardly preventing lock member 752 from being moved back towards the unlocked position because locking finger 760 engages ledge 762. Lock member 752 cannot be moved back toward the unlocked position until a key having a magnet is used to pull locking finger 760 forwardly out of locking finger opening 764.

In the embodiment of the invention depicted in the drawings, each lock member 752 includes a pair of lock pins 756 disposed on either side of central portion 728. Each tab 726 and 748 correspondingly defines a pair of locking holes 758. As such, when locking mechanism 750 is in the locked position, four members extend between base 702 and lid 704 to prevent lid 704 from being moved to the open position. The four members provide a security benefit to container 700. In addition to the four members engaging base 702 and lid 704, a pair of locking fingers 760 are simultaneously used to hold locking mechanism 750 in the locked position. Each locking finger 760 is separately actuated with each lock member 752 being separately actuated such that a shoplifter must pick both lock members 752 before opening container 700.

Each lock member 752 defines a key hole 770 in body 754. In some embodiments, key hole 770 may be formed as an indentation in the front surface of body 754. In the embodiment depicted in the drawings, key hole 770 extends entirely through body 754. In order to accommodate key hole 770, the top of central portion 728 includes a pair of depressions 772 having inner ends 774 and outer ends 776. A key pin (not shown) may thus be fully inserted in key hole 770 to move lock member 752 back and forth between the locked and unlocked positions. When key pin engages inner end 774, lock member 752 is in the unlocked position and when the key pin engages outer end 776, lock member 752 is in the locked position. The key pin must work in cooperation with the magnet to move locking fingers 760.

When locking mechanism 750 is first installed on base 702, a connector 780 may hold lock member 752 together so that container 700 is not accidently locked. Connector 780 allows lid 704 to be closed and shipped to a replicator where the items of media are installed in container 700. Locking members 752 are then forced apart breaking connector 780 after container 700 is initially loaded with the media. Connector 780 may be a small strip of plastic as shown in the drawings or other appropriate connectors known in the art.

An alternative version of container 700 is depicted in FIGS. 73 and 74. In the embodiment, locking fingers 760 extend outwardly from central portion 728 to engage ledges 762 formed in body 754 of lock member 752. Key hole 770 is in communication with locking finger opening 764 such that the key pin will engage locking finger 760 and mechanically push it out of engagement with ledge 762 so that lock member 752 may be moved from the locked position to the unlocked position.

Another embodiment of the lockable media storage box or container of the present invention is indicated generally by the numeral 800 in FIGS. 75–85. Storage container 800 generally includes a base 802 and a lid 804 that is hingedly connected to base 802 and movable between open and closed positions. Lid 804 may be attached to base 802 by a pair of living hinges 806 that are spaced apart by a back wall or hinge wall 808. Base 802 includes a media storage hub 810 adapted to hold a disc-shaped item of recorded media. Storage container 800 may be used with any of a variety of different types of recorded media such as tapes, discs, and memory chips.

Base 802 includes a bottom wall 818, a pair of opposed sidewalls 820, and a front wall 822. Sidewalls 820 are disposed on opposite sides of bottom wall 818 with front wall 822 being connected to the ends of sidewalls 820 opposite hinge 806. Front wall 822 includes a concave central portion 824. The portion of bottom wall 818 disposed outwardly of central portion 824 is a ledge that allows container 800 to be easily opened when it is unlocked. Base 802 includes latches 823 adapted to engage lid 804 to hold lid 804 in the closed position.

Lid 804 includes a pair of opposed sidewalls 840, a front wall 842, and a top wall 843. Sidewalls 840 are disposed on opposite ends of top wall 843 with front wall 842 extending from the ends of sidewalls 840 opposite hinge 806. Front wall 842 substantially matches the configuration of front wall 822 such that front walls 822 and 842 are disposed adjacent each other when lid 804 is closed. Sidewalls 840 and front wall 842 are disposed inwardly of sidewalls 820 and front wall 822 such that walls 840 and 842 are disposed inwardly of walls 820 and 822 when lid 804 is closed.

Lid 804 includes a pair of literature clips 850 that are adapted to hold printed literature in lid 804. Each clip 850 includes a lock portion 852 that defines a lock hole 854.

Figure 75:
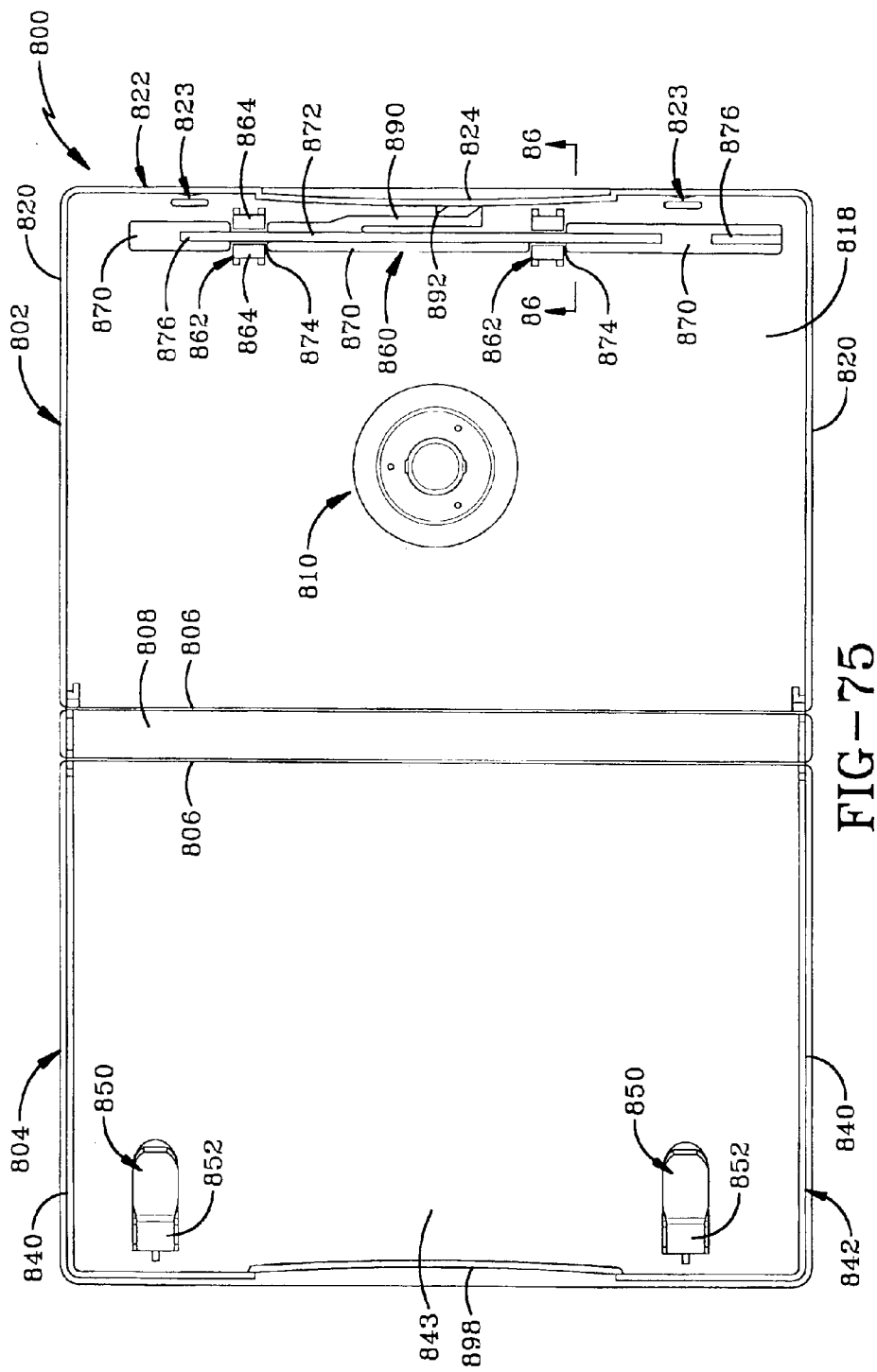
FIG. 75 is a top plan view of another embodiment of the lockable storage box of the present invention with the lid in the open position.
Figure 86:
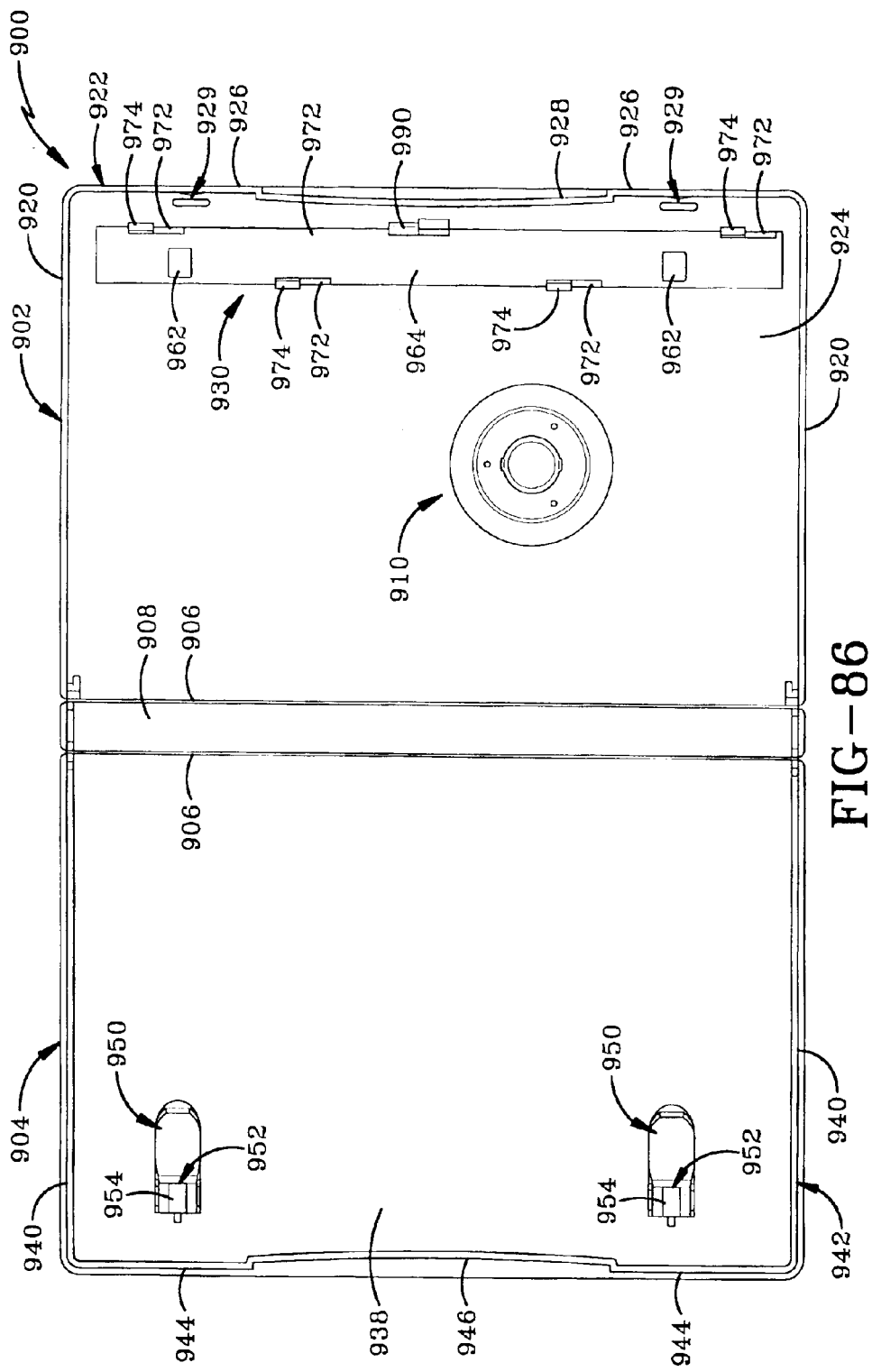
FIG. 86 is a top plan view of another embodiment of the lockable media storage box of the present invention with the lid in the open position.
Figure 87:
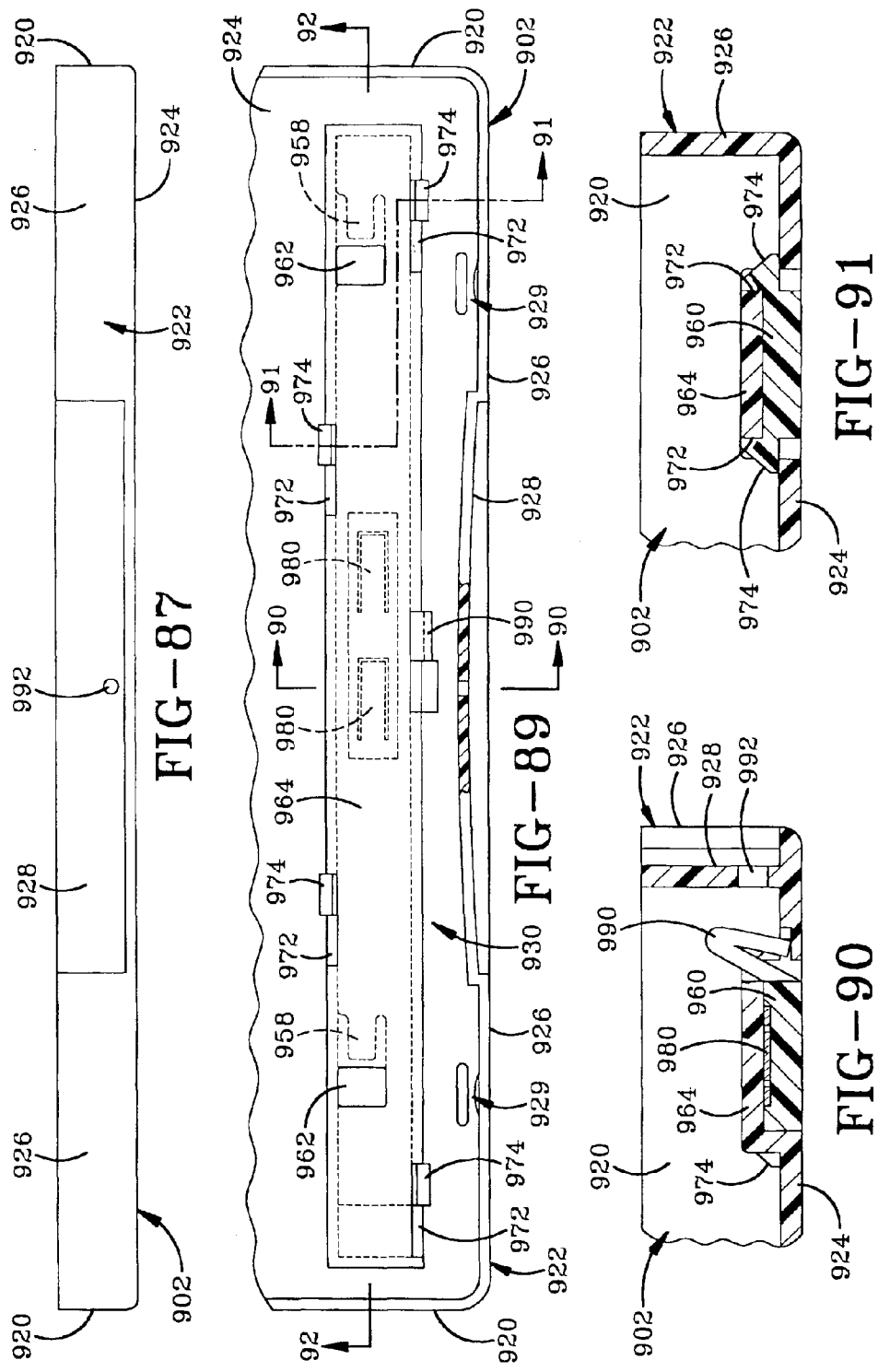
FIG. 87 is a front elevational view of the front wall of the base of the container.

A lock slide 860 is carried by base 802. Lock slide 860 may be moved between unlocked and locked positions to lock and unlock container 800. A pair of base clips 862 are connected to bottom wall 818 to hold lock slide 860 to base 802. Each base clip 862 defines a locking opening between its opposed members 864 and bottom wall 818 (see FIG. 76). Lock slide 860 includes a first horizontal member 870 and a second vertical member 872. Horizontal member 870 includes a pair of gaps 874 that allow lock slide 860 to be inserted into base clips 862 as shown in FIG. 75. Once inserted, lock slide 860 is moved longitudinally so that first horizontal portion 870 slidably engages members 864 to hold lock slide 860 to base 802. Second vertical portion 872 defines a pair of locking fingers 876 that engage lock portions 852 to lock container 800.

Locking fingers 876 are disposed on opposite ends of lock slide 860 so that lid 804 is held closed in both corners opposite hinge 806. Locking fingers 876 are preferably configured such that a portion of lock portion 852 is disposed between locking finger 876 and horizontal portion 870 when lock slide 860 is in the locked position as depicted in FIGS. 83–85.

Bottom wall 818 defines a pair of indentations 880 adapted to receive magnetically-actuated locking fingers 882. Locking fingers 882 are biased upwardly toward lock slide 860 and are received in locking finger holes 884 formed in the bottom of lock slide 860 when lock slide 860 is moved to the locked position as depicted in FIGS. 83 and 84. Locking finger hole 884 defines a ledge 886 which prevents lock slide 860 from moving back from the locked position to the unlocked position unless locking finger 882 is pulled downwardly by magnetic force.

In addition to the magnetically-actuated locking fingers 882, lock slide 860 includes a mechanically-actuated locking finger 890 that engages a ledge 892 defined by central portion 824 of front wall 822 of base 802. Mechanically-actuated locking finger 890 is biased outwardly toward front wall 822. Ledge 892 may be the edge of a key opening 894 or may be a protrusion as depicted in FIG. 82. Locking finger 890 may include an indent 896 (FIGS. 77 and 81) that allows a key pin to be inserted through opening 894 into indentation 896 to move locking finger 890 and thus lock slide 860 back and forth between the unlocked and locked positions. Of course, a magnetic force must be present to pull lock fingers 880 out of engagement with lock slide 860 before the key pin may be used to move lock slide 860. Opening 894 is thus elongated and has a length long enough to allow lock fingers 876 to move into and out of engagement with lock portions 852. Front wall 842 of lid 804 includes a central portion 898 having a height that is less than the height of central portion 824 of front wall 822. Central portion 898 of front wall 842 thus does not block access to locking finger 890 or engage locking finger 890 when lid 804 is closed. In FIG. 82, central portion 898 is broken away in order to show the engagement of lock finger 890 with base 804.

Another embodiment of the lockable media storage container of the present invention is indicated generally by the numeral 900 in FIGS. 86–104. Lockable storage container 900 includes a base 902 and a lid 904 hingedly connected to base 902 and movable between open and closed positions. Lid 904 may be connected to base 902 with a pair of hinges 906 that may be living hinges. Hinges 906 may be spaced apart by a back wall or hinge wall 908. Base 902 includes a media storage hub 910 that is adapted to hold disc-shaped items of recorded media. Base 902 may also be configured to work with other types of recorded media by including holding devices designed to retain tapes, game cartridges, memory chips, etc.

Base 902 includes a pair of spaced apart sidewalls 920, a front wall 922, and a bottom wall 924. Sidewalls 920 are disposed at opposite ends of bottom wall 924 with front wall 922 extending across the ends of sidewalls 920 opposite hinge 906. Front wall 922 includes lateral portions 926 and a concave central portion 928 that forms a bottom ledge where bottom wall 924 extends outwardly from central portion 928. Base 902 also includes latches 929 that cooperate with lid 904 to hold lid 904 closed. A locking mechanism 930 is carried by base 902 and movable between locked and unlocked positions. Locking mechanism 930 allows lid 904 to be locked to base 902 so that a person cannot access the media stored in container 900 without the key that unlocks locking mechanism 930.

Lid 904 includes a top wall 938, a pair of sidewalls 940, and a front wall 942. Sidewalls 940 and front wall 942 substantially match the configuration of sidewalls 920 and front wall 922 except that walls 940 and 942 are disposed inwardly of walls 920 and 922 such that the walls of lid 904 are disposed inwardly of the walls of base 902 when lid 904 is closed. As such, front wall 942 of lid 904 includes lateral portions 944 and a central portion 946. Central portion 946 is concave and defines a top ledge where top wall 938 extends outwardly of central portion 946.

Lid 904 includes a pair of literature clips 950 adapted to hold printed literature in lid 904. Each literature clip 950 includes a lock portion 952 configured to interact with locking mechanism 930 to allow lid 904 to be locked to base 902. As shown in FIG. 100, each lock portion 952 includes a base and a locking loop 954 that defines a locking hole 956. Loops 954 are sized and configured to be aligned with lock mechanism 930 so that a lock pin 958 carried by a lock slide 960 may be slid into locking hole 956 when locking mechanism 930 is in the locked position. To accommodate the positioning of loops 954, bottom wall 924 of base 902 defines a locking opening 962 that is aligned with each lock portion 952.

Figure 88:
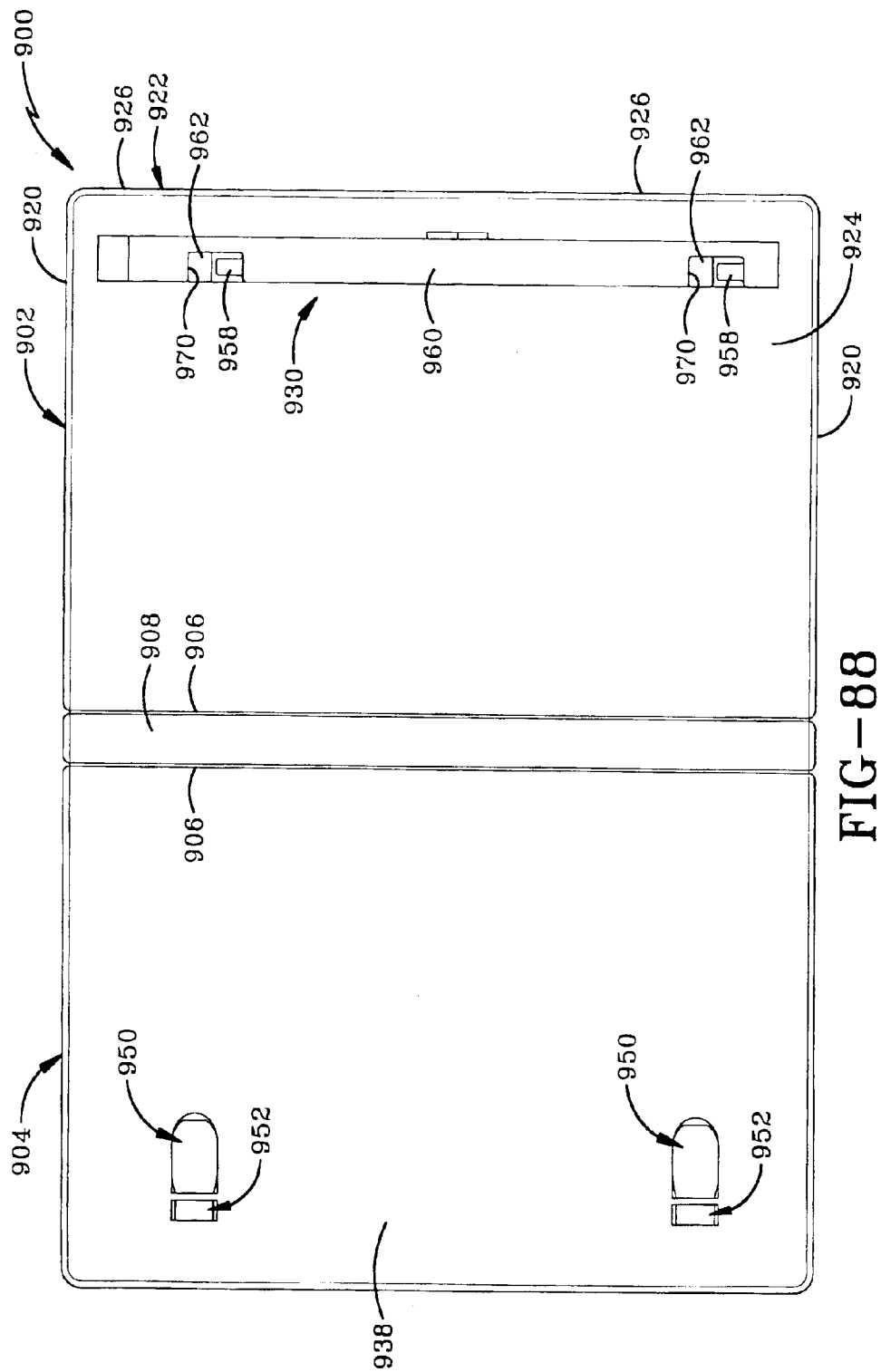
FIG. 88 is a bottom plan view of FIG. 86.

Bottom wall 924 includes a raised lock housing 964 disposed along front wall 922 of base 902. Housing 964 defines a slot open through the rear of bottom wall 924 as depicted in FIGS. 88 and 100. Housing 964 is tall enough to receive lock slide 960 such that the bottom surface lock slide 960 is substantially flush with the bottom surface of bottom wall 924. The configuration of these elements prevents a shoplifter from readily feeling the position of locking mechanism 930 (noting that an opaque covering is typically disposed over the bottom surface of bottom wall 924 when container 900 is sold).

Lock slide 960 defines openings 970 adjacent each lock pin 958 to allow loops 954 to be aligned with pins 958 when lid 904 is closed. As shown in FIGS. 97 and 100, pins 958 and loop 954 have a wall thickness less than the wall thickness of slide 960 so that loops 954 do not protrude below the lower surface of slide 960.

Housing 964 defines openings 972 adapted to receive fingers 974 projecting from lock slide 960. Fingers 974 hold lock slide 960 to base 902 in a sliding configuration. The sliding movement of lock slide 960 is limited by the length of openings 972 and the end walls of housing 964. When lock slide 960 is in the unlocked position, openings 970 are aligned with openings 962 in housing 964. When lock slide 960 is in the locked position, locking pins 958 are aligned with openings 962.

Magnetically-actuated locking fingers 980 are configured to hold lock slide 960 in the locked position. Locking fingers 980 are depicted in FIG. 103 in the locked position where each locking finger 980 is received in a locking finger 982 defined by the surface of housing 964 lying against lock slide 960. Each locking finger opening 982 is at least partially defined by a ledge 984 against which the end of locking finger 980 engages to prevent lock slide 960 from moving from the locked position towards the unlocked position. The key that opens device 100 includes a magnet that magnetically attracts locking fingers 980 to the unlocked position where each locking finger 980 disengages ledge 984 and allows lock slide 960 to slide back and forth with respect to housing 964. The position of locking fingers 980 and locking finger openings 982 may be reversed in other embodiments of the invention.

An optional mechanically-actuated locking finger 990 is disposed adjacent central portions 928 and 946 as shown in FIG. 101. Each central portion 928 and 946 defines a key hole 992 that are aligned when lid 904 is closed. Mechanically-actuated locking finger 990 engages a catch 994 that prevents slide 960 from moving from the locked position to the unlocked position until locking finger 990 is depressed inwardly with a key pin that is pressed through openings 992. Finger 990 is optional and may be removed in one embodiment of the invention. In another embodiment of the invention, magnetically-actuated locking finger 980 are removed and the sole locking member of locking mechanism 930 is locking finger 990. In this embodiment, key hole 992 may be elongated so that the key pin used to depress locking finger 990 may also be used to move lock slide 960 back and forth.

The improved lockable media storage box with lock and key is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the lockable media storage box with lock and key is constructed and used, the characteristics of the construction, and the advantageous new and useful results obtained; the new and useful structures, devices, elements, arrangements, parts, and combinations are set forth in the appended claims.

What is claimed is:

1. A lockable media storage container comprising:
   a container body having a base and lid;
   the base having a front wall;
   the container body having a hub for holding a disc-shaped item of recorded media;
   the lid being connected to the base with a hinge; the hinge being disposed on the opposite side of the base from the front wall of the base; the lid being movable between open and closed positions; the closed position of the lid adapted to enclose the disc-shaped item of recorded media held by the base;
   a lock slide carried by the container body and moveable between unlocked and locked positions;
   the lock slide engaging the lid and base when the lock slide is in the locked position to lock the lid to the base in the closed position;
   at least two magnetically-movable locking fingers adapted to lock the lock slide in the locked position;
   the magnetically-movable locking fingers being spaced apart;
   each of the locking fingers being movable between locked and unlocked positions;
   the lock slide and the locking fingers being entirely enclosed within the container body when the lock slide is in both the locked and unlocked positions and when the lid is in the closed position; and
   the front wall of the base defines an opening; a portion of the lock slide being exposed through the opening in the front wall of the base.

2. The container of claim 1, wherein the front wall defines a recessed central area; the opening in the front wall being disposed in the recessed central area of the front wall.

3. The container of claim 1, wherein each of the locking fingers pivots between its locked and unlocked positions.

4. The container of claim 1, wherein the lock slide is carried by the base of the container body and the container further comprising a pair of spaced hooked lock fingers connected to the lock slide; the hooked lock fingers engaging the lid when the lock slide is in the locked position.

5. A lockable media storage container comprising:

a container body having a base and lid;

the base having a front wall;

the container body having a hub for holding a disc-shaped item of recorded media;

the lid being connected to the base with a hinge; the hinge being disposed on the opposite side of the base from the front wall of the base; the lid being movable between open and closed positions; the closed position of the lid adapted to enclose the disc-shaped item of recorded media held by the base;

a lock slide carried by the container body and moveable between unlocked and locked positions;

the lock slide engaging the lid and base when the lock slide is in the locked position to lock the lid to the base in the closed position;

at least one magnetically-movable locking finger adapted to lock the lock slide in the locked position;

the locking finger being movable between locked and unlocked positions;

the lock slide and the locking finger being entirely enclosed within the container body when the lock slide is in both the locked and unlocked positions and when the lid is in the closed position; and the front wall of the base defines an opening; a portion of the lock slide being exposed through the opening in the front wall of the base.

6. The container of claim 5, wherein the front wall defines a recessed central area; the opening in the front wall being disposed in the recessed central area of the front wall.

7. The container of claim 5, wherein the locking finger pivots between its locked and unlocked positions.

8. The container of claim 5, wherein the lock slide is carried by the base of the container body and the container further comprising a pair of spaced hooked lock fingers connected to the lock slide; the hooked lock fingers engaging the lid when the lock slide is in the locked position.

9. A lockable media storage container comprising:

a container body having a base and lid;

the container body having a media storage area;

the base having a front wall and a pair of spaced sidewalls;

the lid having a front wall and a pair of spaced sidewalls;

the lid being connected to the base with a hinge; the hinge being disposed on the opposite side of the container body from the front wall of the base;

the lid being movable between open and closed positions;

the closed position of the lid adapted to enclose the media storage area;

the sidewalls and the base and lid overlapping when the lid is in the closed position to form double sidewalls;

a lock slide carried by the container body and moveable between unlocked and locked positions;

the lock slide locking the lid in the closed position when the lid is in the closed position and the lock slide is in the closed position;

at least two magnetically-movable locking fingers adapted to lock the lock slide in the locked position;

the magnetically-movable locking fingers being spaced apart;

each of the locking fingers being movable between locked and unlocked positions; and the lock slide and the locking fingers being entirely enclosed within the container body when the lock slide is in both the locked and unlocked positions and when the lid is in the closed position.

10. The container of claim 9, wherein the lock slide includes a horizontal member and a vertical member extending up from the horizontal member; and the vertical member including a pair of spaced hooks adapted to engage the container body when the lock slide is in the locked position.

11. The container of claim 10, wherein the container body includes a pair of spaced clips; the pair of spaced clips retaining the horizontal member of the lock slide.

12. The container of claim 10, wherein the locking fingers are disposed between the horizontal member and the container body.

13. The container of claim 12, wherein the container body defines a recess for each of the locking fingers; and the horizontal member defining a ledge associated with each of the locking fingers.

14. The container of claim 9, wherein the locking fingers pivot between the locked and unlocked positions.

15. The container of claim 14, wherein the locking fingers are disposed between the lock slide and the base.

16. The container of claim 15, wherein the locking fingers pivot toward the base when moving from the locked position toward the unlocked position.

17. The container of claim 9, wherein the lock slide is disposed between the front wall of the base and the media storage area.

18. The container of claim 17, wherein the front wall of the base defines an opening aligned with a portion of the lock slide.

19. The container of claim 18, wherein the opening is elongated.

20. The container of claim 19, wherein a portion of the lock slide defines a recess that is aligned with the opening when the lock slide is in the locked and unlocked positions.

21. A lockable media storage container comprising:

a container body having a base and lid;

the container body having a front;

the container body having a media storage area;

the base having a pair of spaced sidewalls;

the lid having a pair of spaced sidewalls;

the lid being connected to the base with a hinge; the hinge being disposed on the opposite side of the container body from the front of the container body;

the lid being movable between open and closed positions;

the closed position of the lid adapted to enclose the media storage area;

the sidewalls and the base and lid overlapping when the lid is in the closed position to form double sidewalls;

a lock slide carried by the container body and moveable between unlocked and locked positions;

the lock slide locking the lid in the closed position when the lid is in the closed position and the lock slide is in the closed position; and a magnetically-movable locking finger adapted to lock the lock slide in the locked position; the locking finger movable between locked and unlocked positions.

22. The container of claim 21, wherein the locking finger pivots between the locked and unlocked positions.

23. The container of claim 22, wherein the lock slide is positioned between the media storage area and the front of the container body when the lid is in the closed position.

24. The container of claim 23, wherein the front of the container body defines an opening that provides access to the lock slide.

25. The container of claim 23, wherein the lock slide includes a pair of spaced hooks that engage the container body when the lock slide is in the locked position.

26. The container of claim 25, wherein the container body includes a pair of spaced clips that engage the lock slide to hold the lock slide to the container body.

27. The container of claim 26, wherein the lock slide includes a horizontal member and a vertical member extending up from the horizontal member; and the vertical member including the pair of spaced hooks.

28. The container of claim 27, wherein the pair of spaced clips retain the horizontal member of the lock slide.

29. The container of claim 27, wherein the locking finger is disposed between the horizontal member and the container body.

30. The container of claim 29, wherein the container body defines a recess; the locking finger being seated in the recess; and the horizontal member defining a ledge associated with the locking finger.

31. The container of claim 21, wherein the lock slide is entirely encased by the container body when the lock slide is in the locked position.

32. A lockable media storage container comprising:

a container body having a base and lid;

the container body having a front;

the container body having a media storage area;

the lid being connected to the base with a hinge; the hinge being disposed on the opposite side of the container body from the front of the container body;

the lid being movable between open and closed positions;

the closed position of the lid adapted to enclose the media storage area;

a lock slide carried by the container body and moveable between unlocked and locked positions;

the lock slide being encased within the container body when the lock slide is in the locked position;

the lock slide positioned between the media storage area and the front of the container body;

the lock slide locking the lid in the closed position when the lid is in the closed position and the lock slide is in the closed position; and a magnetically-movable locking finger adapted to lock the lock slide in the locked position; the locking finger movable between locked and unlocked positions.

33. The container of claim 32, wherein the locking finger pivots between the locked and unlocked positions.

34. The container of claim 33, wherein the front of the container body defines an opening that provides access to the lock slide.

35. The container of claim 34, wherein the lock slide includes a pair of spaced hooks that engage the container body when the lock slide is in the locked position.

* * * * *